(12) United States Patent
Meager

(10) Patent No.: US 10,001,107 B2
(45) Date of Patent: Jun. 19, 2018

(54) ENERGY CONVERSION SYSTEM AND METHOD

(71) Applicant: Paha Designs, LLC, Felt, ID (US)

(72) Inventor: Benjamin Meager, Felt, ID (US)

(73) Assignee: Paha Designs, LLC, Felt, ID (US)

( * ) Notice: Subject to any disclaimer, the term of this patent is extended or adjusted under 35 U.S.C. 154(b) by 749 days.

(21) Appl. No.: 14/463,876

(22) Filed: Aug. 20, 2014

(65) Prior Publication Data

US 2015/0052885 A1 Feb. 26, 2015

Related U.S. Application Data

(60) Provisional application No. 61/868,405, filed on Aug. 21, 2013, provisional application No. 61/952,657, filed on Mar. 13, 2014.

(51) Int. Cl.
| F03B 13/08 | (2006.01) |
|---|---|
| F03B 13/24 | (2006.01) |
| F16L 55/07 | (2006.01) |

(52) U.S. Cl.
CPC ............ *F03B 13/24* (2013.01); *F03B 13/086* (2013.01); *F16L 55/07* (2013.01); *Y02E 10/22* (2013.01); *Y02E 10/226* (2013.01); *Y02E 10/28* (2013.01); *Y02E 60/15* (2013.01); *Y02E 60/17* (2013.01)

(58) Field of Classification Search
CPC ....... Y02E 10/22; Y02E 10/226; Y02E 10/38; Y02E 60/15; Y02E 60/17; F03B 13/086; F03B 13/24; Y10T 137/2713
See application file for complete search history.

(56) References Cited

U.S. PATENT DOCUMENTS

| 3,149,776 | A | 9/1964 | Parrish |
|---|---|---|---|
| 3,754,147 | A | 8/1973 | Hancock et al. |
| 4,182,123 | A | 1/1980 | Ueda |
| 4,265,599 | A | 5/1981 | Morton |
| 4,307,299 | A | 12/1981 | Norton |
| 4,720,246 | A | 1/1988 | Morton |
| 4,797,563 | A | 1/1989 | Richardson |
| 5,099,648 | A | 3/1992 | Angle |
| 6,546,723 | B1 | 4/2003 | Watten et al. |
| 6,575,712 | B1 | 6/2003 | Slavchev |
| 6,781,253 | B2 | 8/2004 | Newman |
| 7,795,748 | B2 | 9/2010 | DeAngeles |
| 7,804,182 | B2 | 9/2010 | DeAngeles |

(Continued)

FOREIGN PATENT DOCUMENTS

| EP | 0100799 | 2/1984 |
|---|---|---|
| EP | 0162814 | 11/1985 |

(Continued)

OTHER PUBLICATIONS

International Search Report and Written Opinion for International (PCT) Patent Application No. PCT/US2014/051786, dated Dec. 18, 2014 8 pages.

(Continued)

*Primary Examiner* — Patrick Hamo
(74) *Attorney, Agent, or Firm* — Sheridan Ross P.C.

(57) ABSTRACT

A method, a system, and a device are disclosed which are capable of using moving liquid to create energy in the form of compressed air. The method, system, and/or device does not harm or consume the liquid to operate. The compressed air can be used to operate anything from vehicles to electric generators.

16 Claims, 71 Drawing Sheets

(56) References Cited

U.S. PATENT DOCUMENTS

| | | |
|---|---|---|
| 2006/0218908 A1 | 10/2006 | Abou-Raphael |
| 2009/0152871 A1 | 6/2009 | Ching |
| 2010/0045045 A1 | 2/2010 | Turner |
| 2010/0117364 A1 | 5/2010 | Harrigan |
| 2010/0170242 A1 | 7/2010 | Irps |
| 2010/0187827 A1 | 7/2010 | DeAngeles |
| 2010/0225117 A1 | 9/2010 | DeAngeles |
| 2010/0236466 A1 | 9/2010 | Costas |
| 2011/0008178 A1 | 1/2011 | Spidell |
| 2011/0116942 A1 | 5/2011 | Duffy et al. |
| 2011/0278861 A1 | 11/2011 | Yoon |
| 2011/0316280 A1 | 12/2011 | Khesali |
| 2012/0038165 A1 | 2/2012 | Carlos |

FOREIGN PATENT DOCUMENTS

| | | |
|---|---|---|
| EP | 1096142 | 5/2001 |
| EP | 1734255 | 12/2006 |
| GB | 2281758 | 3/1995 |
| WO | WO 97/01029 | 1/1997 |
| WO | WO 2004/044416 | 5/2004 |
| WO | WO 2005/075818 | 8/2005 |
| WO | WO 2007/140583 | 12/2007 |
| WO | WO 2008/002019 | 1/2008 |
| WO | WO 2010/144983 | 12/2010 |
| WO | WO 2010/144984 | 12/2010 |
| WO | WO 2010/144985 | 12/2010 |
| WO | WO 2011/023175 | 3/2011 |
| WO | WO 2011/108820 | 9/2011 |

OTHER PUBLICATIONS

"Compressed Air Tutorial," Energy Tech Pro™, 2010, 9 pages [retrieved from www.energytechpro.com/Demo-IC/MoreDetail/Air_Compressor_Tutorial.htm].

Golshani et al., "A Study of Hydraulic Air Compression for Ocean Thermal Energy Conversion Open-Cycle Applications," 1983, Union Carbide Corporation, 96 pages.

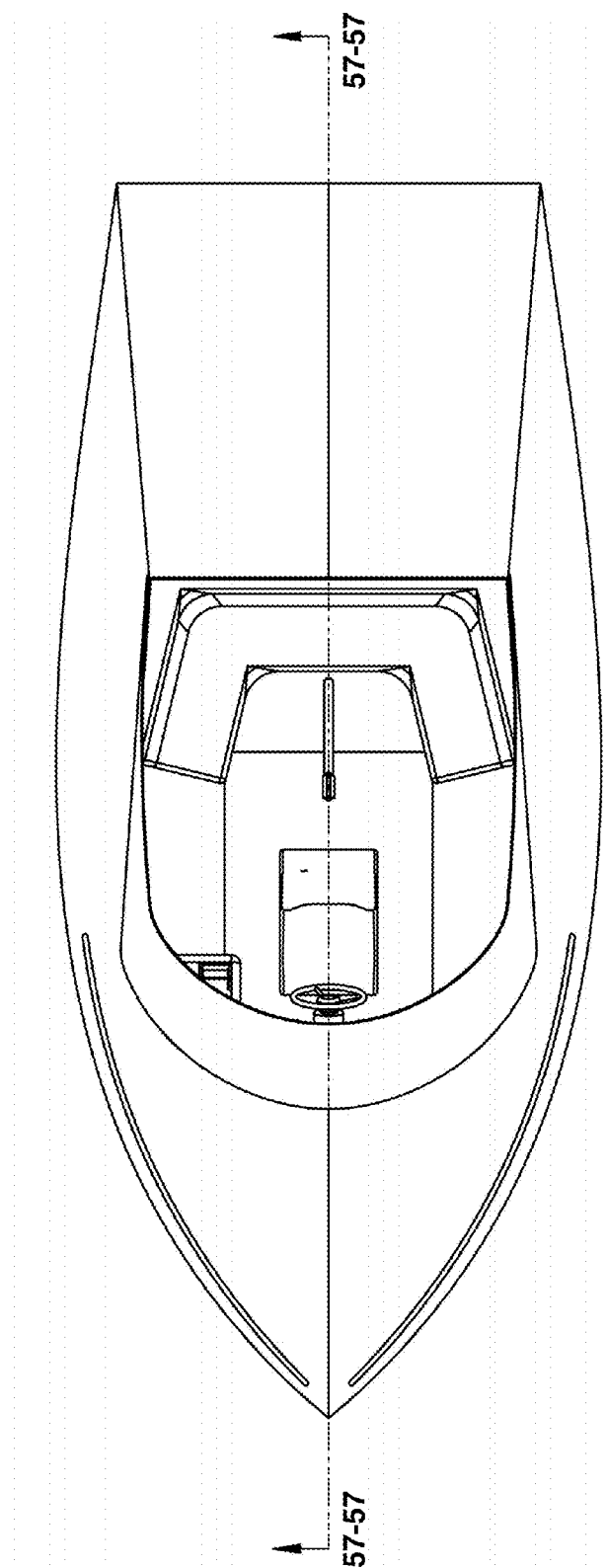
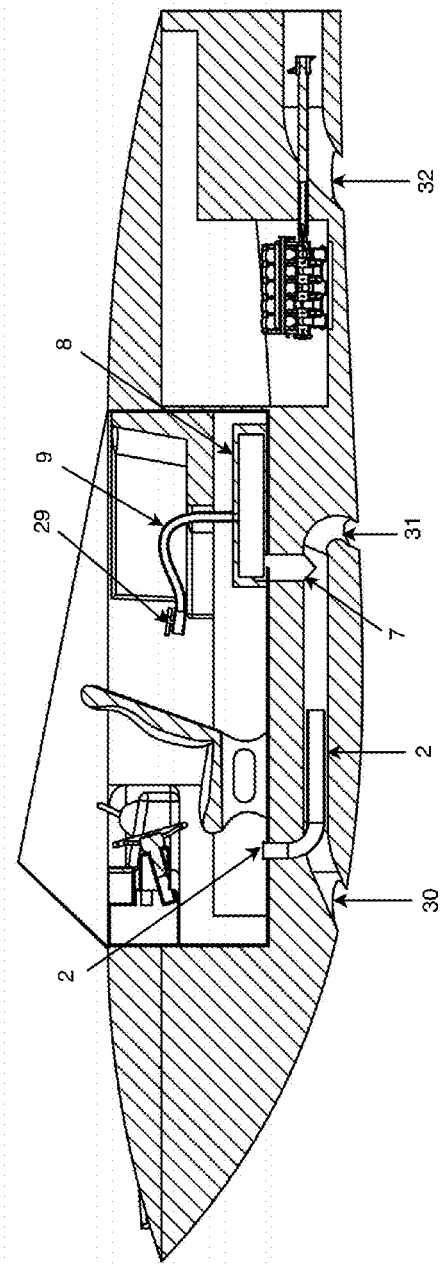
FIG. 57A
FIG. 57B

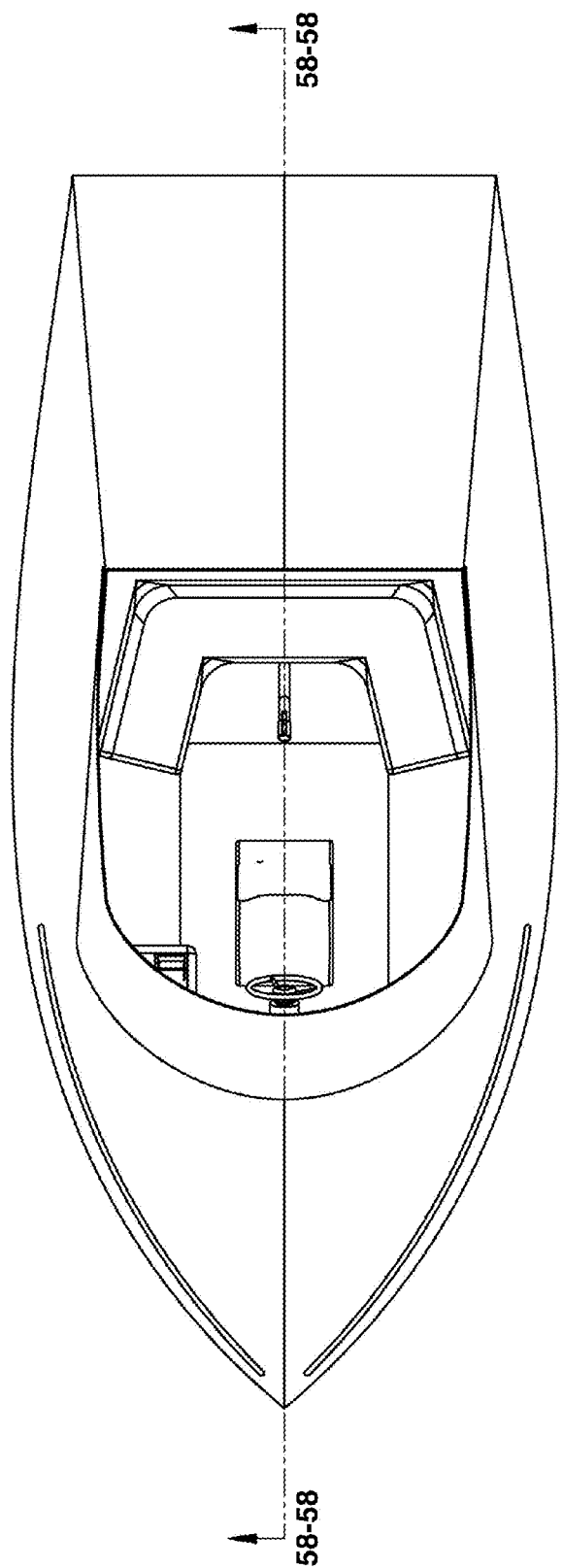
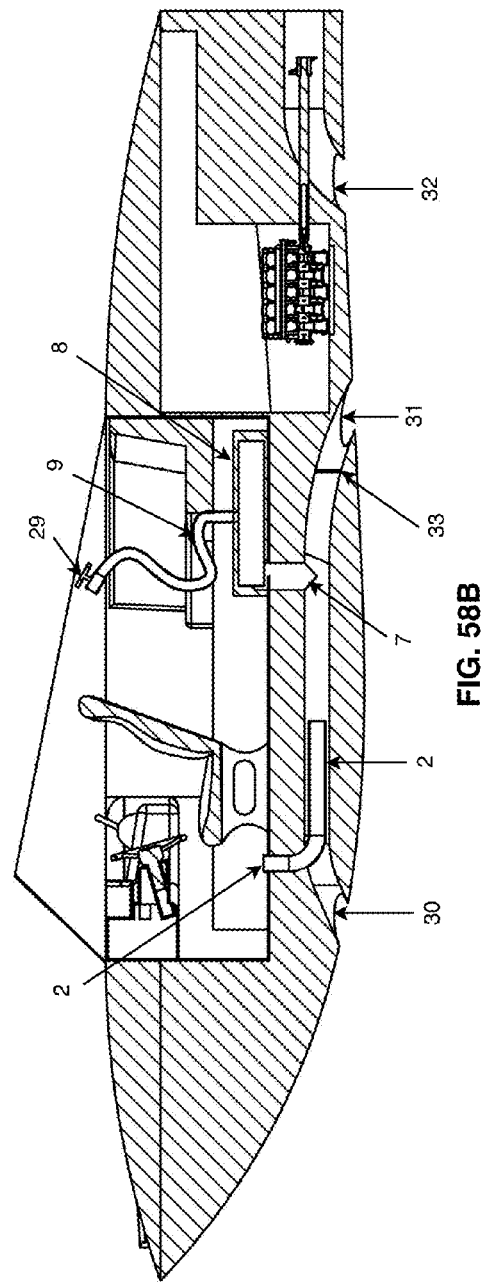
FIG. 58A
FIG. 58B

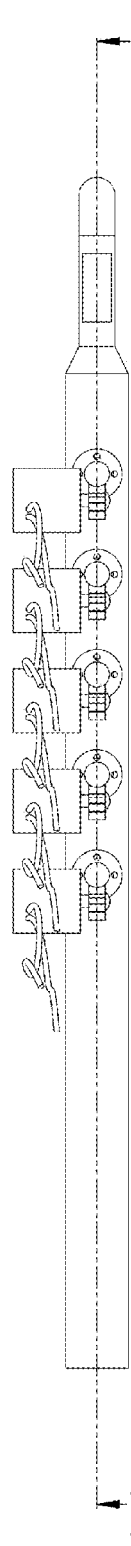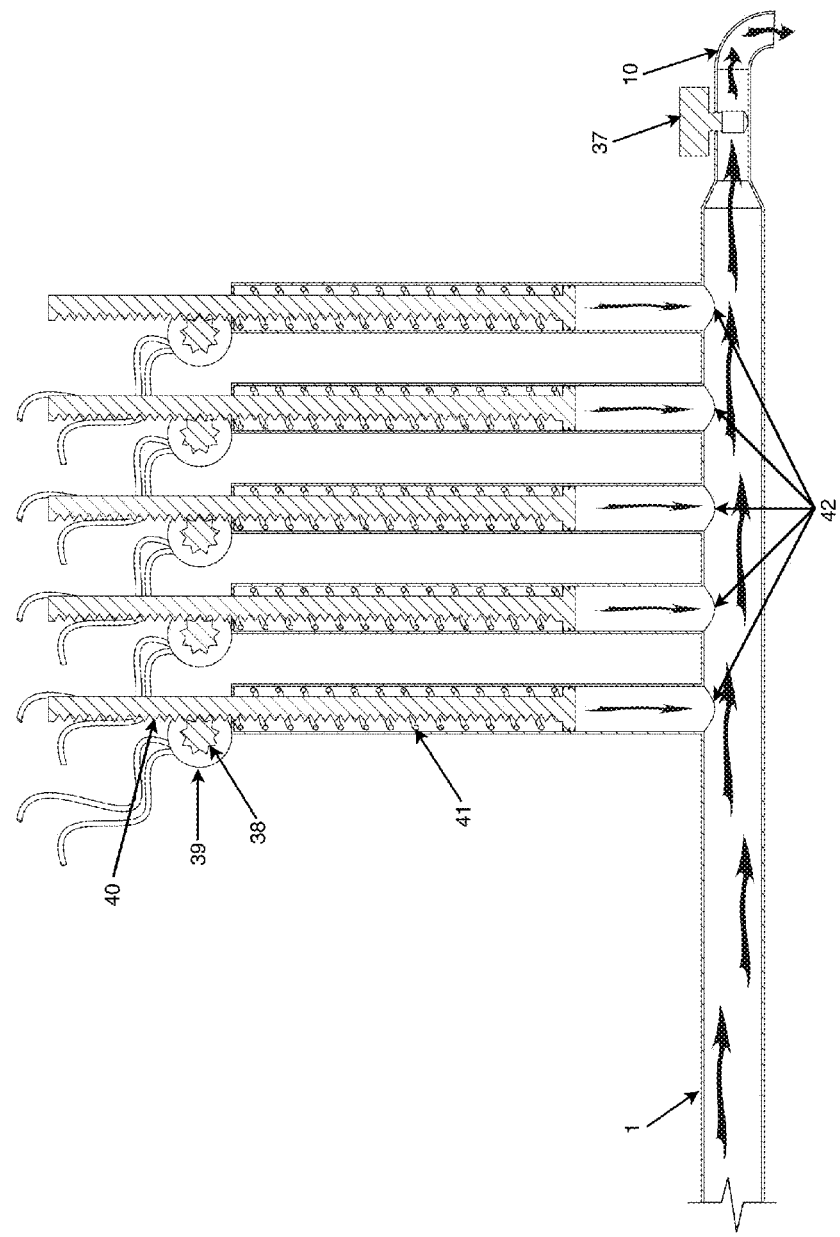
FIG. 67A
FIG. 67B

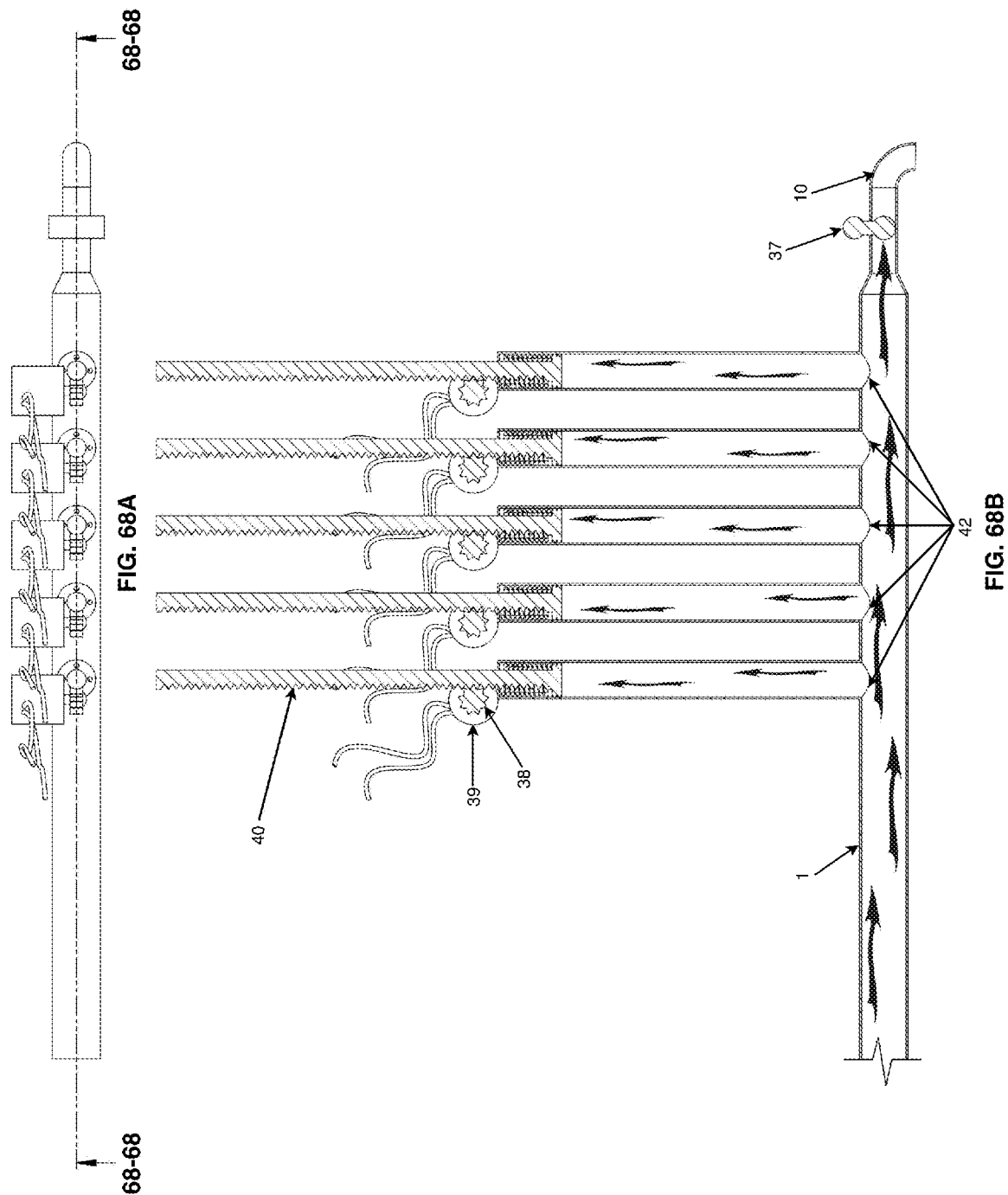

ENERGY CONVERSION SYSTEM AND METHOD

CROSS-REFERENCE TO RELATED APPLICATIONS

The present application claims the benefit of U.S. Provisional Patent Application No. 61/868,405 filed on Aug. 21, 2013, and U.S. Provisional Patent Application No. 61/952,657 filed on Mar. 13, 2014, each of which are hereby incorporated herein by reference in their entirety.

FIELD

The present disclosure related generally to the field of hydraulic air compressors and more specifically to compressing or trapping air by means of moving liquid.

BACKGROUND

Hydraulic air compressors of the past are valuable and useful devices to this day, but are limited in their use due to the specificity of their design or lack thereof. As an example, the hydraulic air compressor created by Charles Taylor just prior to the turn of the 20th century yielded incredible results. An example of Taylor's device is disclosed in U.S. Pat. No. 4,797,563, the entire contents of which are hereby incorporated herein by reference. Taylor's device was able to supply multiple mining operations with electrical energy, compressed air for mining equipment and cooled fresh air for the miners. The system created by Charles Taylor was designed to operate by diverting a large portion of a river into a large hole under the river that was not only over 360 feet deep, but over a 1000' in length. While this system was a success, it involves an expensive and large-scale deployment project, and is limited to use in rivers.

SUMMARY

It is, therefore, one aspect of the present disclosure to provide an improved energy conversion system, method, and device. While embodiments of the present disclosure will generally be described in connection with using the movement of fluid to build pressure in "air", it should be appreciated that the term "air" as used herein refers to any type of gas, combination of gasses, or similar types of materials/compounds. For ease of discussion, the term air and air pressure will be used to describe the creation of a pressure due to the movement of another medium (e.g., a fluid, such as water). Non-limiting examples of materials or compounds that may function like the "air" described herein include: breathable air, oxygen, hydrogen, methane, propane, carbon dioxide, smoke and chemical waste, even vapors, steams and liquids currently in gas form.

Again, for ease of reference, the term "water" will be used to describe any liquid, including molten solids or solids currently in liquid form. Examples include, but are not limited to: water, gasoline, oil, cement, paint, beer, chemicals, sewage, grey water, factory waste liquids, milk, rainfall, soda and virtually any liquid.

Also for ease of reference, the term "Venturi" will be used in this document to describe the capture and retrieval of air from the air inlet pipe(s) and any method used to do so. Examples include, but are not limited to: Venturi, vortex, vacuum, bubble, suction, jet and pump. It should also be appreciated that these terms may be used interchangeably.

For the sake of easy reference, examples referring to "moving water", "moving liquid", "moving water situation" or "moving liquid situation" may also refer to a vessel, ship, boat or craft traveling on or moving through water or liquid (e.g., creating a relative movement of the water to the object).

For the sake of easy reference, the term "pipe" may be used in this document to describe a hose, conduit, duct, flume, channel, race, tube, cable, course, gutter, or any method of transferring air or liquid from one location to another. Again, it should be appreciated that these terms may be used interchangeably without impacting the scope of the present disclosure.

In accordance with at least one embodiment, an energy-conversion device is provided that generally comprises:

a pump comprising a pump inlet and a pump outlet, the pump being configured to move a fluid from the pump inlet to the pump outlet;

a first fluid line attached to the pump inlet;

an air inlet line in fluidic communication with the first fluid line, the air inlet line comprising the ability to pull air into the air inlet line as fluid flows through the first fluid line and then add the air into the first fluid line thereby creating a gas-enhanced fluid;

a second fluid line attached to the pump outlet; and a gas extraction unit attached to the first fluid line or the second fluid line, the gas extraction unit being configured to extract at least some gas from the gas-enhanced fluid in the first fluid line or the second fluid line.

In some embodiments, the gas extraction unit is attached to the first fluid line and extracts the air from the gas-enhanced fluid prior to the first fluid reaching the pump.

In some embodiments, the gas extraction unit is attached to the third fluid line. In further embodiments, the pump may cause the gas-enhanced fluid to at least one of increase pressure and flow rate as compared to the first fluid line.

In some embodiments, the extracted gas in the gas extraction unit is stored in a gas tank and wherein the extracted gas is compressed. In further embodiments, the compressed gas is used to at least one of power gas-powered tools, assist HVAC services, and converted into electrical energy.

In some embodiments, the air inlet line comprises an accelerator that causes the air to enter the air inlet line by induction of at least one of a vacuum effect, jet effect, vortex effect, Venturi effect, pressured differential effect, and/or siphon effect created by the water flowing through the water pipe and into the water tank.

In some embodiments, the air inlet line comprises a diameter that is less than half a diameter of the first fluid line. In further embodiments, the diameter of the air inlet line is also less than half a diameter of the second fluid line.

In some embodiments, the gas extraction unit sits atop either the first fluid line or the second line thereby allowing the gas from the gas-enhanced fluid to naturally separate from fluid as the fluid passes through the first fluid line or the second fluid line.

In accordance with at least some embodiments of the present disclosure, an energy-conversion system configured to utilize fluid falling from an elevated water container is disclosed that generally comprises:

a main fluid line having an inlet, an outlet, and a middle portion therebetween, the inlet being connected to the water container and elevated relative to the outlet such that water from the water container moves from the inlet toward the outlet under the force of gravity;

an air inlet tube having an air inlet, an air outlet, and a middle portion therebetween, the air inlet of the air inlet tube being elevated relative to water contained in the water container, and the air outlet of the air inlet tube extending into the inlet of the main fluid line such that water flowing from the water container and through the main fluid line create a force within the air inlet tube thereby causing air to be introduced into the main fluid line and mix with the water traveling through the middle portion of the main fluid line; and an air capture tank connected to the middle portion of the main fluid line and configured to extract air that has been introduced to the main fluid line from the air inlet tube.

In some embodiments, the air capture tank is positioned on top of the main fluid line such that the air introduced by the air inlet tube is able to rise into the air capture tank while the water passes across the inlets to the air capture tank and through the main fluid line. In further embodiments, the air capture tank comprises a plurality of air inlets at its bottom that connect the air capture tank to the top of the main fluid line.

In some embodiments, the air inlet tube is positioned concentrically within the main fluid line and the air capture tank is positioned along the main fluid line past the air outlet.

In some embodiments, the air inlet is positioned within the water container but above the water line.

In some embodiments, the air inlet is positioned outside of the water container.

In accordance with at least some embodiments of the present disclosure, an energy-conversion system is provided that generally comprises:

a water tank having at least one valve at its top portion and a water exit at its bottom portion thereby allowing water within the water tank to exit the water tank under the force of gravity;

an air capture tank contained within a volume of the water tank and submerged in water contained within the water tank, the air capture tank comprising an open bottom and a closed top that is connected to an air hose; and a water pipe that provides water to the water tank, an outlet of the water pipe being submerged in the water contained within the water tank and also being positioned below the air capture tank, the water pipe further being connected to an air inlet tube that introduces air into the water being carried to the water pipe at a location above the air capture tank such that the air and water both exit the water pipe below the air capture tank and the exiting compressed air is trapped by the air capture tank.

In some embodiments, the at least one valve is switchable between an open and closed state, where the closed state of the at least one valve pressurizes the water tank.

In some embodiments, the air capture tank is fixedly positioned within the water tank whereas, in other embodiments, the air capture tank is not fixedly positioned within the water tank.

In some embodiments, the air capture tank comprises at least one of a pipe and hose that runs directly from the air capture tank and out of the water tank.

In some embodiments, the air inlet tube is positioned at least partially within the water pipe.

In still other embodiments, a system configured to convert potential energy of a fluid into compressed air when the fluid falls from a body of water is provided, the system comprising:

a primary fluid line having a first end, a second end, and a middle portion, the first end being submerged in the body of water and being positioned at a first elevation, the second end being positioned outside the body of water at a second elevation that is lower than the first elevation such that fluid from the body of water is allowed to flow under the force of gravity from the first end to the second end under a siphon force;

an air inlet connected to the middle portion of the primary fluid line and configured to introduce air into the primary fluid line as the water flows through the primary fluid line; and an air capture system attached to a top portion of the primary fluid line between the air inlet and the second end of the primary fluid line such that the air introduced into the primary fluid line by the air inlet can be separated from the water and collected in the air capture system.

In some embodiments, the air inlet introduces air into the primary fluid under a vacuum, vortex, Venturi, and/or siphon force created by the water flowing through the primary fluid line.

In some embodiments, the middle portion of the primary fluid line travels over at least one of a damn and levy that hold the water in the body of water. The body of water may comprise at least one of a lake and reservoir.

In still other embodiments, an energy-conversion system configured to be attached to a hull of a ship is provided, the energy-conversion system comprising:

a first fluid line configured to receive water traveling across the hull as the ship moves through the water;

an air inlet connected to the first fluid line and configured to introduce air into the first fluid line as the water travels through the first fluid line; and an air capture system also connected to the first fluid line and configured to extract at least some of the air introduced into the first fluid line by the air inlet, the air capture system being contained within the hull of the ship.

In some embodiments, the air capture system sits atop the first fluid line and captures air due to natural separation of the air and water.

In some embodiments, some of the air captured by the air capture system may be used as a simple friction reduced for the hull of the ship or boat, where there is simply an air inlet towards the bow of the ship.

In some embodiments, the air captured by the air capture system is used to at least one of power gas-powered tools in the ship, assist HVAC services of the ship, and is converted into electrical energy for use in the ship.

In some embodiments, the air inlet introduces the air into the first fluid line under a vacuum, vortex, Venturi, and/or siphon force created by the water flowing through the first fluid line.

In still other embodiments, an energy-conversion system configured to be placed within a single hole of the ground is provided that generally comprises:

an input line comprising a water inlet positioned above and exposed outside the single hole;

an output line comprising a water outlet also positioned above and exposed outside the single hole, wherein the water outlet is positioned at an elevation lower than the water inlet;

an air inlet configured to enable air to enter the energy-conversion system in response to the water flowing from the water inlet to the water outlet; and an air capture system is positioned at an elevation lower than the water inlet and the water outlet, wherein the conversion mechanism entrains and collects the air introduced to water flowing from the water inlet to the water outlet by the air inlet carries the collected air outside the single hole.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures, which are not necessarily drawn to scale:

FIG. 57A is a top view of a second variation of the system depicted in FIG. 52;

FIG. 57B is a section cut view along line 57-57;

FIG. 58A is a top view of a third variation of the system depicted in FIG. 52;

FIG. 58B is a section cut view along line 58-58;

FIG. 67A is a top view of the system depicted in FIG. 64;

FIG. 67B is a section cut view along line 67-67;

FIG. 68A is a top view of the system depicted in FIG. 64 while in a closed position;

FIG. 68B is a section cut view along line 68-68;

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
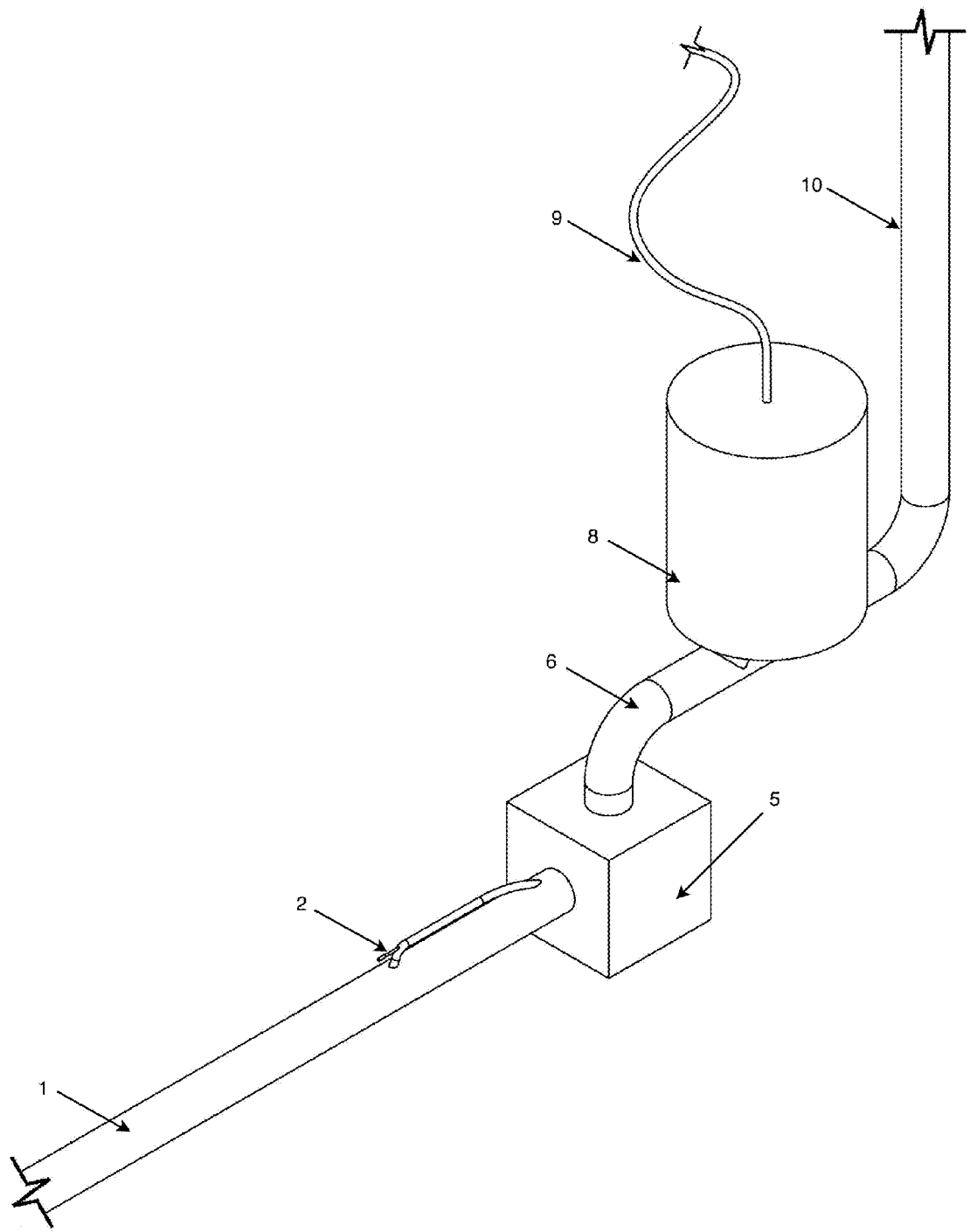
FIG. 1 depicts an isometric view of one example of an energy conversion system in accordance with embodiments of the present disclosure.
Figure 2:
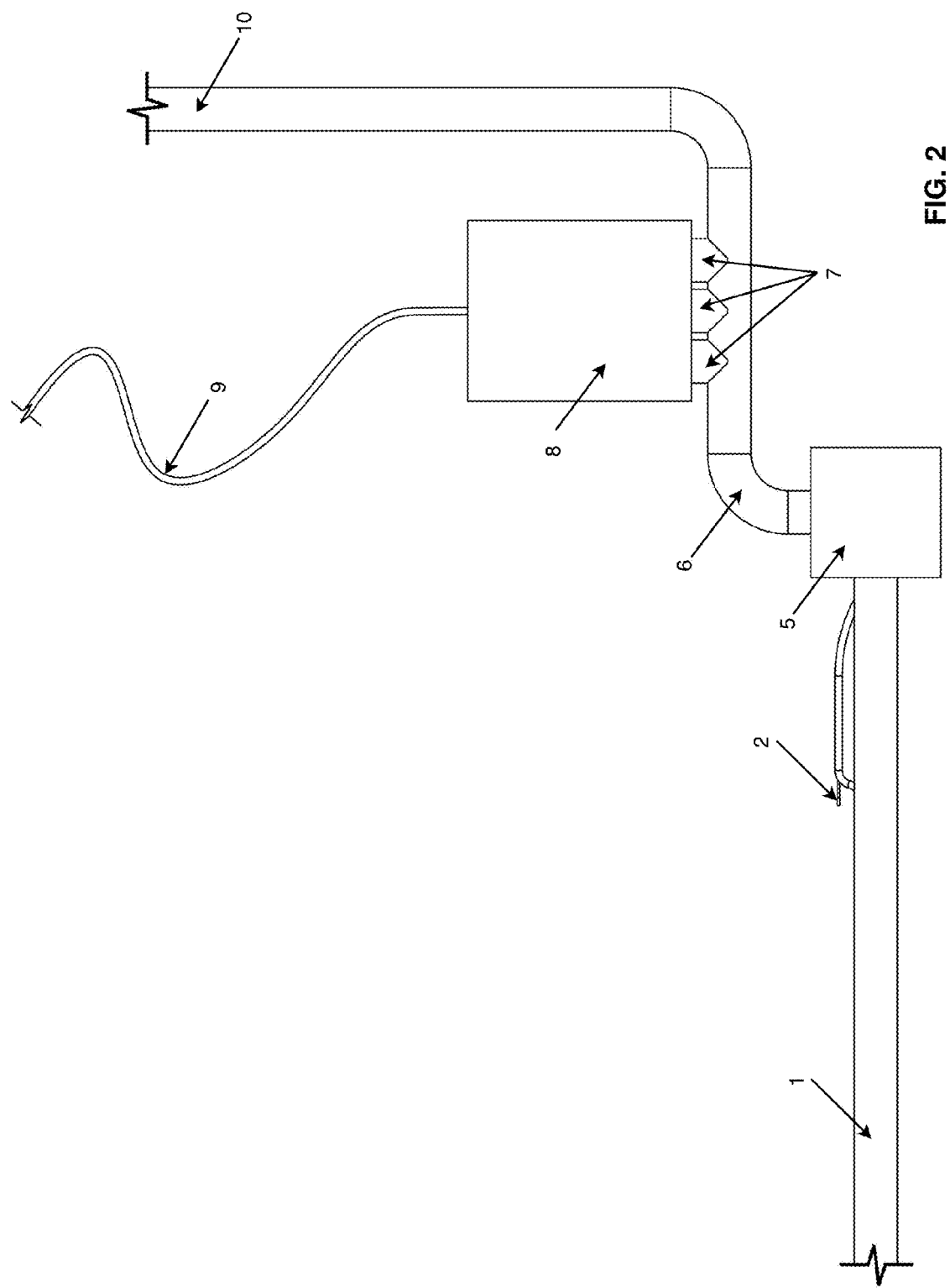
FIG. 2 is a side view of the system depicted in FIG. 1.
Figure 3:
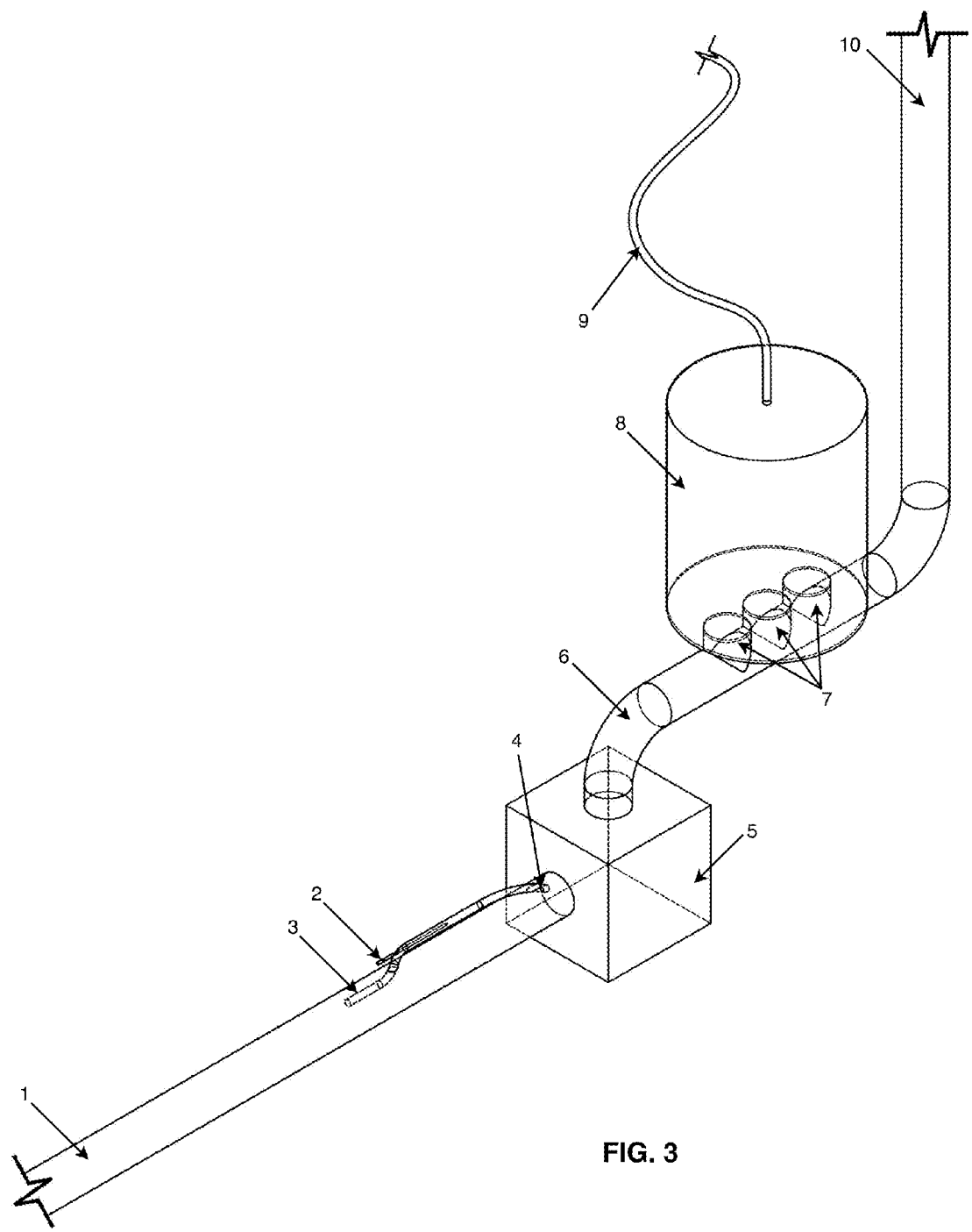
FIG. 3 is a wire frame isometric view of the system depicted in FIG. 1.
Figure 4:
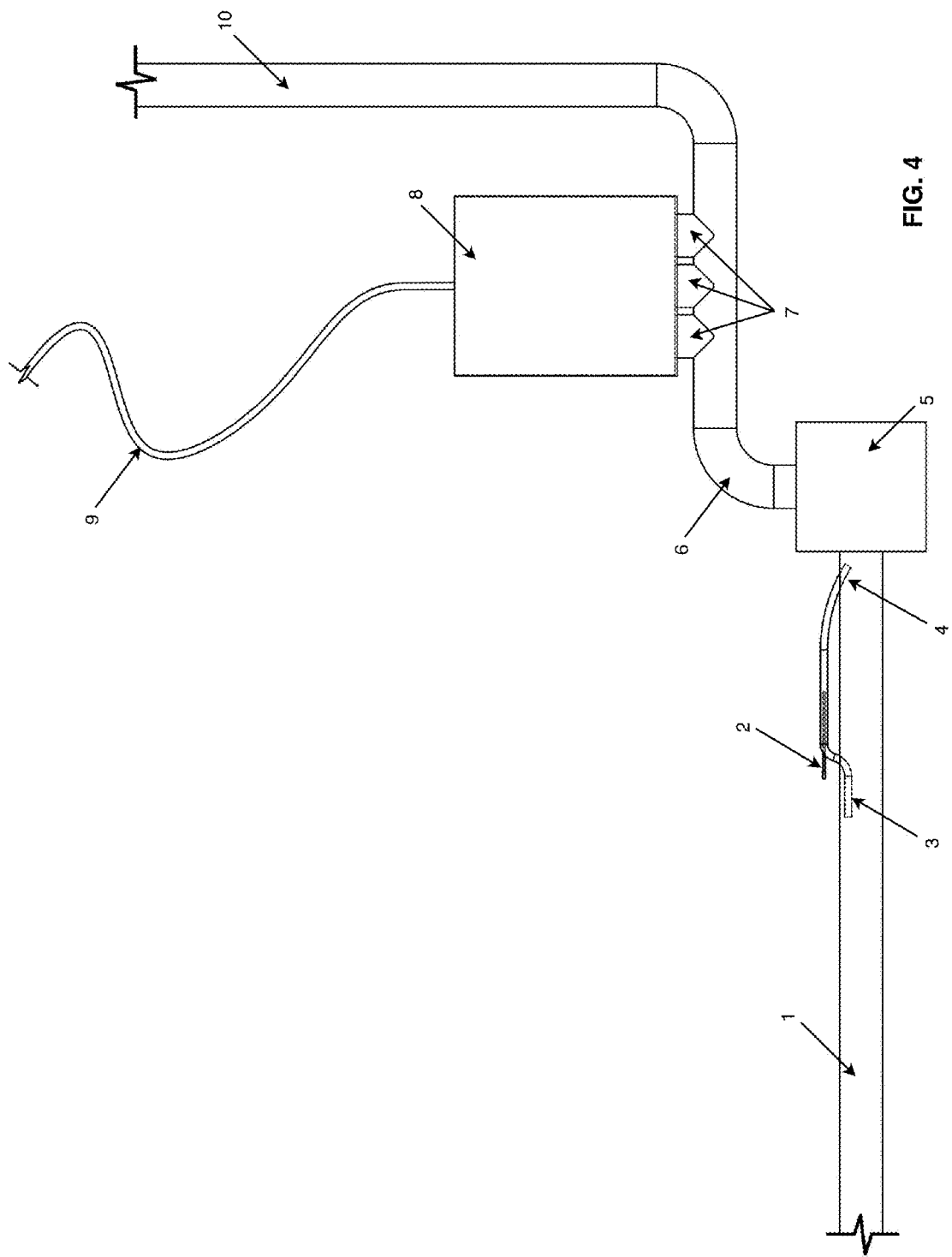
FIG. 4 is a first section cut view of the system depicted in FIG. 1.
Figure 5:
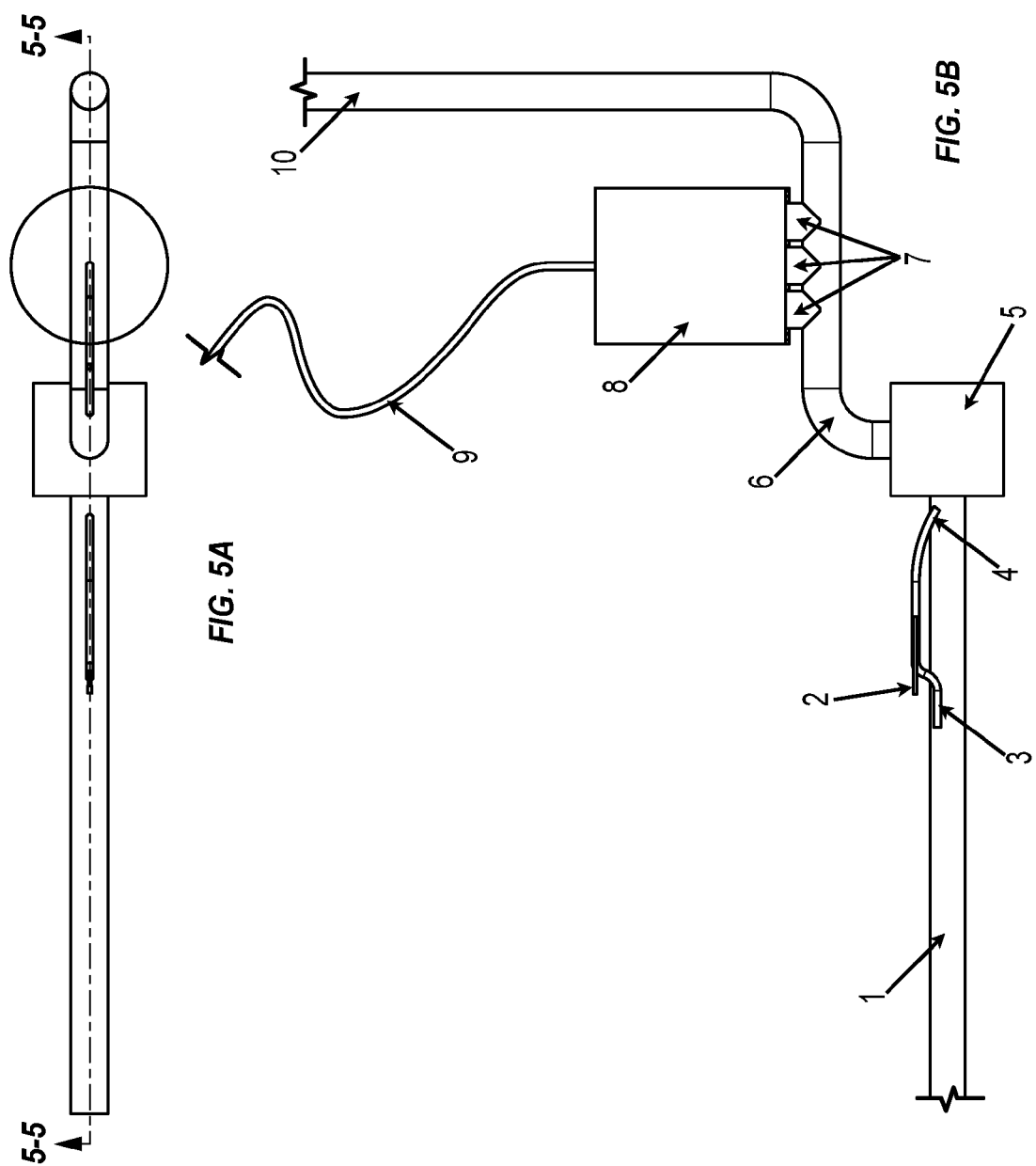
FIG. 5A is a top view of the system depicted in FIG. 1.
FIG. 5B is a cross-sectional view along line 5-5.
Figure 6:
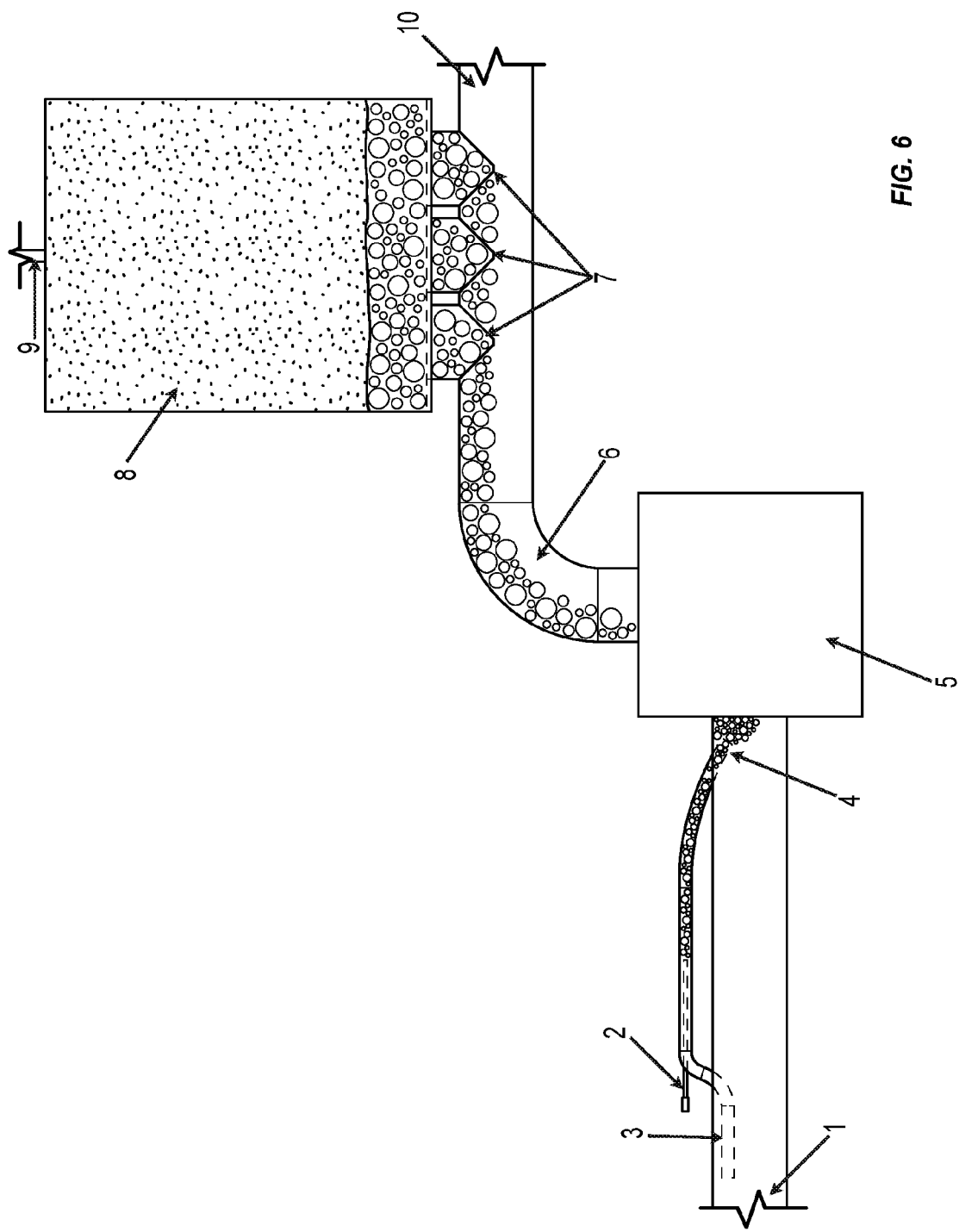
FIG. 6 is a detailed side view of the system depicted in FIG. 1.
Figure 72:
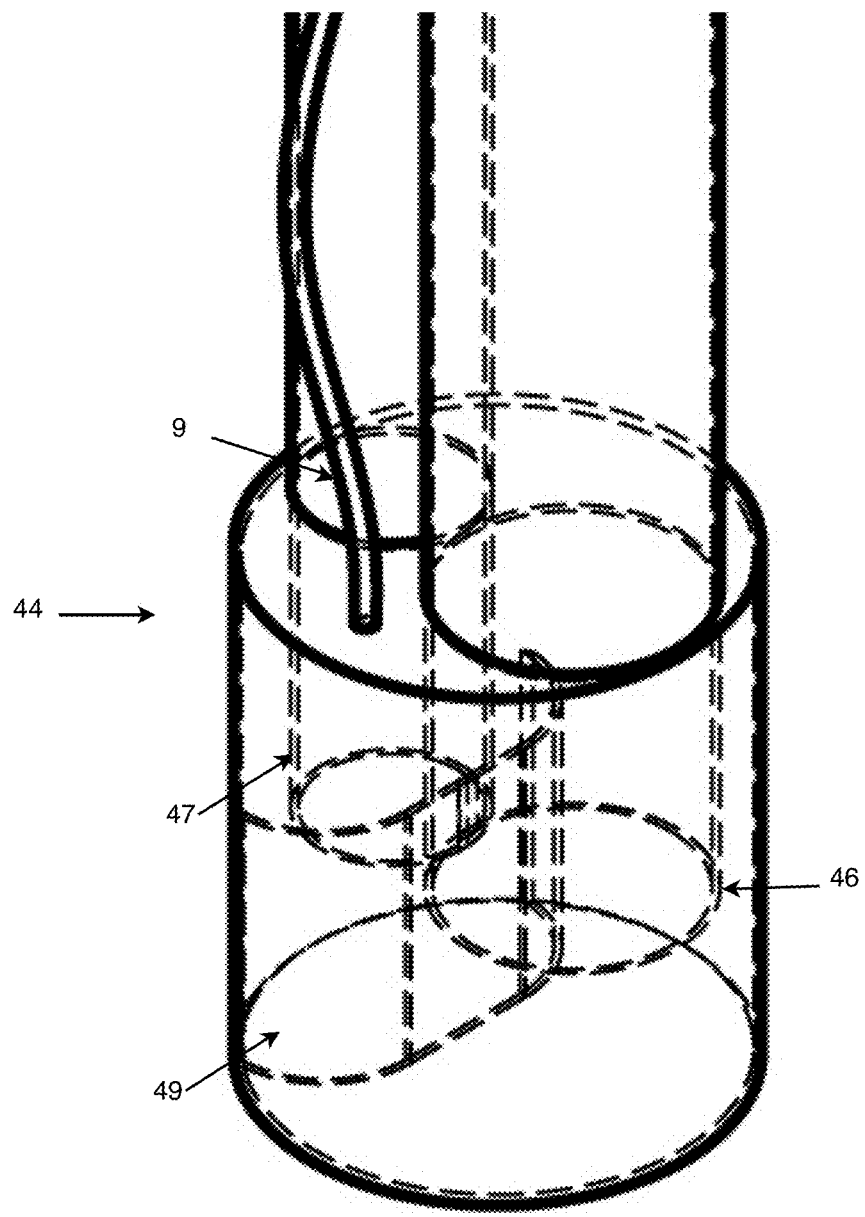
FIG. 72 is a detailed wire frame isometric view of the system depicted in FIG. 70.

With reference now to FIGS. 1-72, energy conversion systems and variants thereof will be described in accordance with at least some embodiments of the present disclosure. It should be appreciated that elements or components from one example of an energy conversion system disclosed herein may be implemented in or used by other examples of energy conversion systems disclosed herein. In other words, the specific examples of energy conversion systems described herein are not limited to the features disclosed for those specific examples. Instead, the elements of any one energy conversion system may incorporate some or all of the individual system elements described herein.

Referring now to FIGS. 1-23, a first set of energy conversion systems in which a pump is utilized to invoke water flow will be described in accordance with embodiments of the present disclosure. It should be appreciated that the pump-based systems described herein may be used to pump water or any other fluid/liquid at water towers, houses with well systems, high-rise buildings, mines, construction sites, factories, irrigation systems, and other facilities or applications that already implement the use of a pump to move a liquid of any kind.

FIGS. 1-6 depict a first example of an energy conversion system in accordance with at least some embodiments of the present disclosure. The energy conversion system is shown to include a main fluid line 1 that provides fluid to a pump 5. The pump 5 operates and moves fluid from the main fluid line 1 to an outlet fluid line 10.

Although the depicted example show the outlet fluid line 10 as including a bend 6, it should be appreciated that the outlet fluid line 10 may be straight and without a bend. As will be discussed in further detail herein, the bend 6 may be provided to help lift air or gas to a top portion of the outlet fluid line 10 thereby making it easier to extract some or all of the air/gas from the fluid in the outlet fluid line 10.

The pump 5 may correspond to any type of pump device (e.g., screw pump, diaphragm pump, axial flow pump, bellows pump, booster pump, canned motor pump, cantilever pump, centrifugal pump, chopper pump, close coupled pump, cryogenic pump, DC powered pump, dosing pump, double diaphragm pump, end suction pump, impeller pump, gear pump, grinder pump, horizontal split case pump, hose pump, hydraulic pump, in-line pump, jet pump, lift station pump, lobe pump, magnetic drive pump, metering pump, peristaltic pump, piston pump, plunger pump, positive displacement pump, progressive cavity pump, reciprocating pump, regenerative turbine pump, rotary pump, self-priming pump, submersible pump, sump pump, triplex pump, turbine pump, vacuum pump, vane pump, vertical pump, and/or the like). In operation, the pump 5 is used to force a flow of fluid from the main fluid line 1 toward the outlet fluid line 10.

In accordance with at least some embodiments, air/gas is introduced to the fluid flowing from the main fluid line 1 toward the outlet fluid line 10. In the example of FIGS. 1-6, an air inlet tube 2 is provided in front of the pump 5 input. In other words, the air inlet tube 2 introduces air/gas to the fluid in the main fluid line 1 due to the motion of the fluid in the main fluid line 1. In accordance with at least some embodiments, the motion of the fluid in the main fluid line 1 across the end of the air inlet tube 2 causes air/gas to be pulled into the main fluid line 1. The force or effect that causes the air to be introduced to the fluid in the main fluid line 1 may include a vacuum effect, jet effect, vortex effect, Venturi effect, pressured differential effect, and/or siphon effect.

FIGS. 3-6 depict the air inlet tube 2 in further detail. In some embodiments, the air inlet tube 2 comprises a fluid accelerator 3 that takes an amount of fluid from the main fluid line 1 and accelerates the fluid while diverting the fluid from the main fluid line 1. The diversion and acceleration of the fluid via the fluid accelerator 3 increases the speed of the water across the end of the air inlet tube 2 that mates with the fluid accelerator 3. As the air is introduced to the air inlet tube 2, the air and fluid combination are brought back down into the main fluid line 1 so that the fluid now traveling in the main fluid line 1 has a combination of fluid and air/gas, where the air/gas was introduced by an outlet 4 of the air inlet tube 2.

This combination of fluid and air/gas is then provided to the pump 5, which draws the fluid and air/gas combination toward the outlet fluid line 10. The fluid and air/gas combination leave the pump 5 at higher pressure then when it entered the pump 5. At this point, the higher-pressure fluid and air/gas combination are moved through the outlet fluid line 10, around the bend 6 and toward an air capture chamber 8. In some embodiments, the air capture chamber 8 may be positioned above the pump 5 so that the air/gas within the fluid and air/gas combination is allowed to rise toward the top of the outlet fluid line 10.

An interface between the outlet fluid line 10 and the air capture chamber 8 may be provided in the form of one or more openings 7. The openings 7 may be positioned at the top of the outlet fluid line 10 so as to enable air/gas to rise and separate from the outlet fluid line 10 up into the air capture chamber 8. The fluid, on the other hand, is allowed to continue flowing through the outlet fluid line 10. Meanwhile, the air/gas captured within the air capture chamber 8 is carried by an air outlet pipe 9 or the like. In some embodiments, the air capture chamber 8 and air outlet pipe 9 may be considered a gas/air extraction unit that is capable of extracting and making use of air/gas extracted from the outlet fluid line 10.

As shown in the depicted example, the outlet fluid line 10 may be positioned on a top portion of the pump 5 and then directed horizontally by the bend 6. In other embodiments, the outlet fluid line 10 may exit the pump 5 in a horizontal position, thereby obviating the need for the bend 6. It should also be appreciated that while a horizontal position of the outlet fluid line 10 may be optimal for air/gas extraction via the openings 7, such a configuration is not required. Instead, the outlet fluid line 10 may be positioned in a non-horizontal configuration (e.g., directed downward or upward) where the openings 7 are positioned. Further still, while FIGS. 1-6 depict the utilization of three openings 7 between the air capture chamber 8 and outlet fluid line 10, it should be appreciated that a greater or fewer number of openings 7 may be utilized.

The air/gas captured by the gas extraction unit 8 and 9 may be used to operate any number of devices such as motors, drills, generators, vehicles, valves, etc. It should also be appreciated that the gas/air captured by the gas extraction unit 8 and 9 can be converted to non-pneumatic forms of energy (e.g., electrical energy) through the use of turbines, pumps, lifts, etc. In some embodiments, the air/gas that is captured in the air capture chamber 8 may be compressed to the same water pressure as is present in the outlet fluid line 10. In other words, if the pump 5 is providing water at a pressure of 90 psi, then the air/gas trapped in the air capture chamber 8 will also be a volume of 90 psi compressed air.

Figure 7:
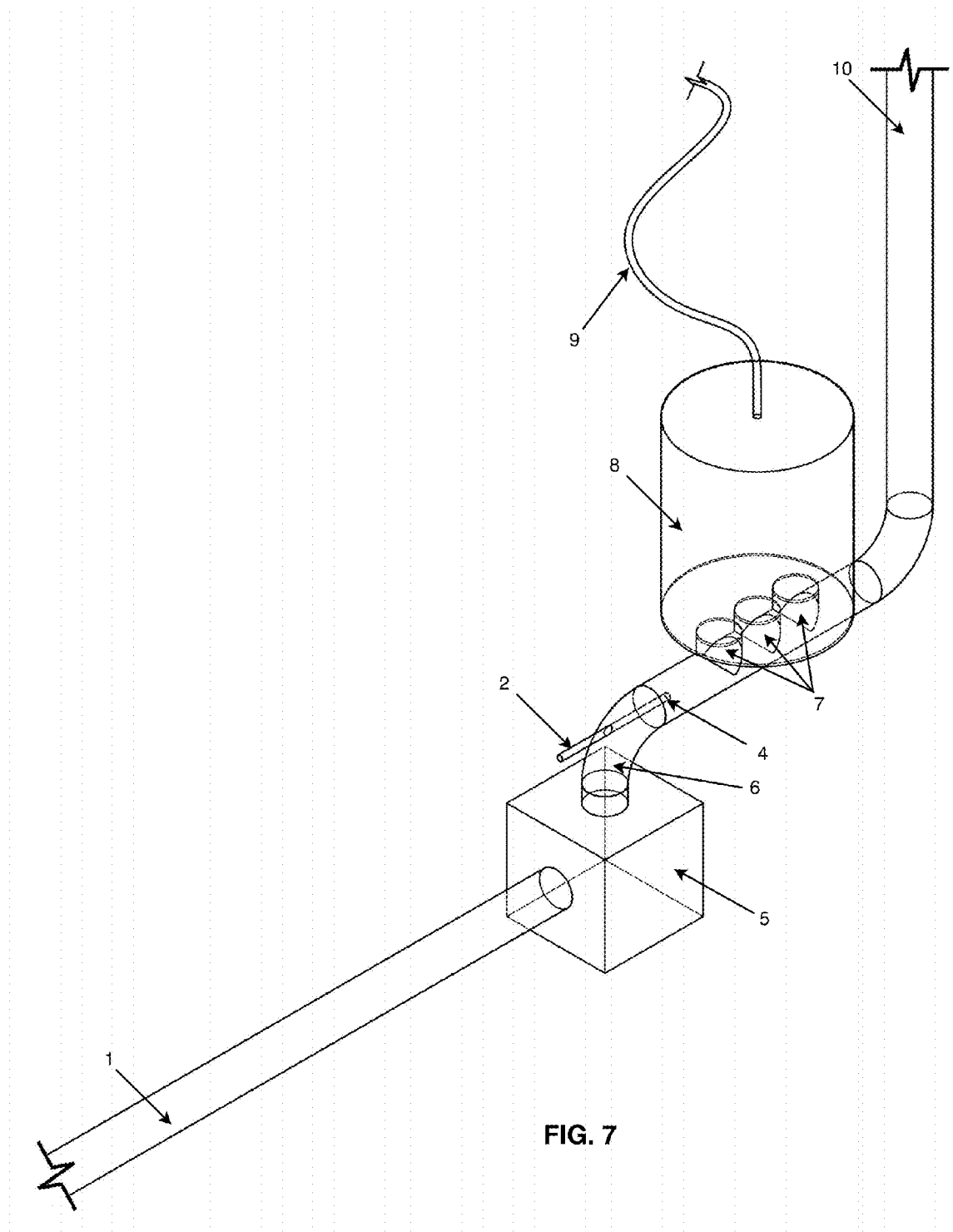
FIG. 7 is a wire frame isometric view of a second example of an energy conversion system in accordance with embodiments of the present disclosure.
Figure 8:
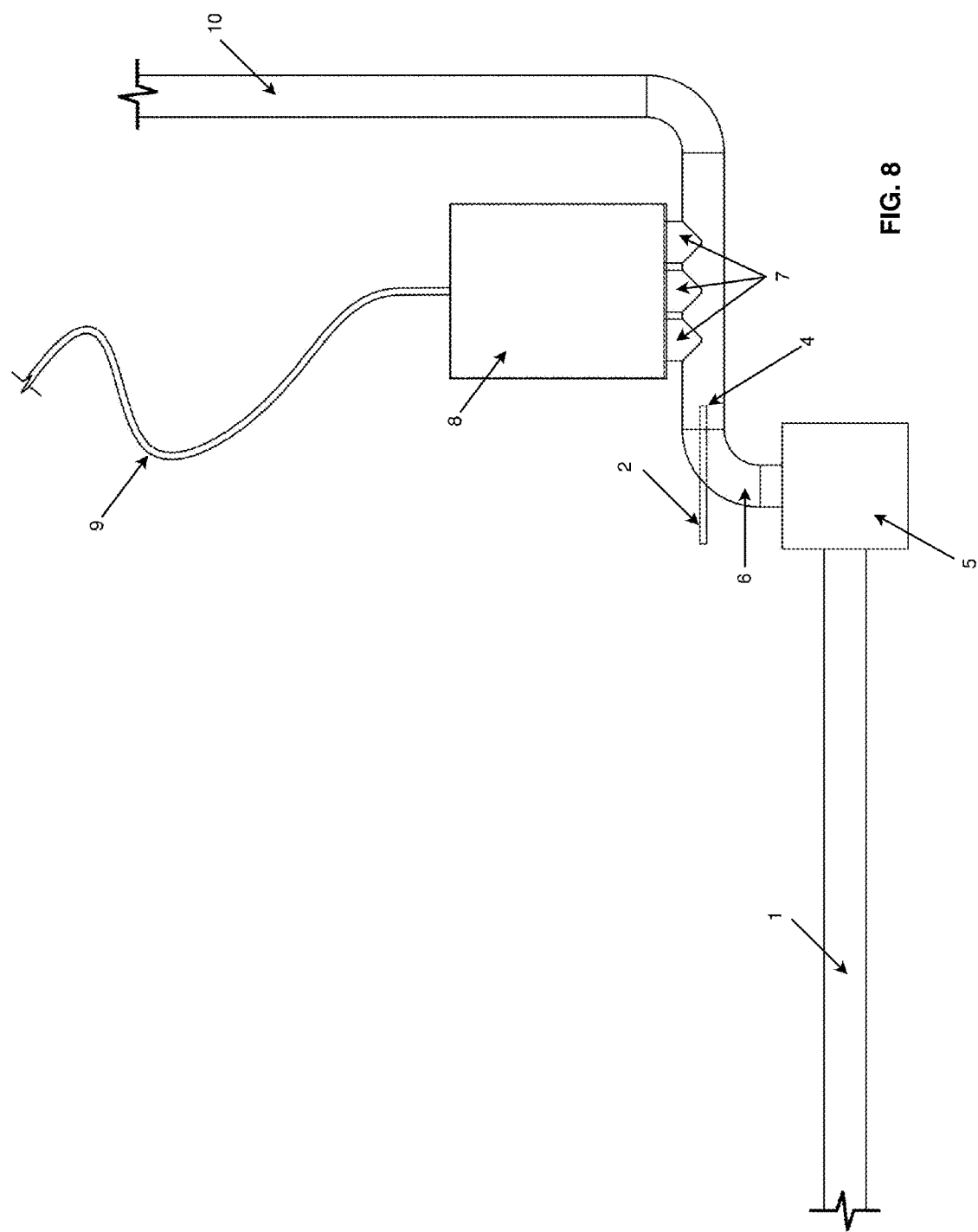
FIG. 8 is a partial section cut view of the system depicted in FIG. 7.
Figure 9:
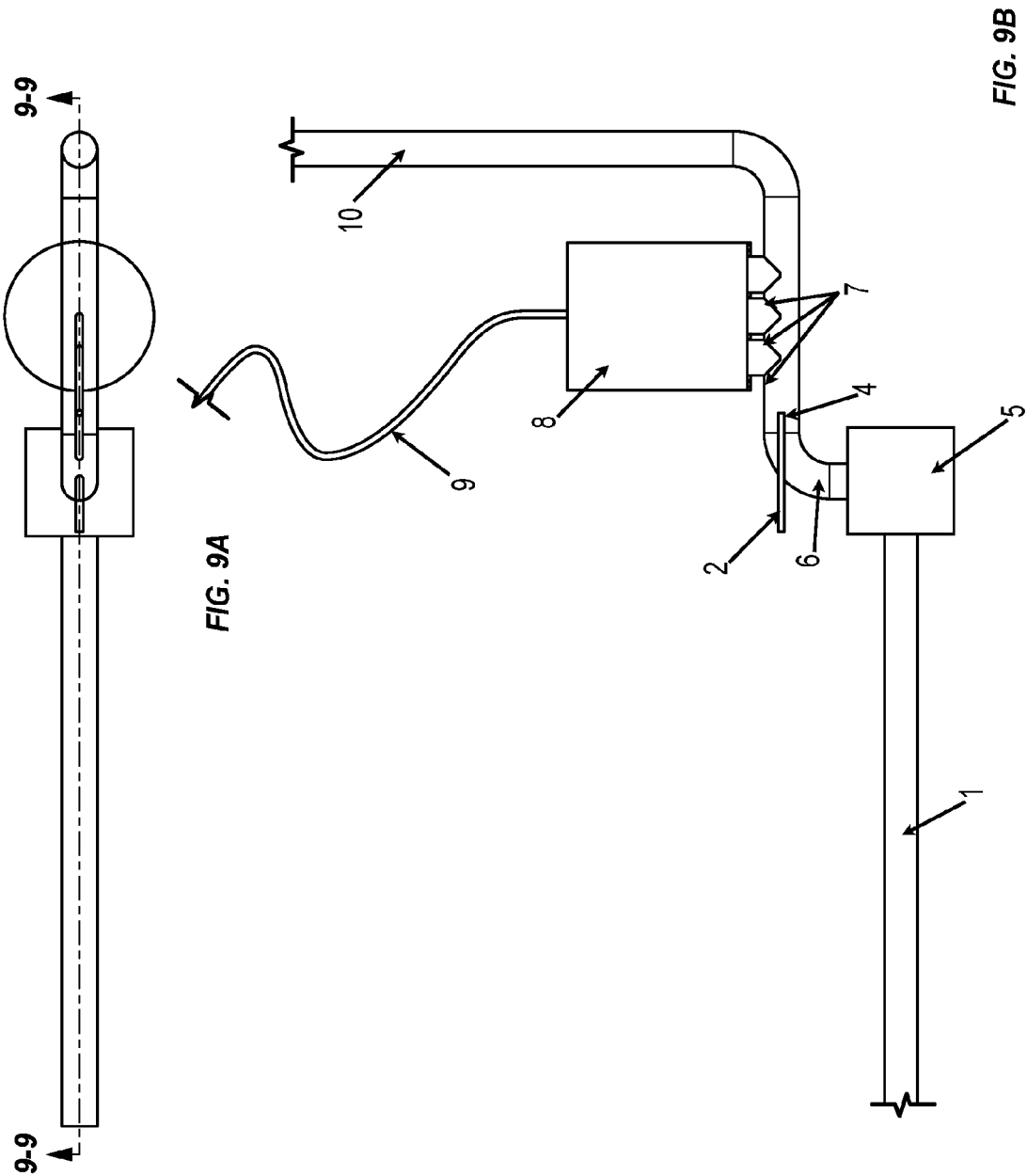
FIG. 9A is a top view of the system depicted in FIG. 7.
FIG. 9B is a cross-sectional view along line 9-9.
Figure 10:
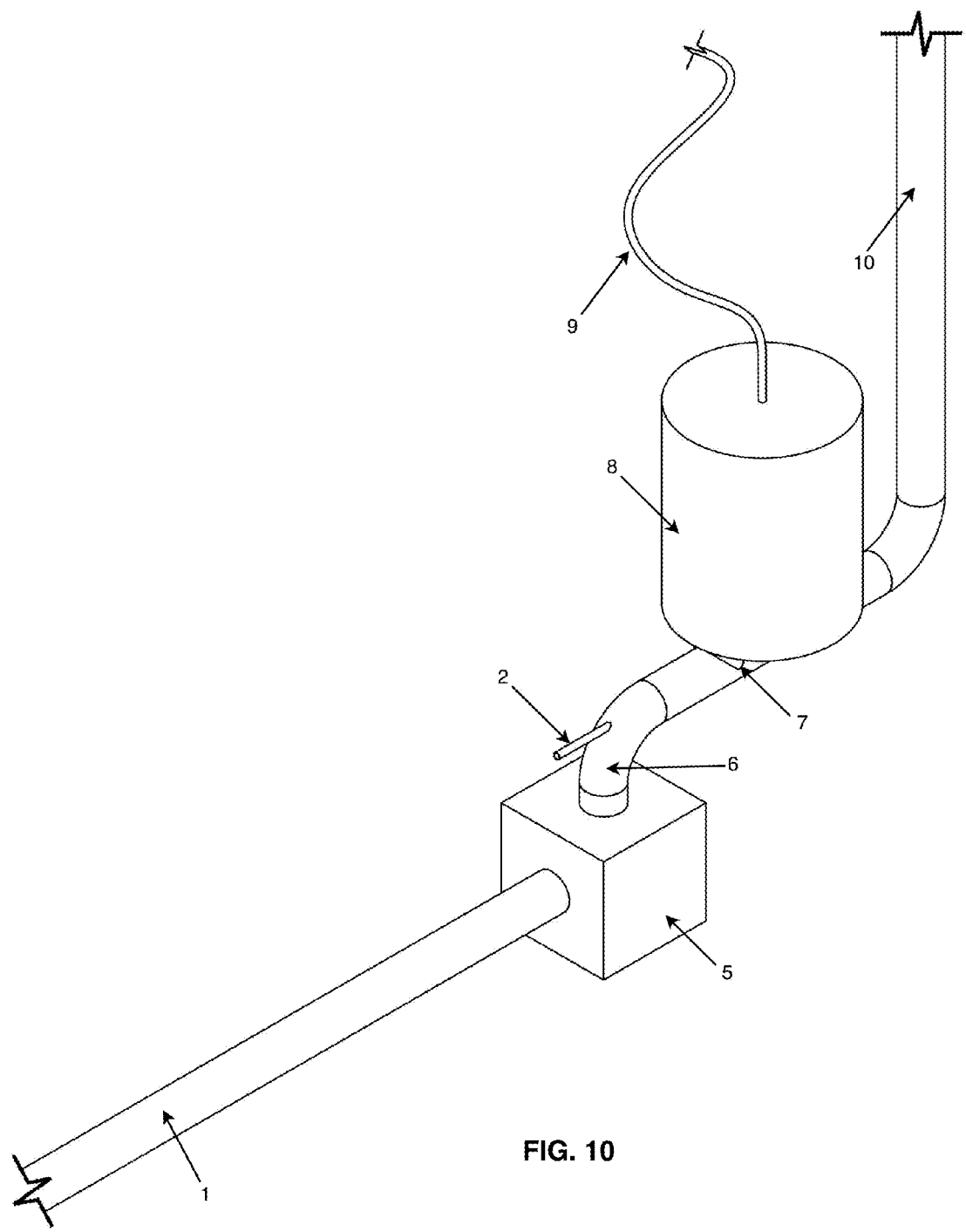
FIG. 10 is an isometric view of a third example of an energy conversion system in accordance with embodiments of the present disclosure.
Figure 11:
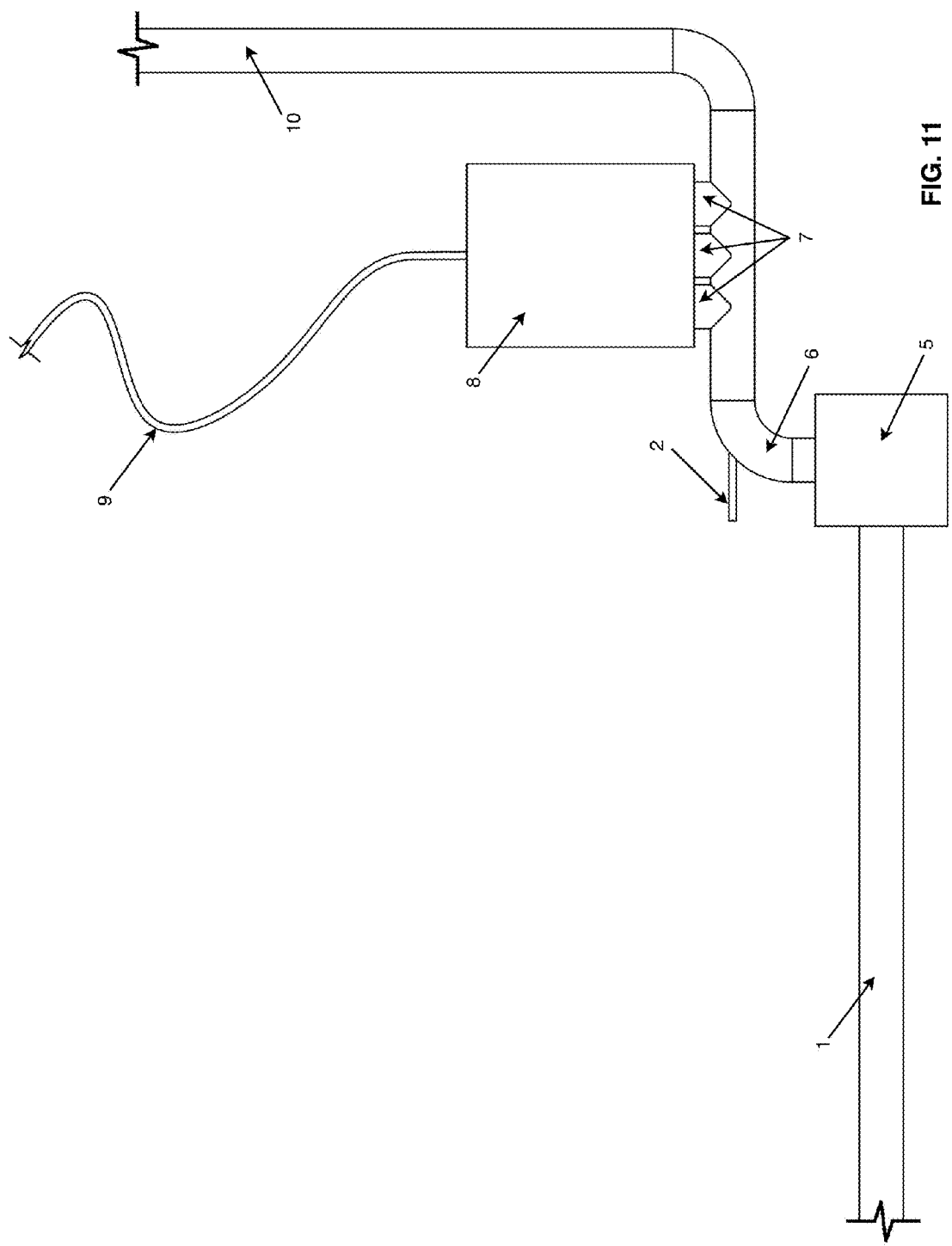
FIG. 11 is a side view of the system depicted in FIG. 10.
Figure 12:
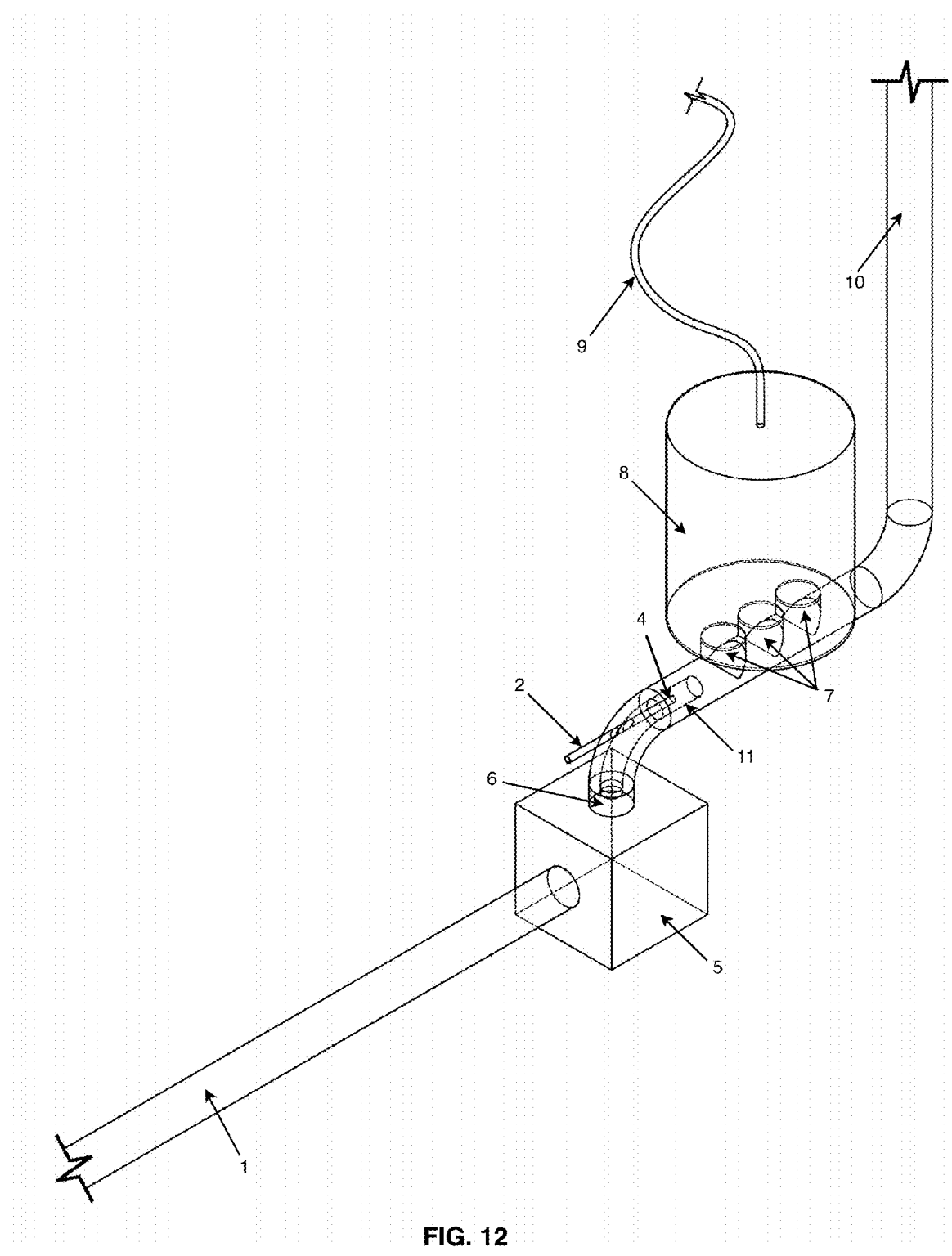
FIG. 12 is a wire frame isometric view of the system depicted in FIG. 10.

With reference now to FIGS. 7-9, a second example of an energy conversion system will be described in accordance with at least some embodiments of the present disclosure. This particular energy conversion system shows a configuration where the air inlet tube 2 is positioned on the outlet side of the pump 5 instead of the inlet side of the pump 5. This particular variation allows the air/gas to enter the fluid between the pump 5 and the air capture chamber 8.

In some embodiments, the air inlet tube 2 corresponds to a simple pipe having an air inlet (exposed to air or gas) and an outlet that is positioned within the outlet fluid line 10. In the depicted embodiment, the air inlet tube 2 is positioned at the bend 6, although such a configuration is not required. As the fluid flows through the outlet fluid line 10, the motion of the fluid across the outlet of the air inlet tube 2 imparts a suction or vacuum force that triggers the flow of air/gas into the air inlet tube 2 and eventually into the outlet fluid line 10. While the location of the air inlet tube 2 is different from the first example system described herein, it should be appreciated that the same or similar forces (e.g., a vacuum effect, jet effect, vortex effect, Venturi effect, pressured differential effect, and/or siphon effect) may invoke the air flow into the air inlet tube 2 and eventually into the outlet fluid line 10.

The gas extraction unit 8 and 9 and the operation thereof may work essentially the same as the gas extraction unit 8 and 9 described in connection with FIGS. 1-6.

Figure 13:
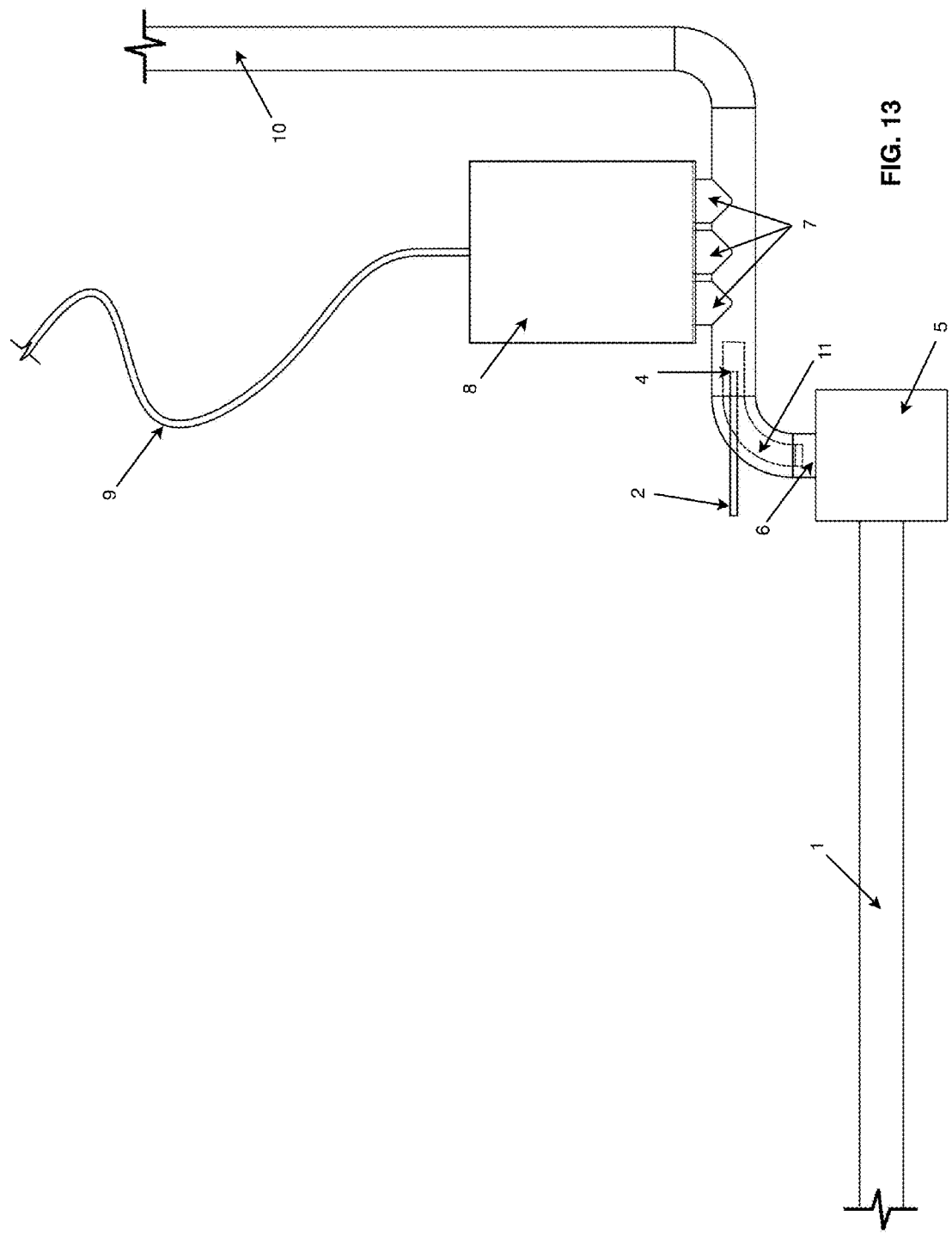
FIG. 13 is a partial section cut view of the system depicted in FIG. 10.

With reference now to FIGS. 10-13, a third example of an energy conversion system will be described in accordance with at least some embodiments of the present disclosure. This particular example of an energy conversion system shows a slightly modified air inlet tube 2. As best depicted in FIG. 13, the air inlet tube 2 comprises a multi-layered Venturi or vortex to accomplish the task of introducing the air/gas into the fluid line with a pressure of almost 0 psi, where the outlet fluid line 10 has a pressure other than 0 psi (e.g., 30 psi or more).

In some embodiments, the air inlet tube 2 uses the Venturi principle to bring air into the tube, then uses the Venturi principle again to further compress the air/gas before the air/gas enters the outlet fluid line 10. Much like the system described in connection with FIGS. 1-6, a fluid accelerator 11 is used to accelerate the fluid flowing through the fluid accelerator 11 relative to the fluid flowing through the outlet fluid line 10. The accelerated fluid flows across the opening of the air inlet tube 2 and pulls the air/gas into the fluid accelerator 11. This combination of fluid and air/gas is then pulled into the outlet fluid line 10, such that air/gas is introduced into the outlet fluid line 10 before the openings 7 of the air capture chamber 8. While only a single accelerator pipe 11 is depicted in FIGS. 10-13, it should be appreciated that multiple layers of the pipe (e.g., multiple accelerator pipes 11) can be used to compress the air/gas as desired.

Figure 14:
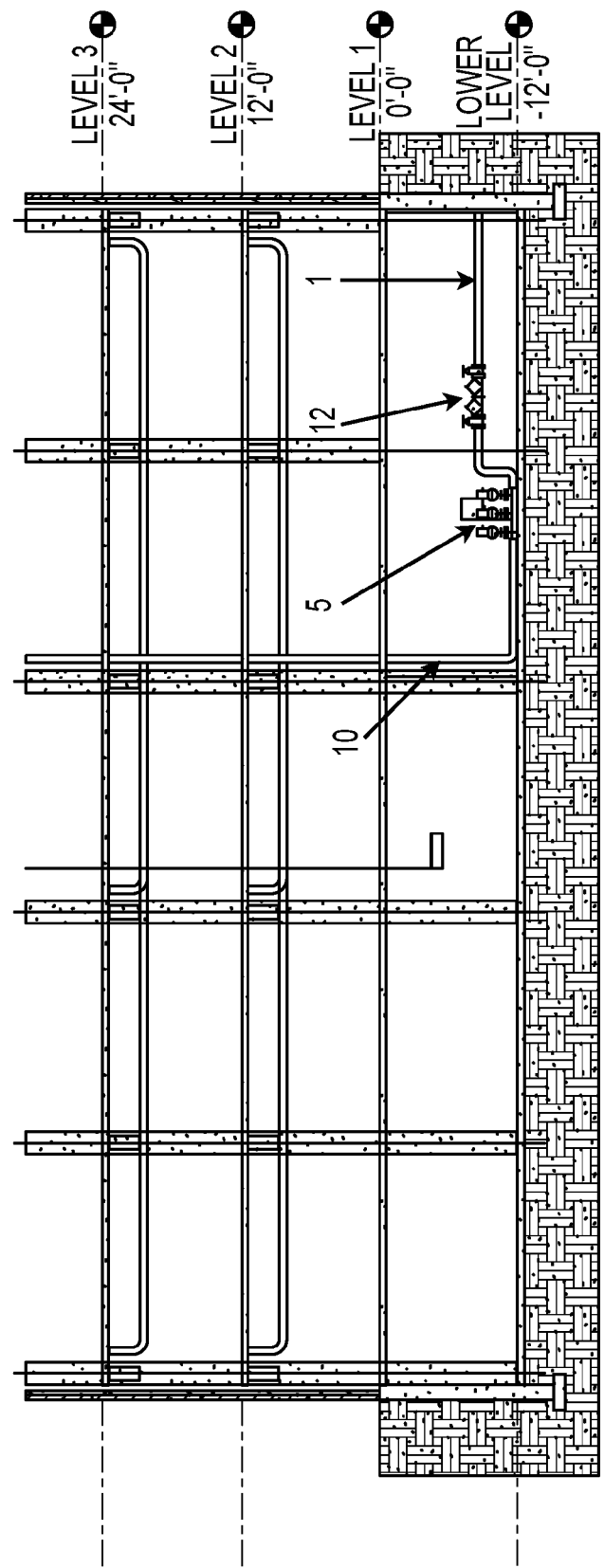
FIG. 14 is a side view of a building and pump room in accordance with embodiments of the present disclosure.
Figure 15:
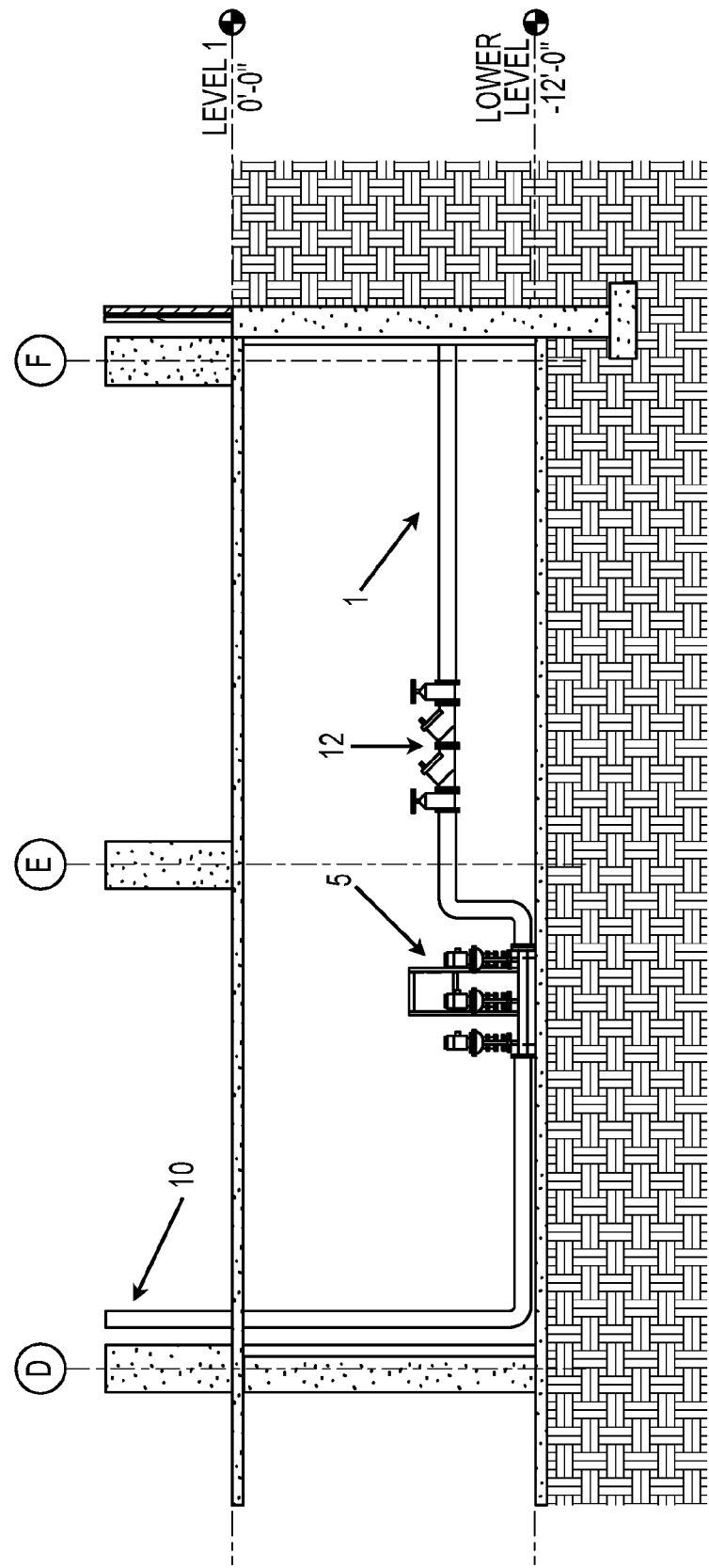
FIG. 15 is a zoom section cut view of a pump room in a building without an energy conversion system.
Figure 16:
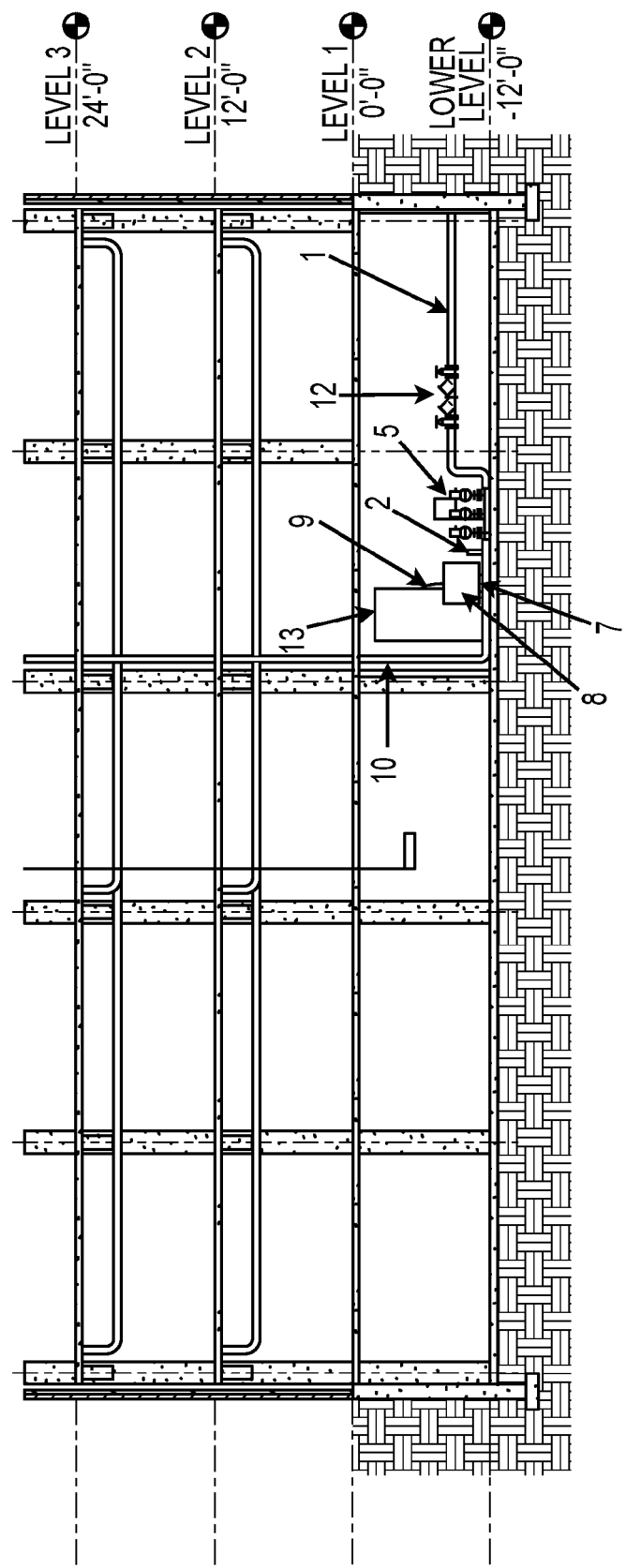
FIG. 16 is a section cut view of a fourth example of an energy conversion system in accordance with embodiments of the present disclosure.
Figure 17:
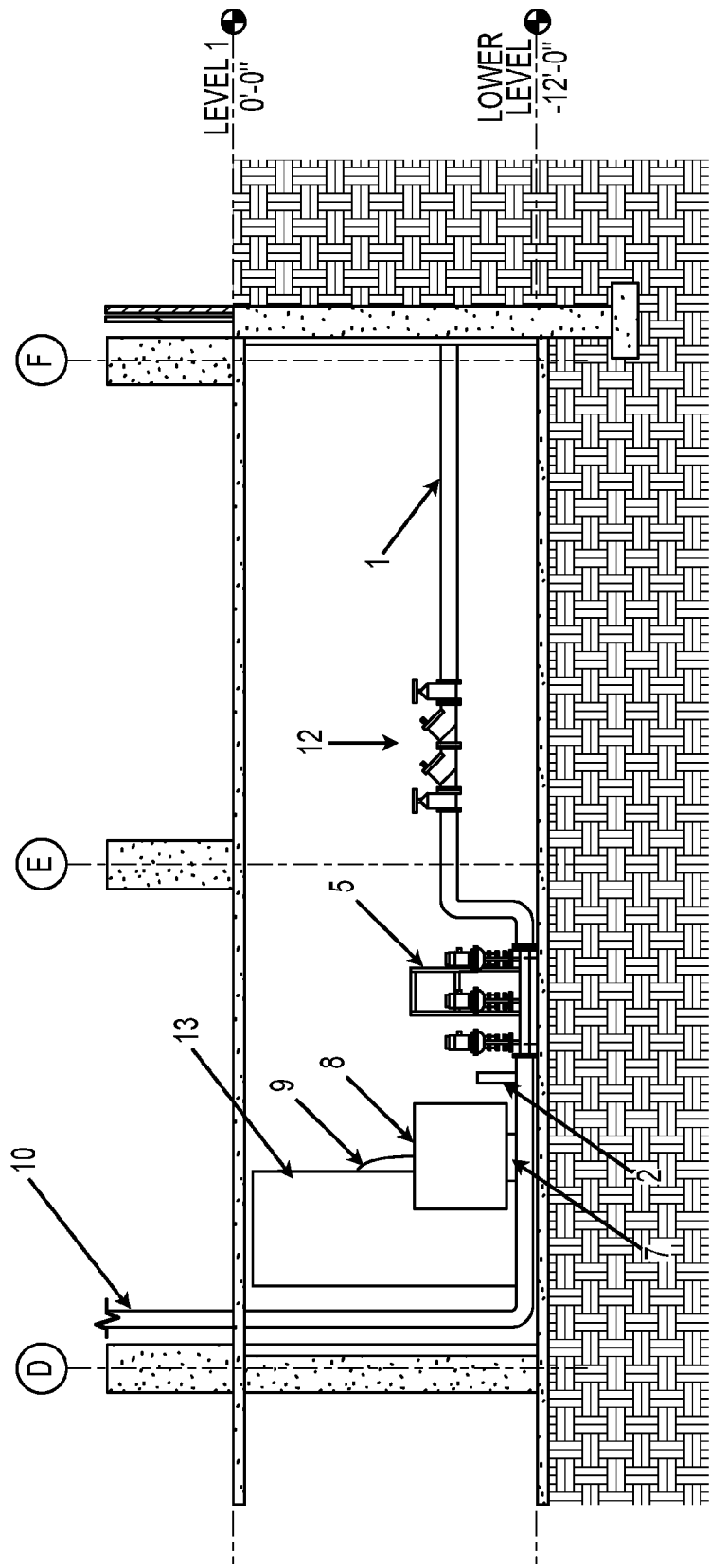
FIG. 17 is a zoom section cut view of a pump room with an energy conversion system in accordance with embodiments of the present disclosure.
Figure 18:
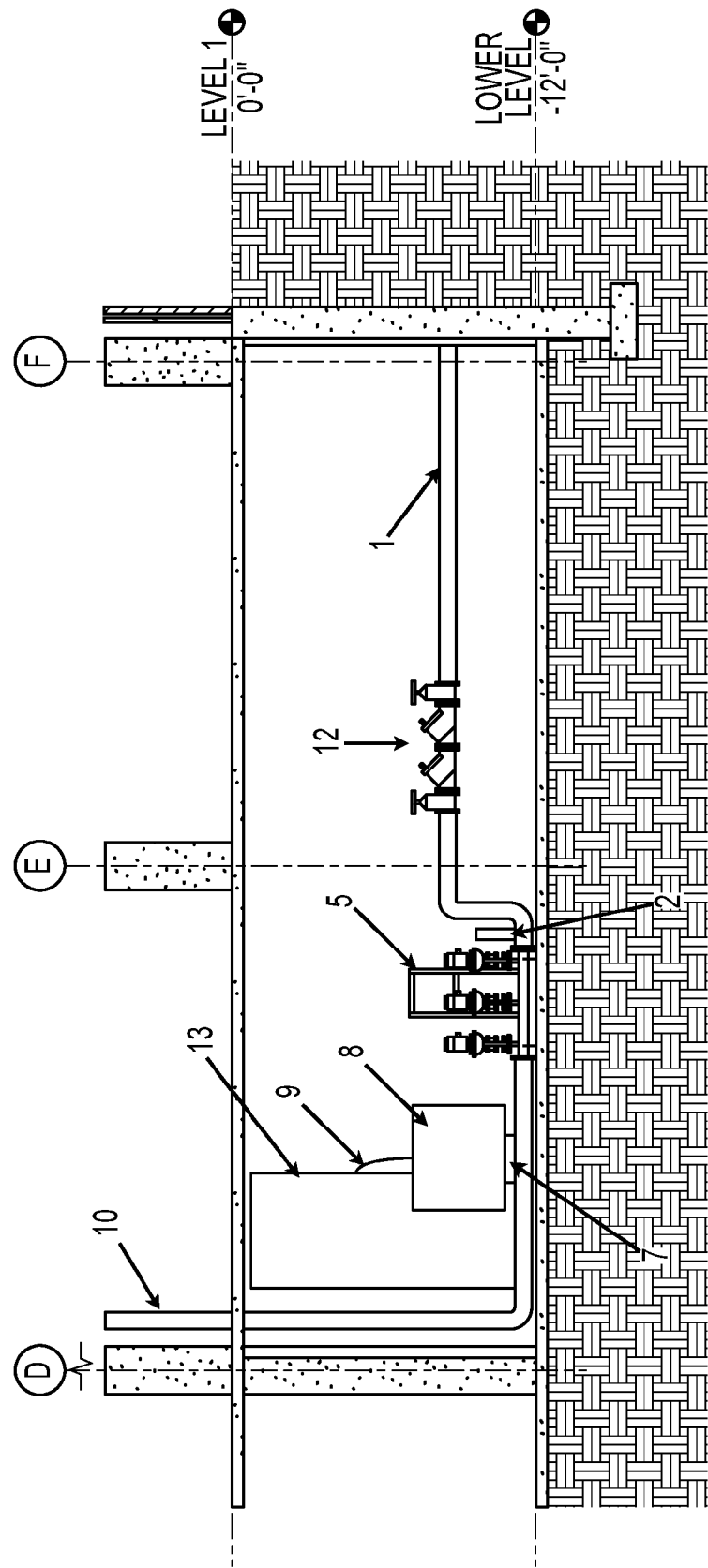
FIG. 18 is a zoom section cut view of a pump room with another energy conversion system in accordance with embodiments of the present disclosure.
Figure 19:
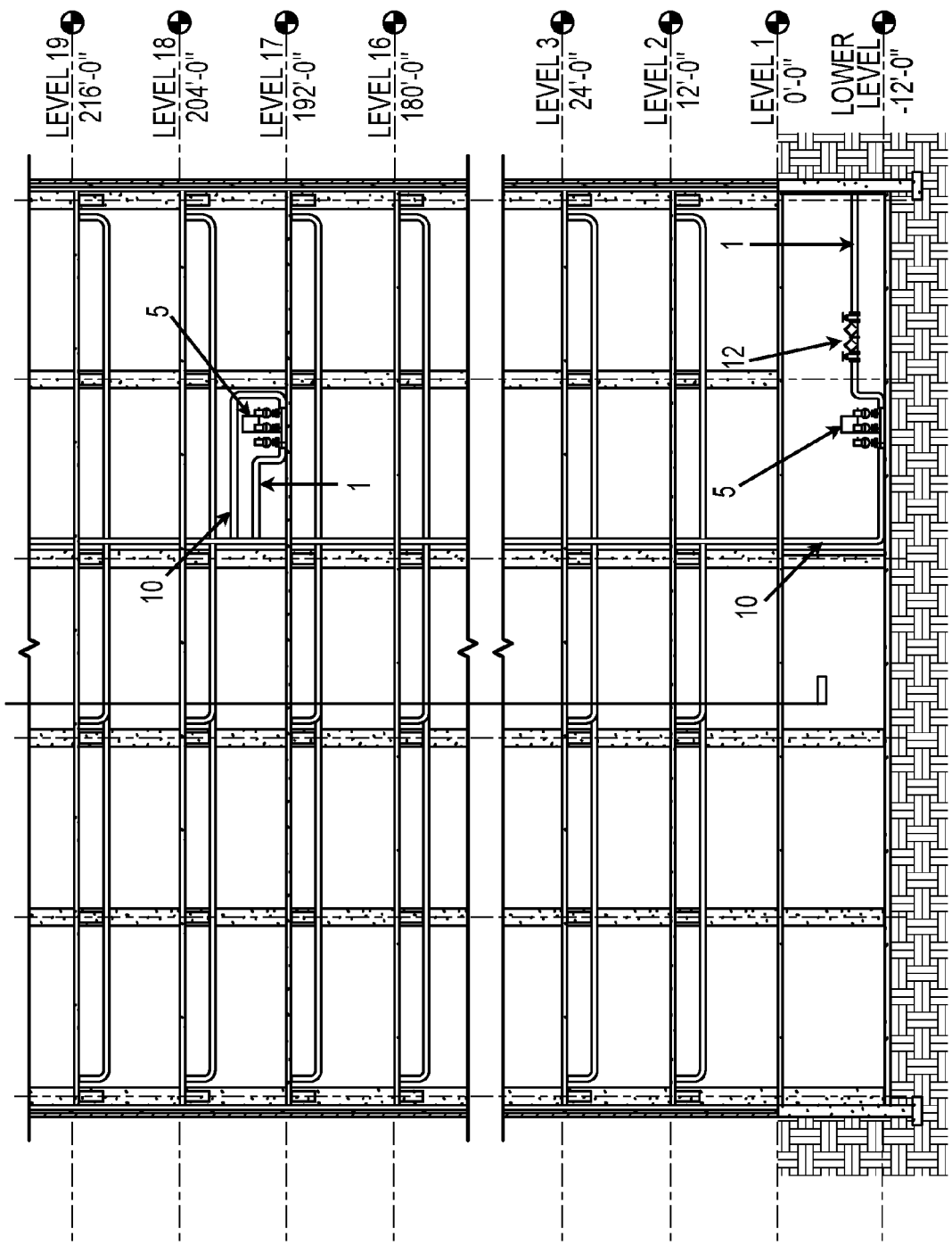
FIG. 19 is a section cut view of a building having multiple pump rooms.
Figure 20:
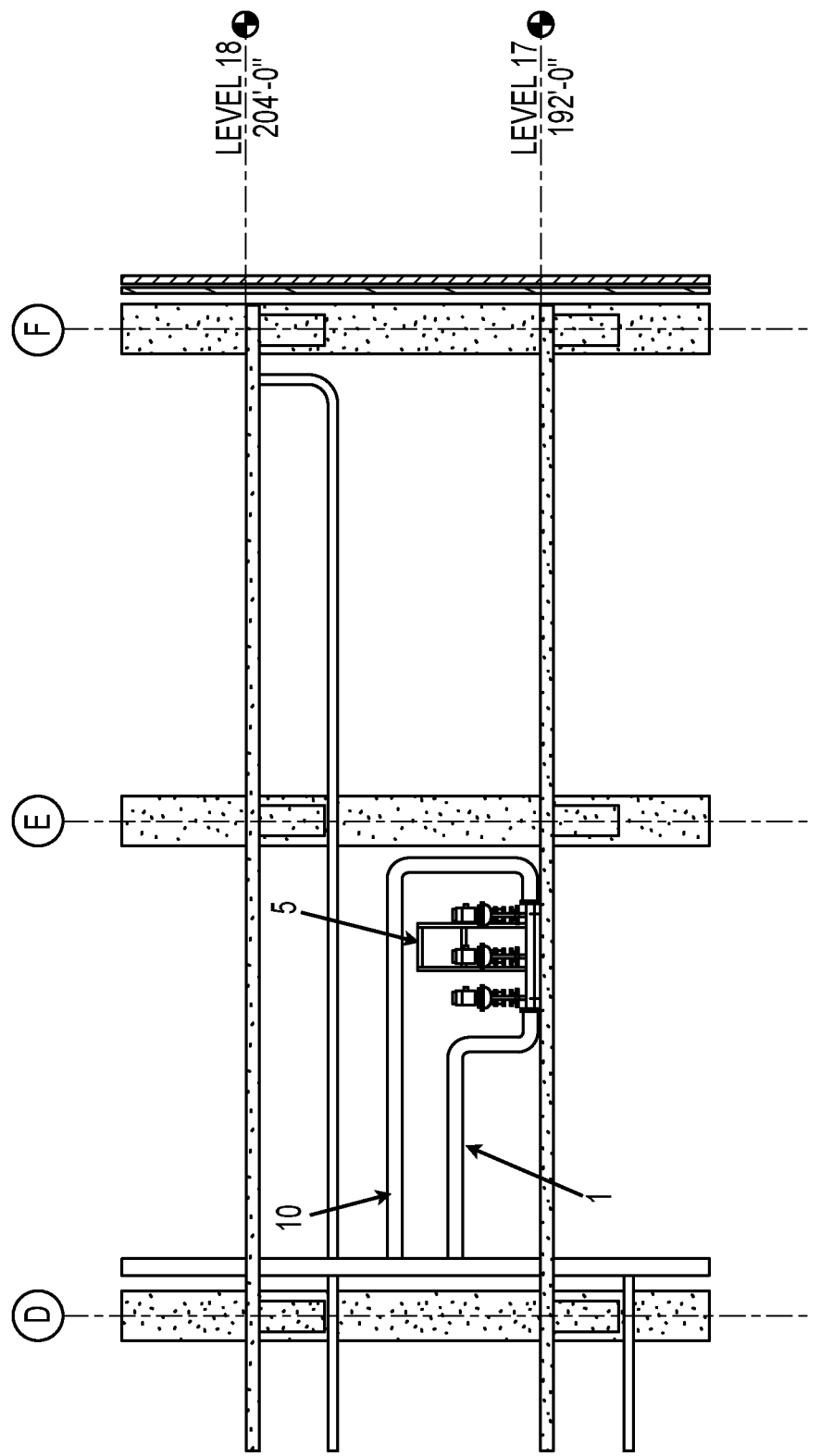
FIG. 20 is a zoom section cut view of an additional pump room in a high-rise building.
Figure 21:
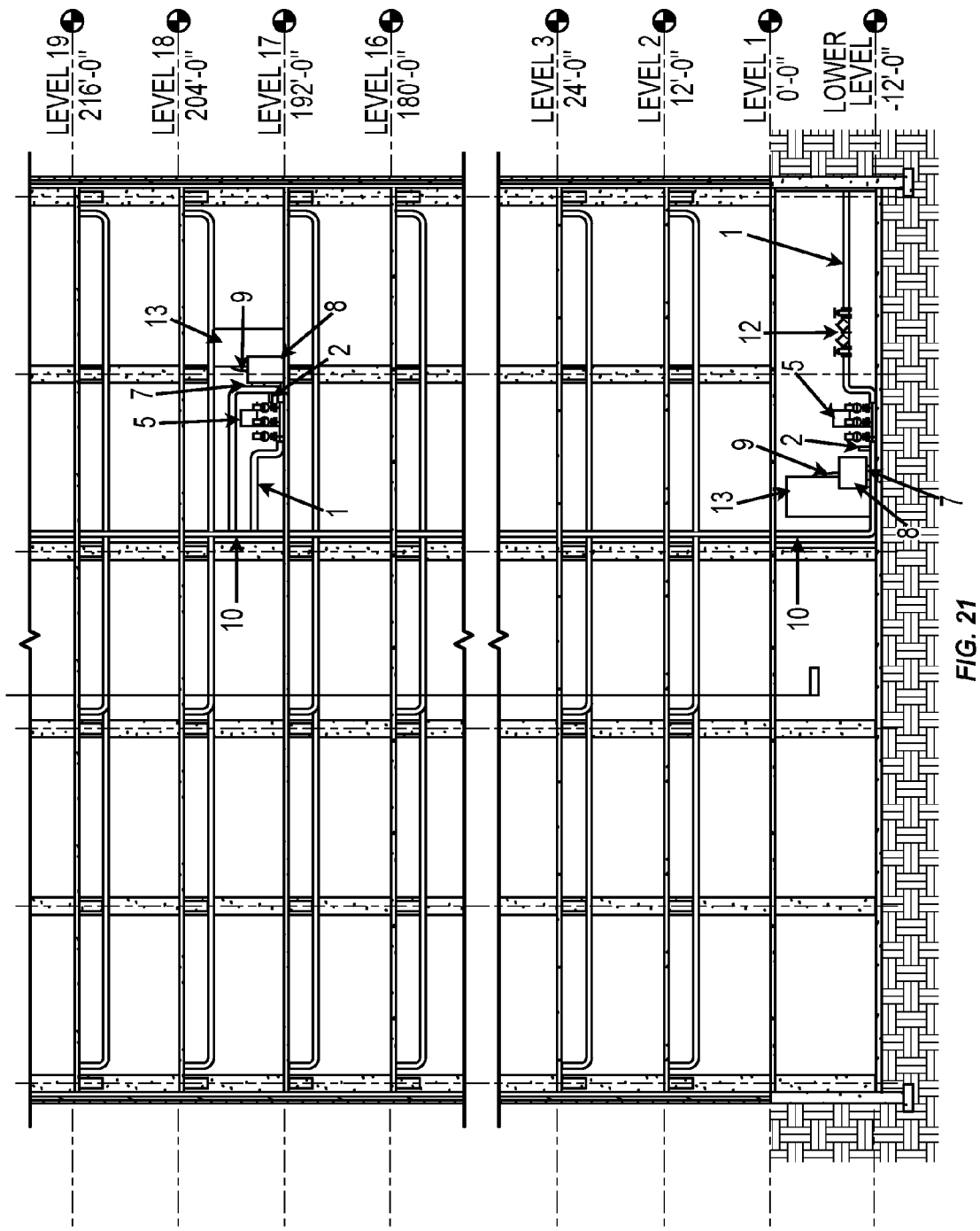
FIG. 21 is a section cut view of a building with multiple pump rooms and multiple energy conversion systems in accordance with embodiments of the present disclosure.
Figure 22:
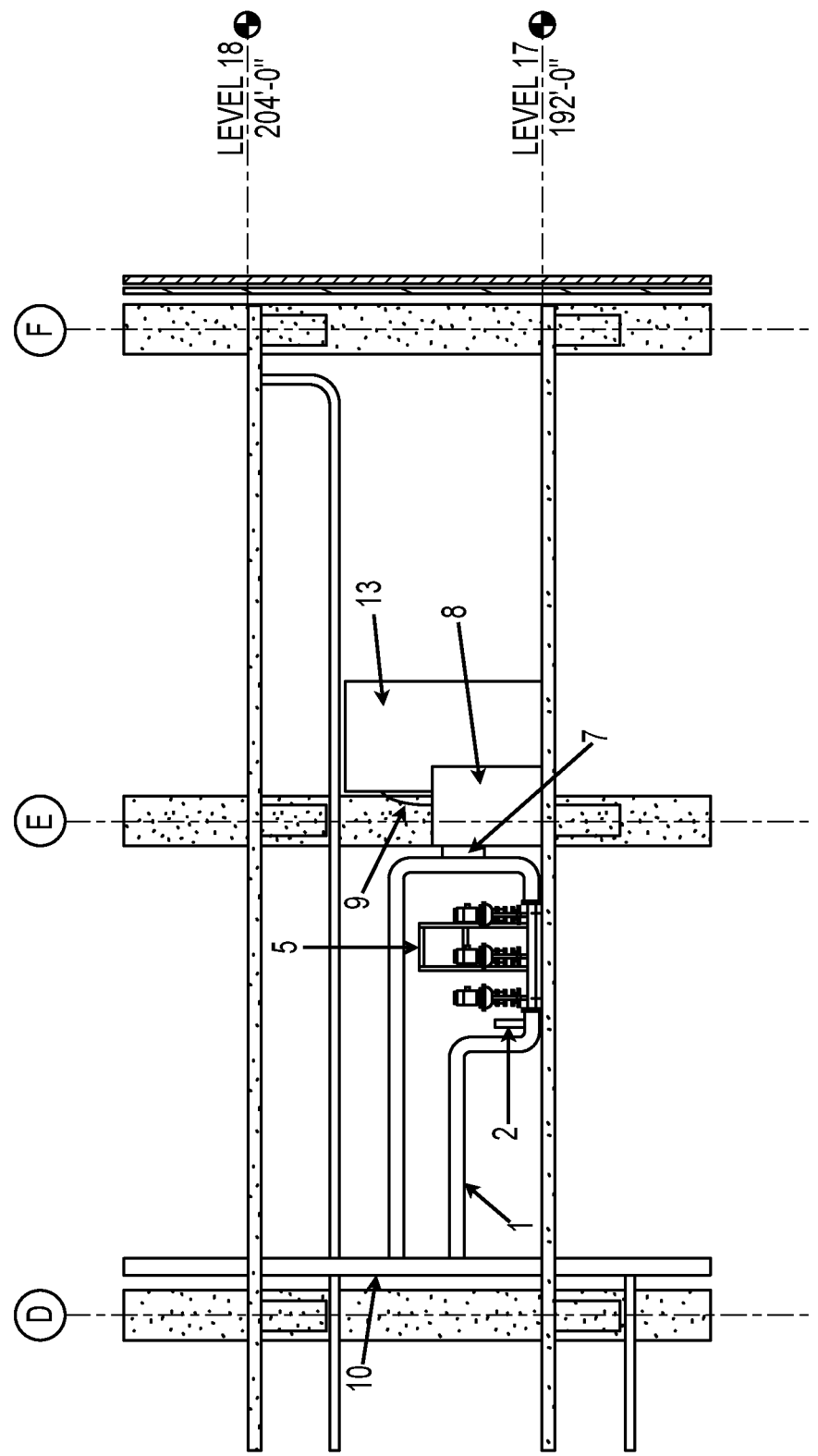
FIG. 22 is a zoom section cut view of an additional pump room with one example of an energy conversion system in accordance with embodiments of the present disclosure.
Figure 23:
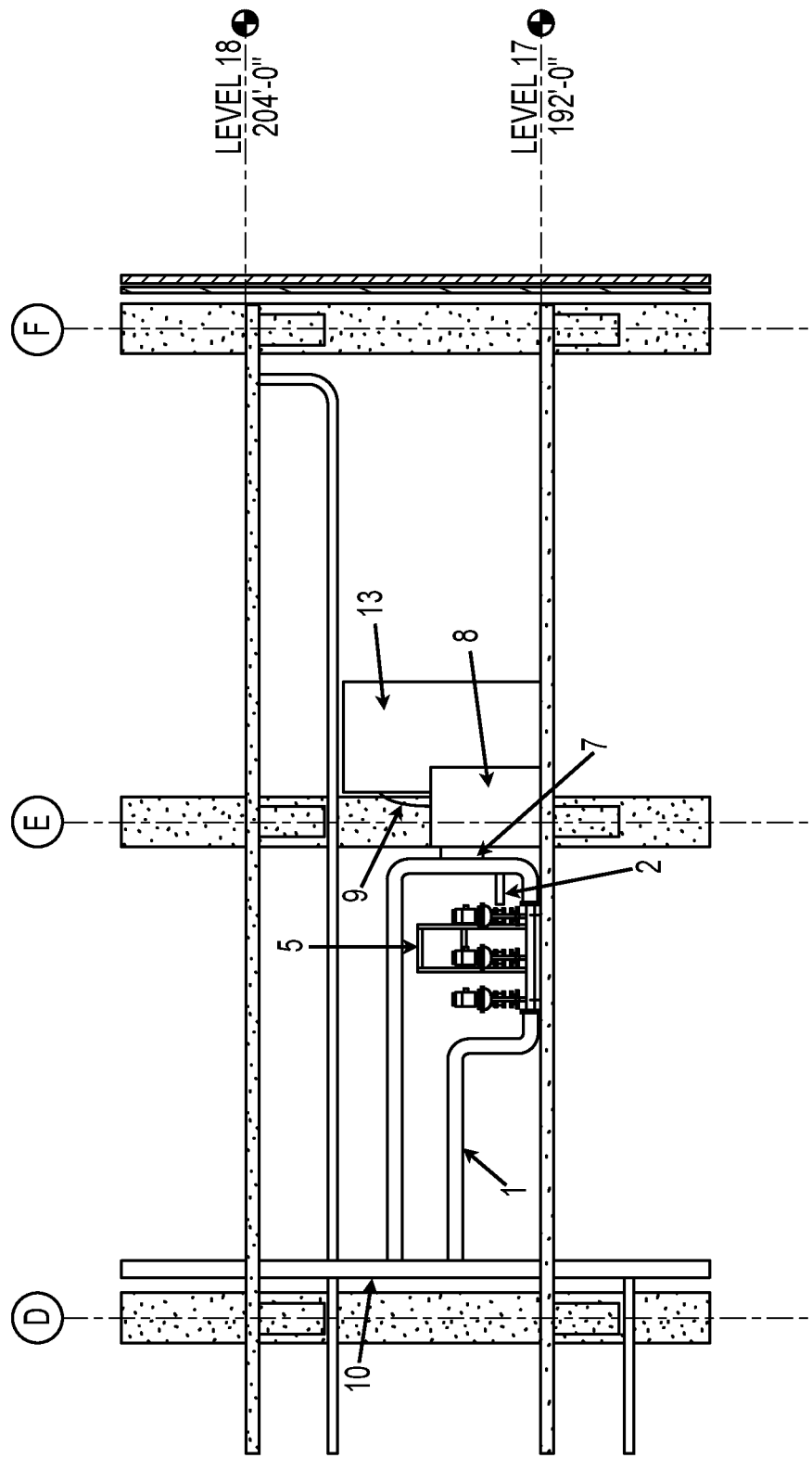
FIG. 23 is a zoom section cut view of an additional pump room with another example of an energy conversion system in accordance with embodiments of the present disclosure.
Figure 24:
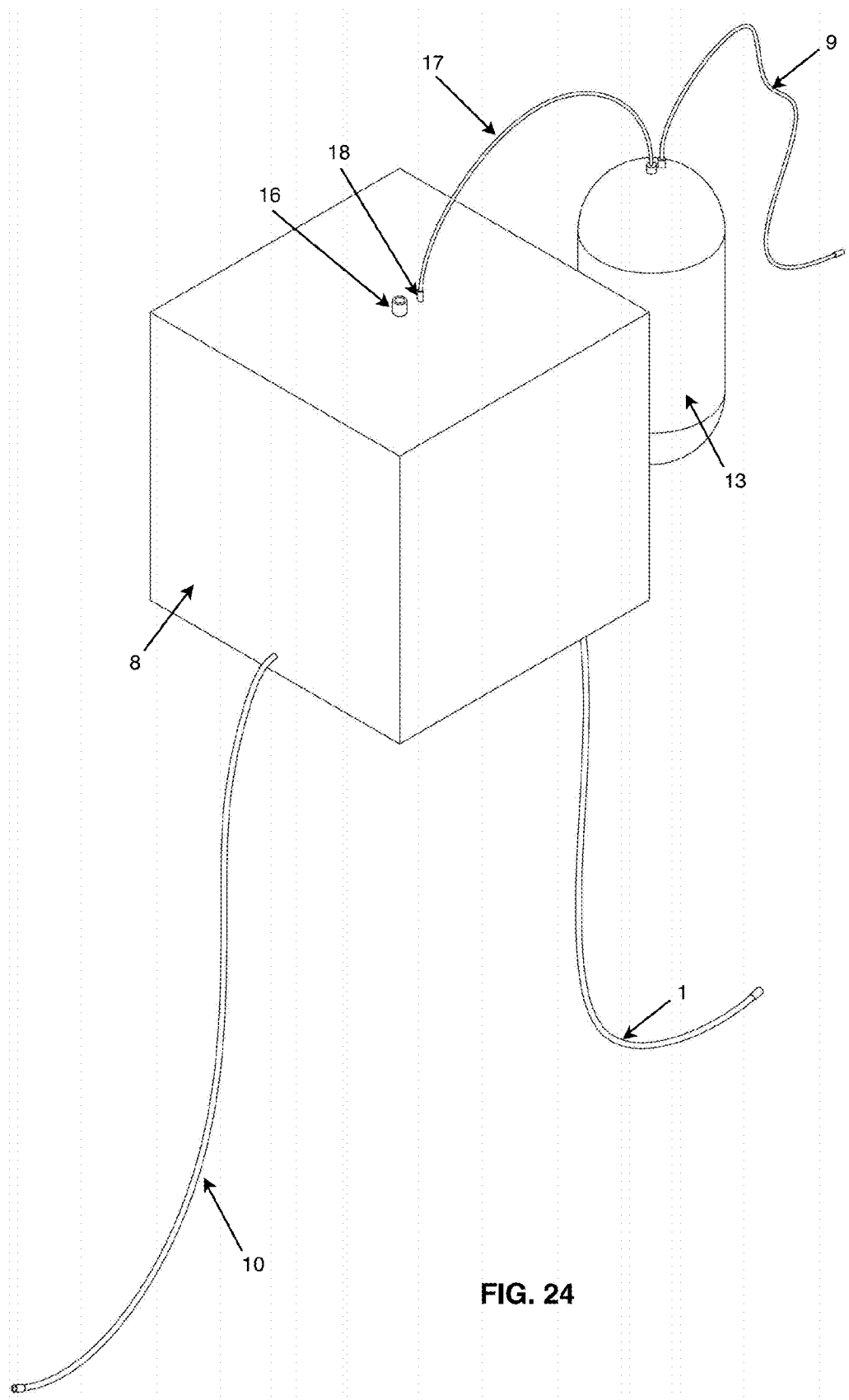
FIG. 24 is an isometric view of another energy conversion system in accordance with embodiments of the present disclosure.
Figure 25:
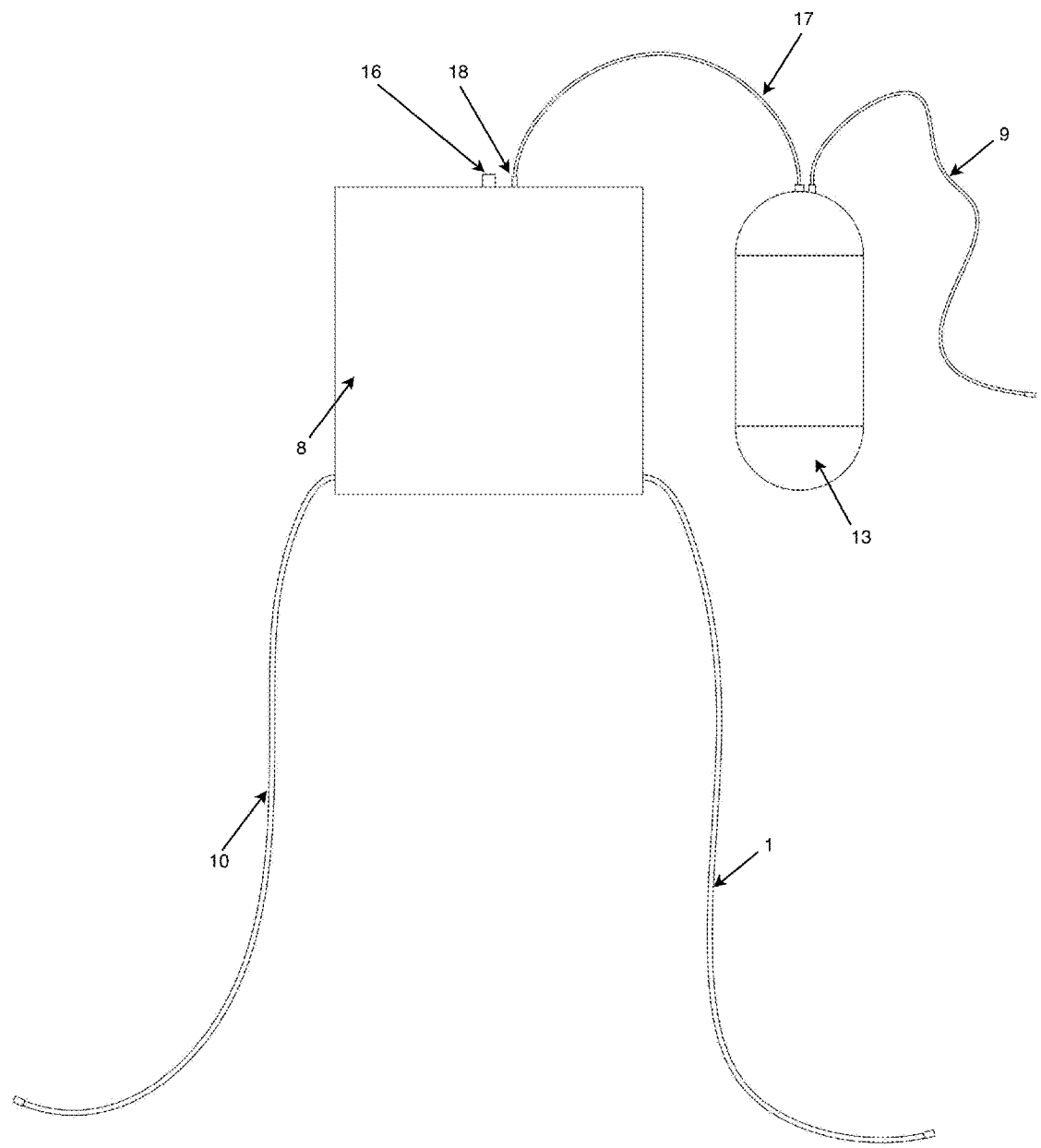
FIG. 25 is a side view of the system depicted in FIG. 24.
Figure 26:
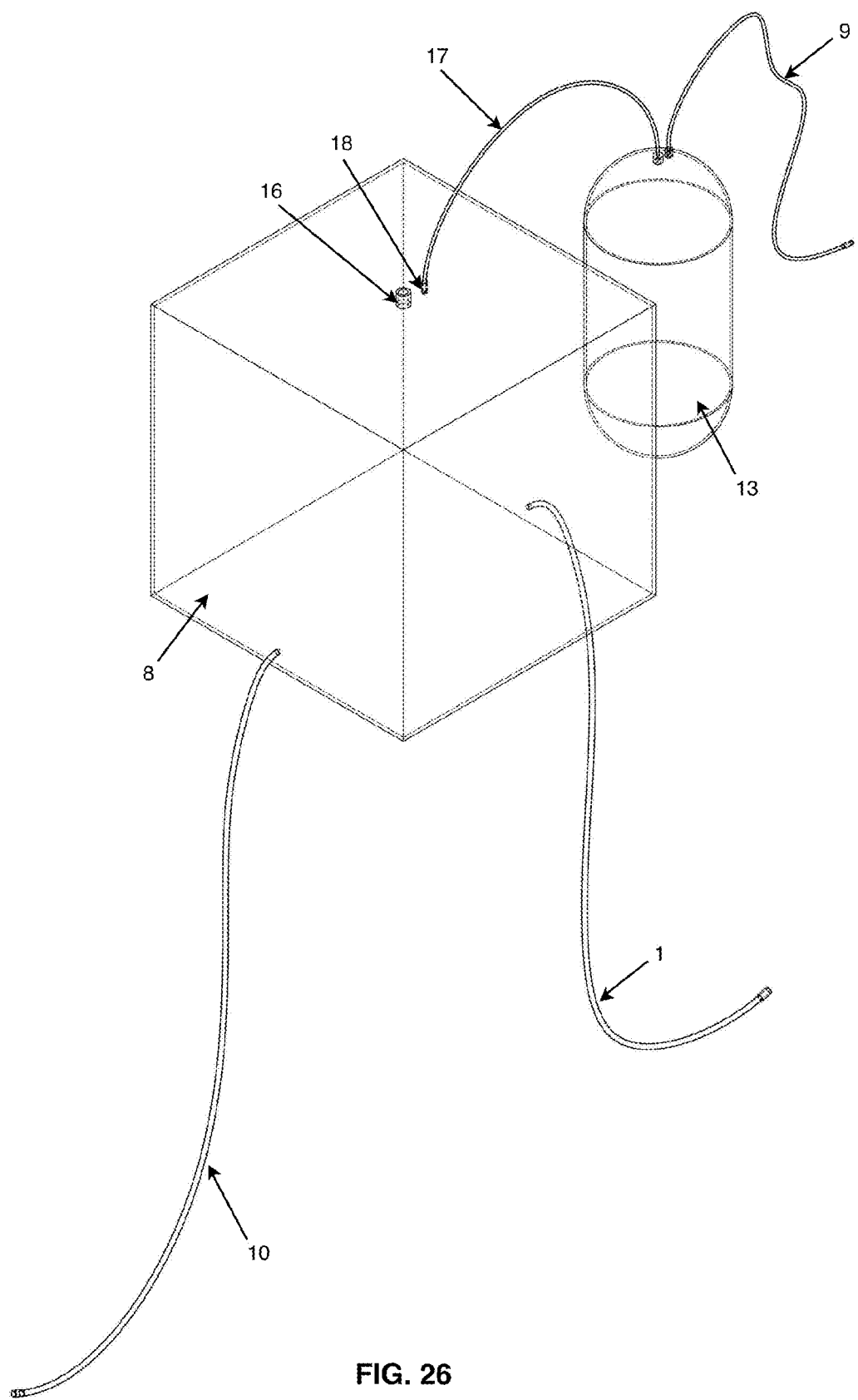
FIG. 26 is a wire frame isometric view of the system depicted in FIG. 24.

With reference now to FIGS. 14-23, various environments in which the energy conversion systems described herein (above or below) are used will be described in accordance with embodiments of the present disclosure. Specifically, high-rise buildings present a potential opportunity to use one or multiple energy conversion systems in accordance with embodiments of the present disclosure since these buildings are often provided with a pump 5 and fluid lines 1 and 10. In addition, most pump rooms in high-rise buildings may include a set of valves 12 that can be used to control fluid flow through the building. FIGS. 14 and 15 show a building with a conventional pump 5 and valve 12 system.

FIGS. 16-23 show high-rise building environments in which an air inlet tube 2 is employed to introduce air into the fluid (either in the main fluid line 1 or in the outlet fluid line 10) on either side of the pump 5. Fluid (e.g., water) moving through the building under force of the pump 5 will first travel through the main fluid line 1 until it passes through the series of valves 12. The fluid is then provided to the pump 5, which pumps the fluid toward the outlet fluid line 10. The moving fluid in the outlet fluid line 10 will flow across the air inlet tube 2, thereby drawing air/gas into the fluid of the outlet fluid line 10. The air/gas introduced by the air inlet tube 2 will then rise to the top of the outlet fluid line 10 as the fluid and air/gas combination travels through the outlet fluid line 10. Eventually, the rising air/gas exits the outlet fluid line 10 via the openings 7 until it becomes trapped in the air capture chamber 8. The remaining fluid continues on its path through the outlet fluid line 10 to the rest of the building.

The pressurized air/gas in the air capture chamber 8 can be used as previously described herein or it can be used for future use in a long-term storage tank 13. The long-term storage tank 13 may comprise a larger volume for storing air/gas as compared to the air capture chamber 8. Moreover, one or more valves may be provided between the air capture chamber 8 and the long-term storage tank 13, thereby affording control of air/gas passage from the air capture chamber 8 to the long-term storage tank 13.

It should also be appreciated that any moving water in or around a building can be run through the energy conversion system described herein. As a specific, but non-limiting example, falling waste water from a building may be run through an energy conversion system as disclosed herein. It should also be appreciated that a pumpless energy conversion system (such as will be described in further detail herein) may be used to convert the movement of grey water from showers and sinks into compressed air.

With reference now to FIGS. 24-30, still another example of an energy conversion system will be described in accordance with at least some embodiments of the present disclosure. The system depicted in FIGS. 24-30 still utilizes a main fluid line 1 and output fluid line 10; however, this particular system no longer utilize a pump. FIGS. 27-30 show the process for creating compressed air step-by-step, starting with FIG. 27 and ending with FIG. 30.

Figure 27:
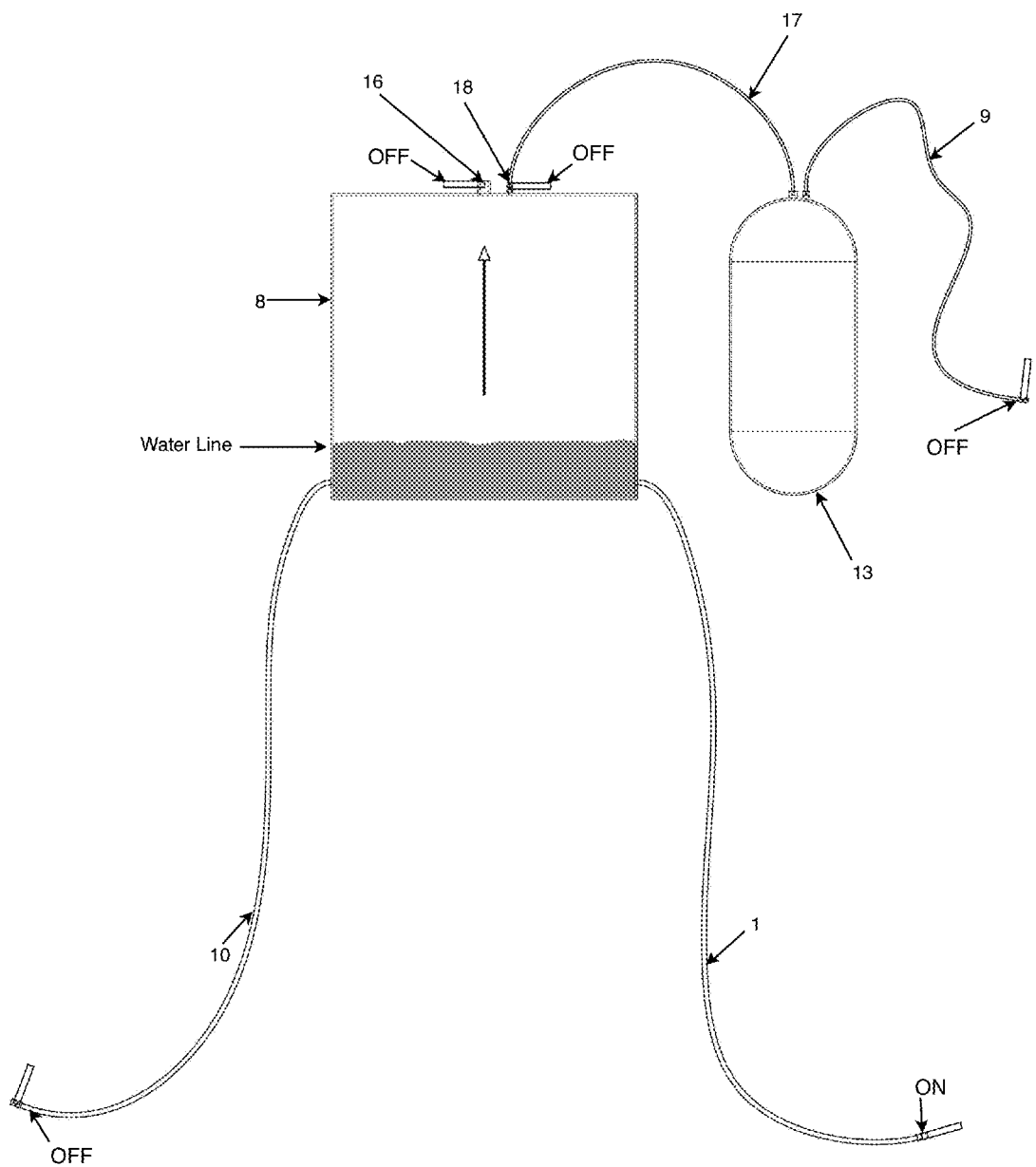
FIG. 27 is a first section cut view of the system depicted in FIG. 24.

FIG. 27 also depicts all of the components as well as the first stage of the process. FIG. 27 shows the main fluid line 1 running directly into the bottom of the air capture chamber 8. This chamber can be located on a stand, on an elevated surface or on an upper level of a building or the like so as to provide the required water pressure for the outlet fluid line 10. The air capture chamber 8 is shown as a square box, but could be any shape or size as long as it is able to hold both air and water. In some embodiments, the shape of the air capture chamber 8 is similar to that of a typical water tower (conical bottom with a stand), but is not limited to this.

Figure 28:
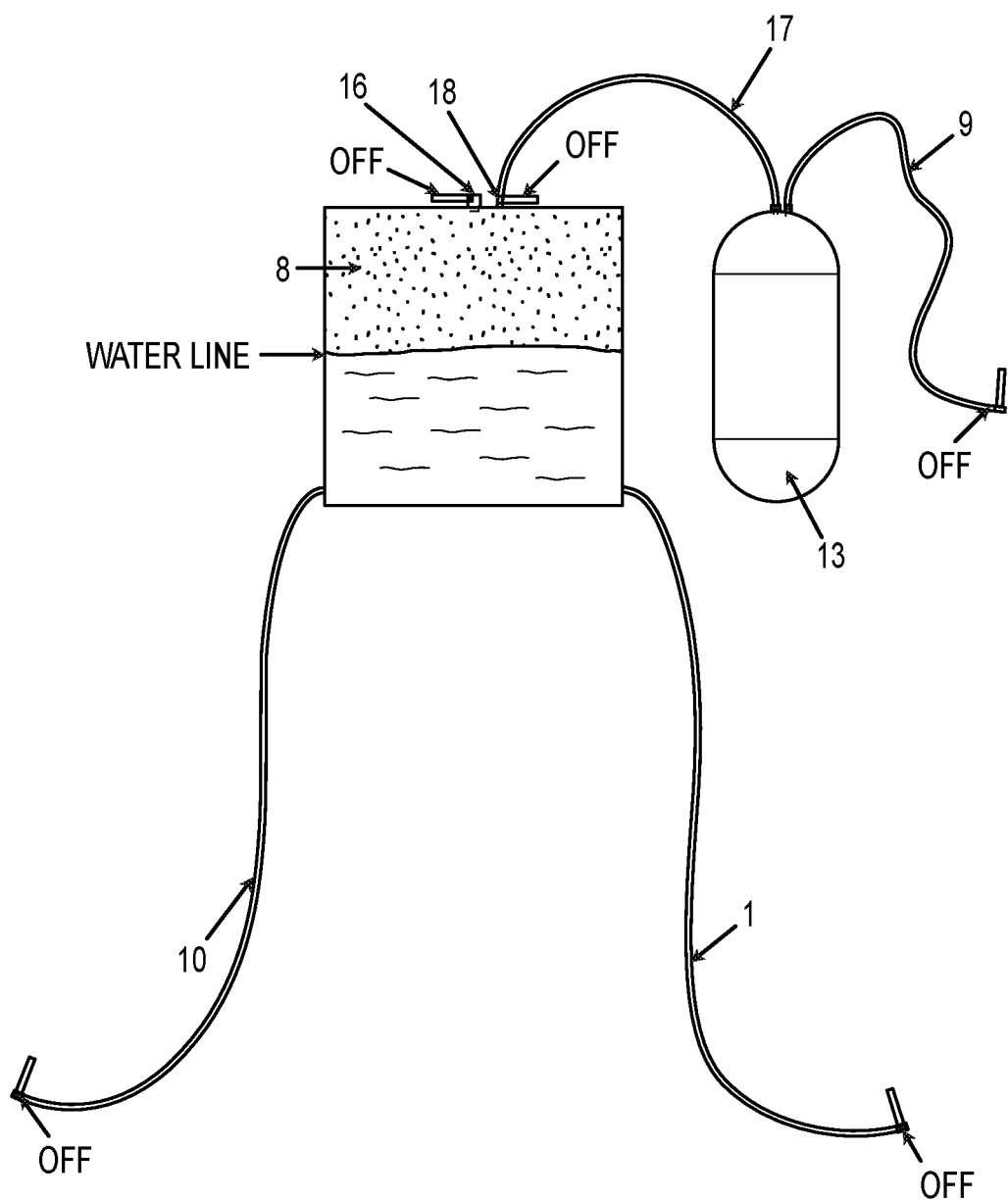
FIG. 28 is a second section cut view of the system depicted in FIG. 24.

In operation, the air capture chamber 8 begins in an empty state and all valves are in an off position. More specifically, an air inlet valve 16 and a compressed air outlet valve 18 will all be in their "off" position. The next step is to turn "on" the incoming water. Doing this will start to fill the air capture chamber 8 with water. Thereafter, as shown in FIG. 28, water will rush into the air capture chamber 8 to a point at which pressure equalizes and the flow stops itself. At this point, the user has created a partially filled tank of water as well as a volume of compressed air, both at a pressure equal to the incoming pressure of the main fluid line 1. The user now has a viable source of energy in the form of compressed air that can either be used for purposes previously described or stored until needed in the long-term storage tank 13.

Figure 29:
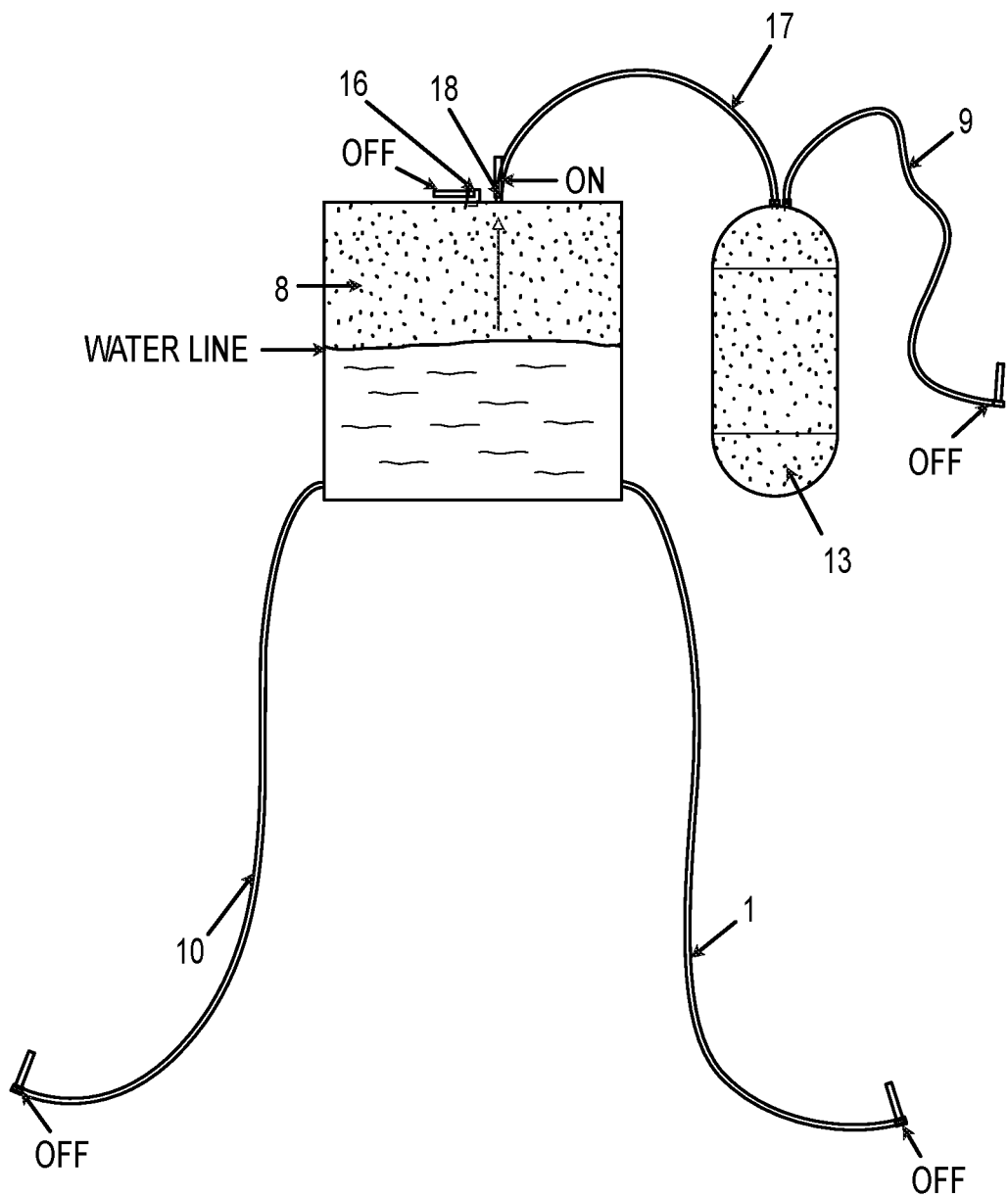
FIG. 29 is a third section cut view of the system depicted in FIG. 24.

The next possible step in the process is shown in FIG. 29 in which the compressed air in the air capture chamber 8 is stored. Now that the air capture chamber 8 is filled with both compressed air and water, the user has four possible options. One option is to shut off the incoming water and simply use the compressed air directly out of the air capture chamber 8 by connecting the hose 17 to a motor, generator, power tool, car or similar device by opening the valve 18 on top of the air capture chamber 8. Another option is to use the newly created compressed air directly from the air capture chamber 8, except that the user would leave the water running through the main fluid line 1. This would create additional air pressure at the valve 18 of the air capture chamber 8 and allow a larger volume of the compressed air to be used as an energy source. The downside to this option is the air capture chamber 8 would completely fill with water, versus a partially filled chamber 8 of water, where the process can be repeated prior to having a completely full chamber 8 of water. A third option is shown in FIG. 29 and will store the energy for future use. The user turns off the incoming water at the main fluid line 1 to the air capture chamber 8, and opens the valve 18 to allow the compressed air in the top of the air capture chamber 8 to be transferred to the storage tank 13. The energy can then be used as needed by opening the valve to the storage tank 13 and allowing compressed air to exit the system via a compressed air hose 9. Still another option is to do the same thing as described in the third option and store the compressed air in the storage tank 13, except that the water flowing through the main fluid line 1 will be left "on" for the process and provide additional pressure that can also be dispensed to the storage tank 13. After the user is finished with one of these four options, the user can then use the water in the air capture chamber 8 to provide water to low pressure (not limited to low pressure) applications like watering plants, sinks, toilets, washing machine, dishwasher and the like.

Figure 30:
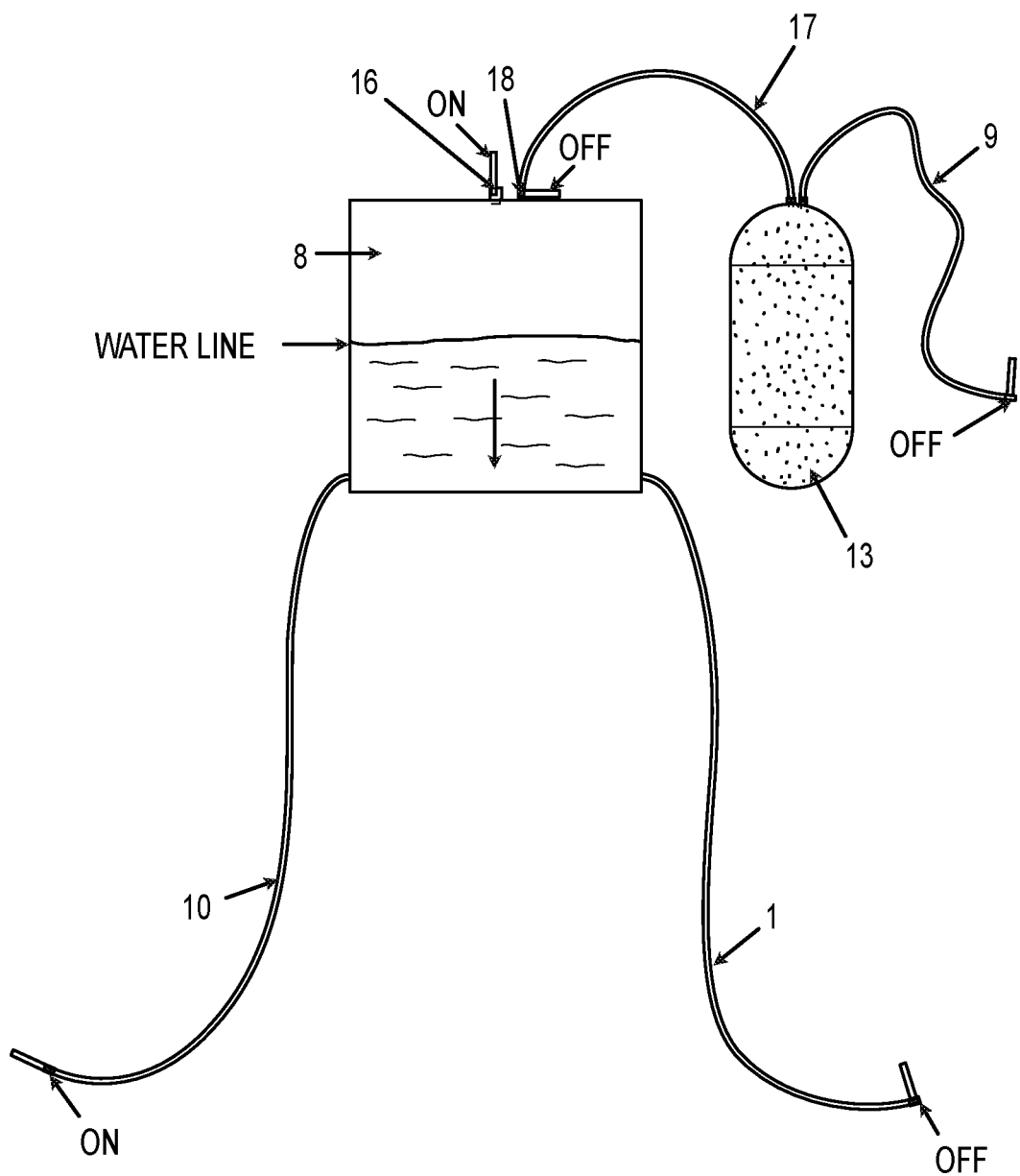
FIG. 30 is a fourth section cut view of the system depicted in FIG. 24.

Water pressure provided by the air capture chamber 8 will be determined by the height and design of the chamber. FIG. 30 depict this step. The user will close the inlet at the main fluid line 1, as well as the valve 18. The user will then open the air inlet valve 16, which will allow uncompressed air to enter the air capture chamber, the user will then be able to open the water outlet valve to the outlet fluid line 10 and release water from the air capture chamber 8 to be used for a variety of just previously mentioned applications. When the water is drained from the water tower, the process can be repeated, creating more compressed air energy. This cycle can be automated so that the user will not physically open and shut the valves. Instead automated control over the valves can be exerted by a system, thereby allowing the user to simply turn "on" the water and use it as they would with any other system. It should be appreciated that there is not a limit to the size and shape of the air capture chamber 8.

Figure 31:
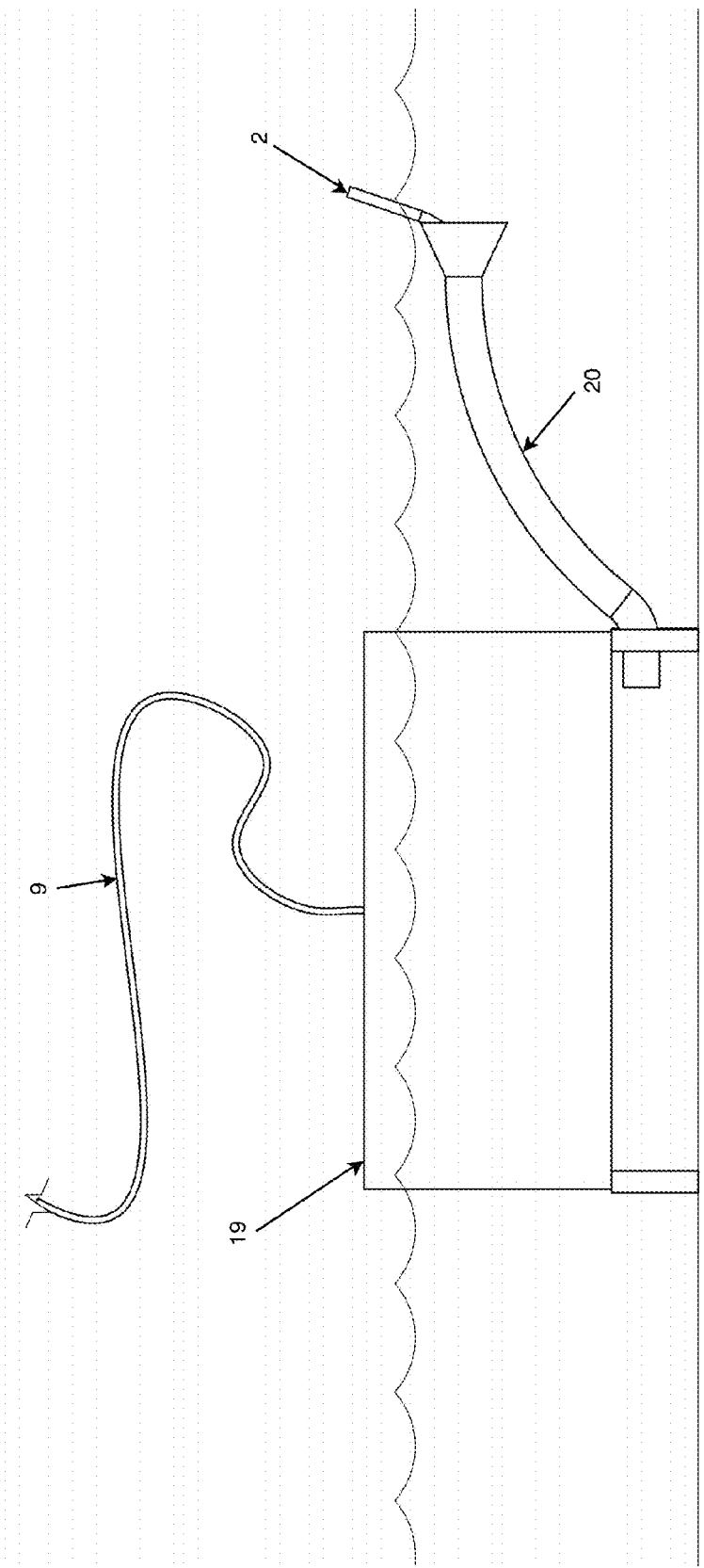
FIG. 31 is a side view of another energy conversion system in accordance with embodiments of the present disclosure.
Figure 32:
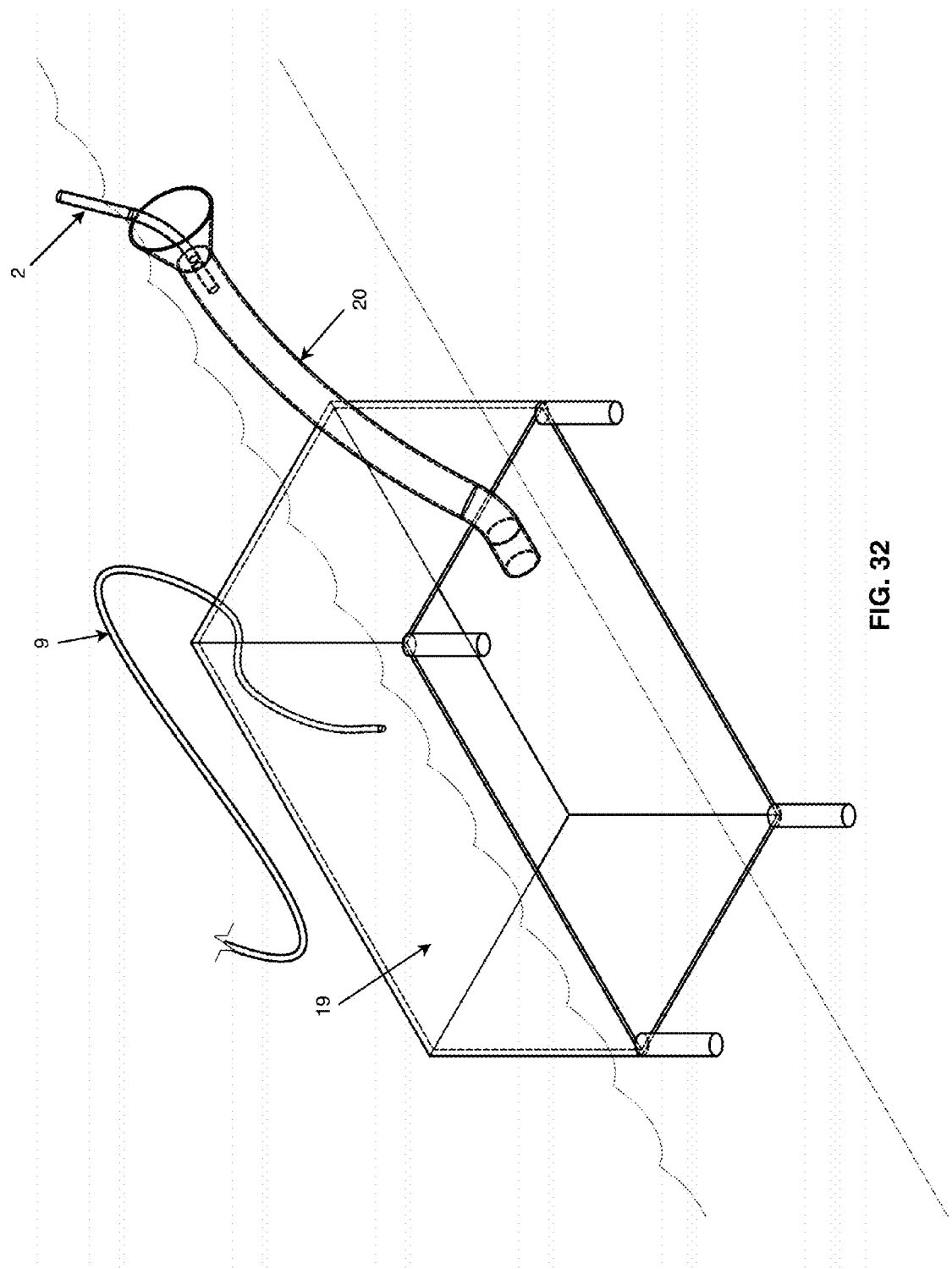
FIG. 32 is a wire frame isometric view of the system depicted in FIG. 31.
Figure 33:
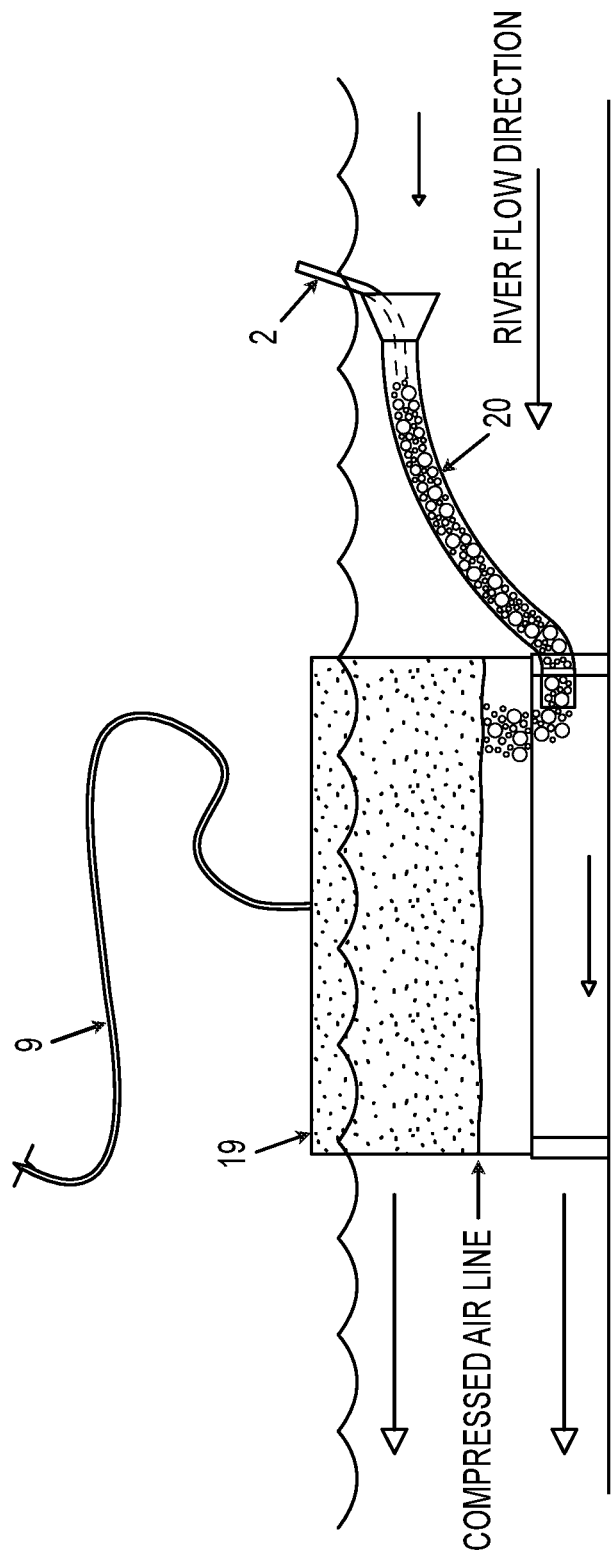
FIG. 33 is a section cut view of the system depicted in FIG. 31.
Figure 34:
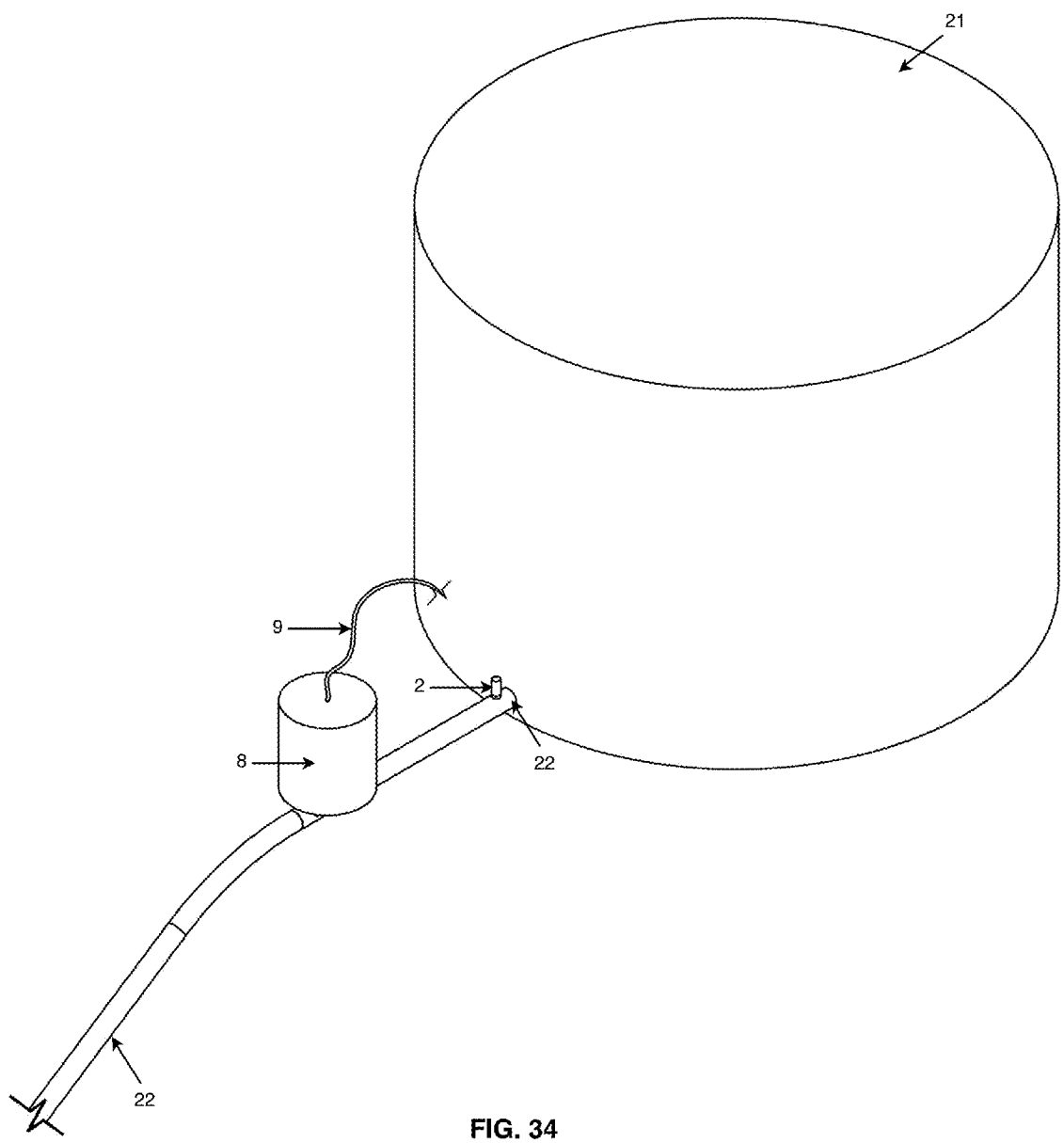
FIG. 34 is an isometric view of another energy conversion system in accordance with embodiments of the present disclosure.
Figure 35:
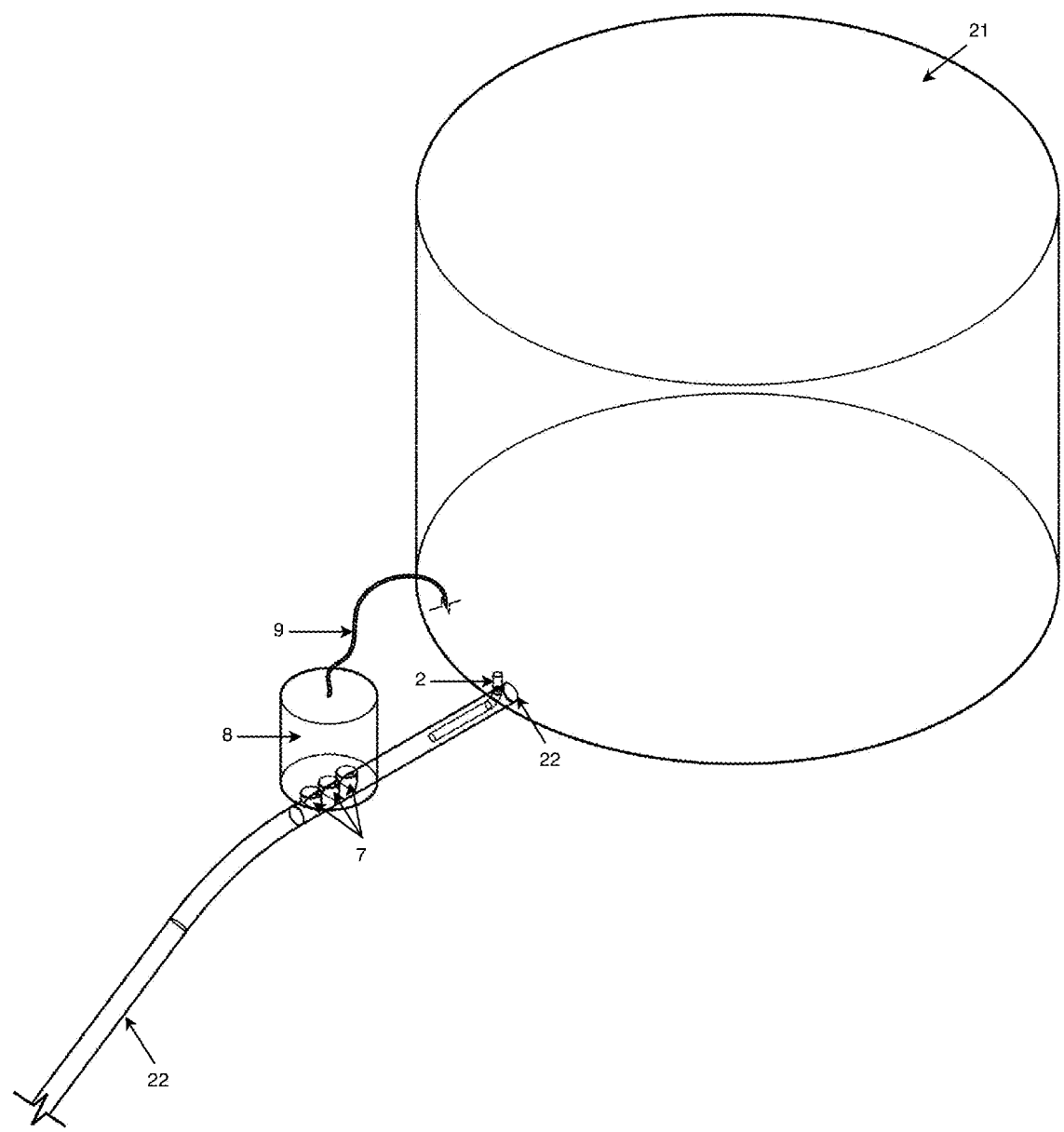
FIG. 35 is a wire frame isometric view of the system depicted in FIG. 34.
Figure 36:
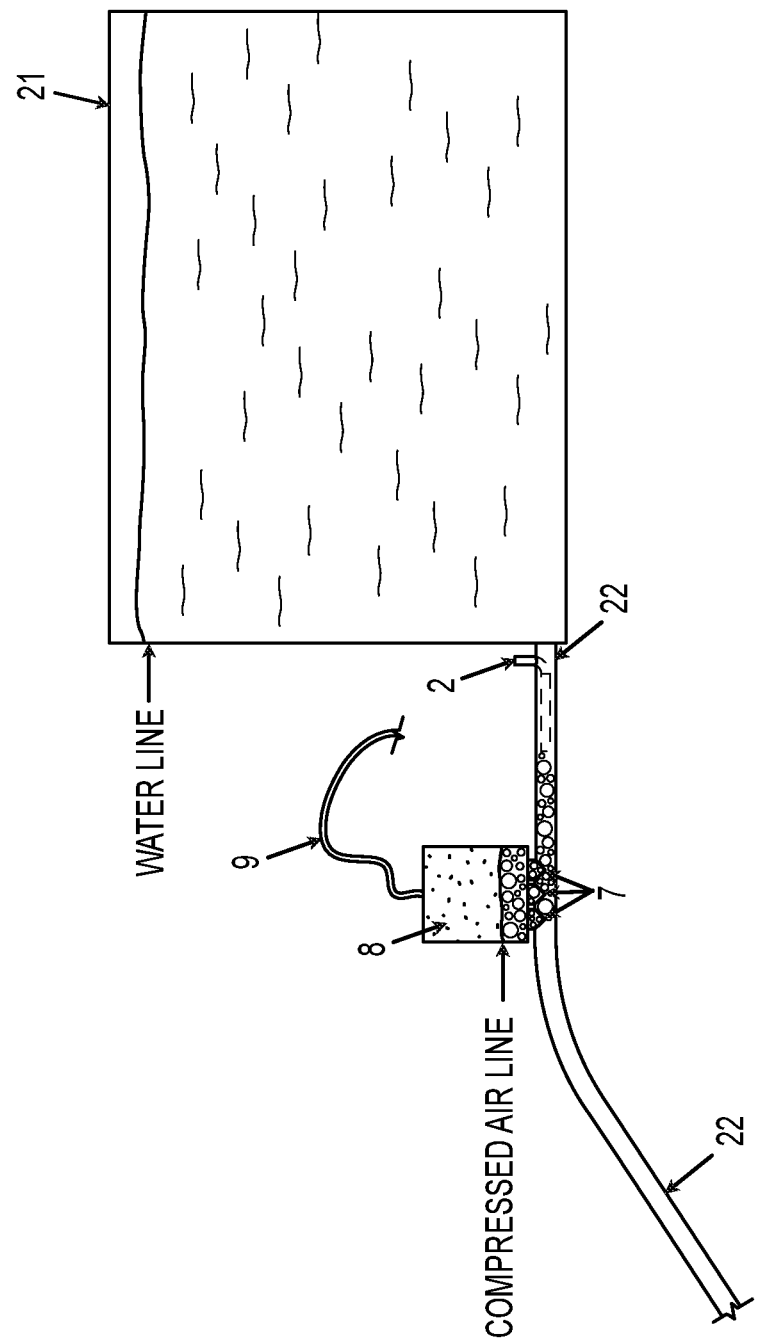
FIG. 36 is a section cut view of the system depicted in FIG. 34.
Figure 37:
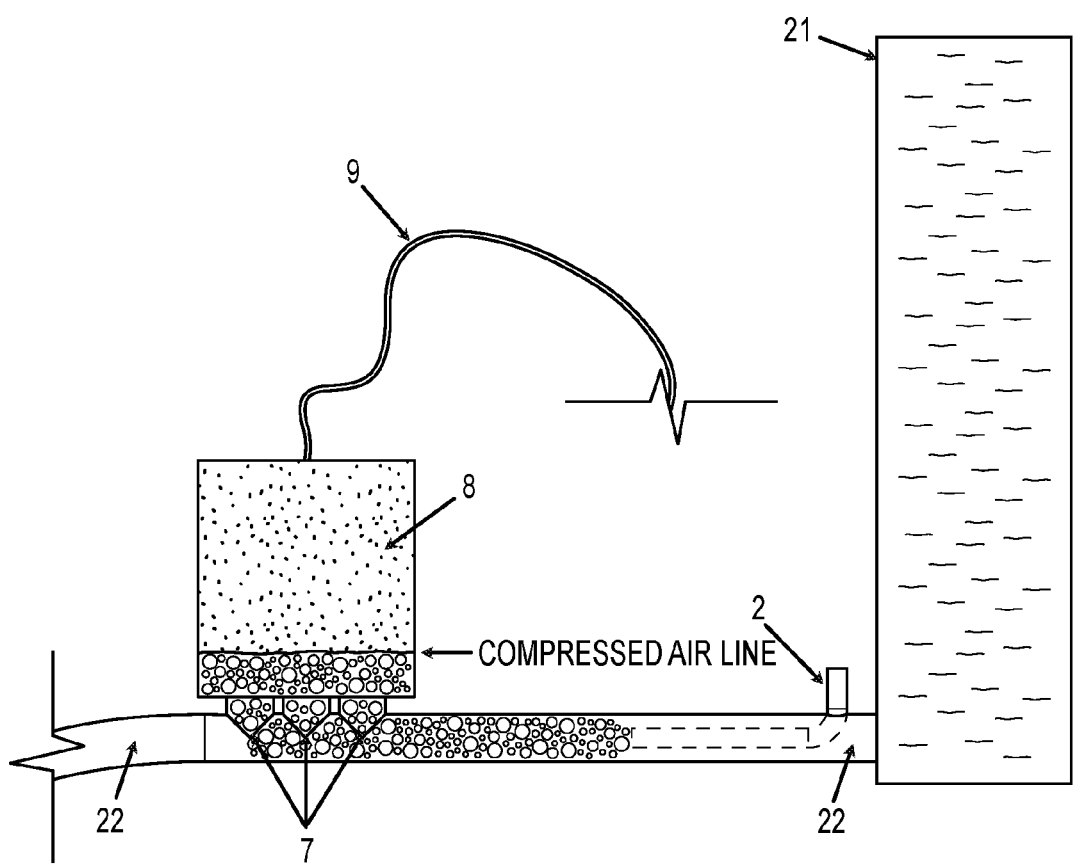
FIG. 37 is a detailed section cut view of the system depicted in FIG. 34.

FIGS. 31-33 depict yet another energy conversion system in accordance with embodiments of the present disclosure. The energy conversion system is shown to be used in an environment where water is moving under the force of gravity (e.g., a river, stream, tide pool, etc.). It should be appreciated that this particular system may be used in open or closed bodies of water and is capable of creating large volumes of low-pressure compressed air for use in a variety of applications. Possible applications of such low-pressure compressed air include, without limitation, cooling structures as a replacement for air conditions, turning turbines with air to create electrical energy, drying of various foods, and any situation where cooled and moving air have a benefit. The device is designed to operate automatically whenever the water moves around it.

FIG. 33 depicts the system in operation. A funnel (attached to the end of the water inlet 20 can assist in routing water into the energy conversion system, but is not required. Water is directed into the water inlet 20 of the energy conversion system. As the water is routed and passes through the water inlet 20 it passes over the end of an air inlet pipe 2, causing the air to be drawn into the stream of water in the main inlet 20.

In some embodiments, the water inlet 20 is an optional component of the energy conversion system. In embodiments without the water inlet 20, an air inlet pipe 2 would run directly into container 19 and have its opposite end exposed to atmosphere above the river. The air may then be pulled into the container 19 under the vacuum force created by having water flow into the container 19. It is also possible to cut the water inlet 20 lengthwise (leaving the top half/portion and removing the bottom half/portion) as the water pipe that routes the air to the bottom of the river. This would allow the water pressure from the river to push the air bubbles down with more force than a full water pipe would allow, but would prevent the air from rising to the surface. Instead, the air bubbles would be carried down into the container 19 where they are collected and eventually extracted using a smaller hose 9.

This air and water mixture is then forced out the opposite end of the water inlet 20 at a point in the river or current that is lower in depth than the entrance point. This stream of air and water recombine with the river or current creating a stream of air bubbles exiting the end of the water inlet 20. The water coming out of the water inlet 20 will continue its way down the river while the bubbles will rise toward the surface. To capture the bubbles, a container 19 (yet another example of a gas extraction unit) of almost any shape and virtually any size will be placed directly above the bubbles exiting the water inlet 20. These air bubbles will emerge from the water inlet at the exact pressure provided by the depth differential of the end of the water inlet 20. For example, if the pipe submerges the air/water mixture to a depth of ten feet, the air bubbles being dispersed from the end of this pipe will be roughly 4.5 psi. As these bubbles attempt to rise to the surface, they are trapped by the cavity of the container 19. This submerged cavity can be located at any depth, but the air pressure provided by the trapped air will only be equal to the pressure of the container at the depth at which the container is located. This trapped air can then be forced out the top of the cavity using a smaller hose 9 and directed into a structure for use as air conditioning or cooling (as an example).

These figures only show the use of one small air inlet tube 2, but it should be appreciated that multiple air inlet tubes 2 of any shape or size can be used to provide the volume of air desired by the application. As an example, a farm may have ten energy conversion systems spaced down the river front to which the farm is adjacent, providing cooling on a large scale to individual buildings on the farm. Each energy conversion system, as an example, could have fifty air inlet pipes 2 routing into twenty-five separate water inlet inlets 20, all being dispersed into a large capture tank 19. As with other systems disclosed herein, it is also possible to store the compressed air for future use. The energy conversion system disclosed herein is not limited to use in rivers and provides additional energy solutions beyond simple cooling of a structure. Cooling solutions as well as the use of rivers was only meant as an example and not meant to limit the scope of the disclosure.

With reference now to FIG. 34-42, examples of energy conversion systems designed to create compressed air from hillside water towers or the water exiting water towers of any kind will be described in accordance with embodiments of the present disclosure.

FIGS. 34-37 depicts one example of an energy conversion system used to convert the potential energy of water stored in an elevated water tank to compressed air or the like. Specifically, water exiting from the water tank 21 will push water at a pressure (usually around 80 psi) into a pipe 22 which leads into the city water system, although the water can be directed anywhere. As water flows through this pipe 22, it passes over an air inlet pipe(s) 2, creating a vacuum, which pulls air into the stream of water in the main pipe 22. Similar to other versions of the energy conversion system disclosed herein, the air bubbles will begin to rise to the top of the pipe 22. As these bubbles are pushed across the top of the pipe 22 they will run across an opening(s) 7 in the bottom of the air capture tank 8. As the bubbles do this, they continue their rise to the surface, which means they will stream into the air capture tank 8, where they will form a body of compressed air that can be used as an energy source as previously described. To use or store the energy, a small hose or pipe 9 can be routed to the desired use location, where a valve will allow instant access to the compressed air in the air capture tank 8.

In some embodiments, it may be useful to direct the pipe 9 upwards after the capture tank to provide additional back pressure and increase the pressure of the captured compressed air. It may also be useful to configure the system such that the water exiting the tank 8 comes out of a pipe that runs nearly entirely along the top of the water line in the tank and has the air inlets running into the top of it. This would allow the entrained air to be slowly compressed as it travels down the pipe. Otherwise, the water pressure from the tank may attempt to force water out of the air inlet pipe(s).

Figure 38:
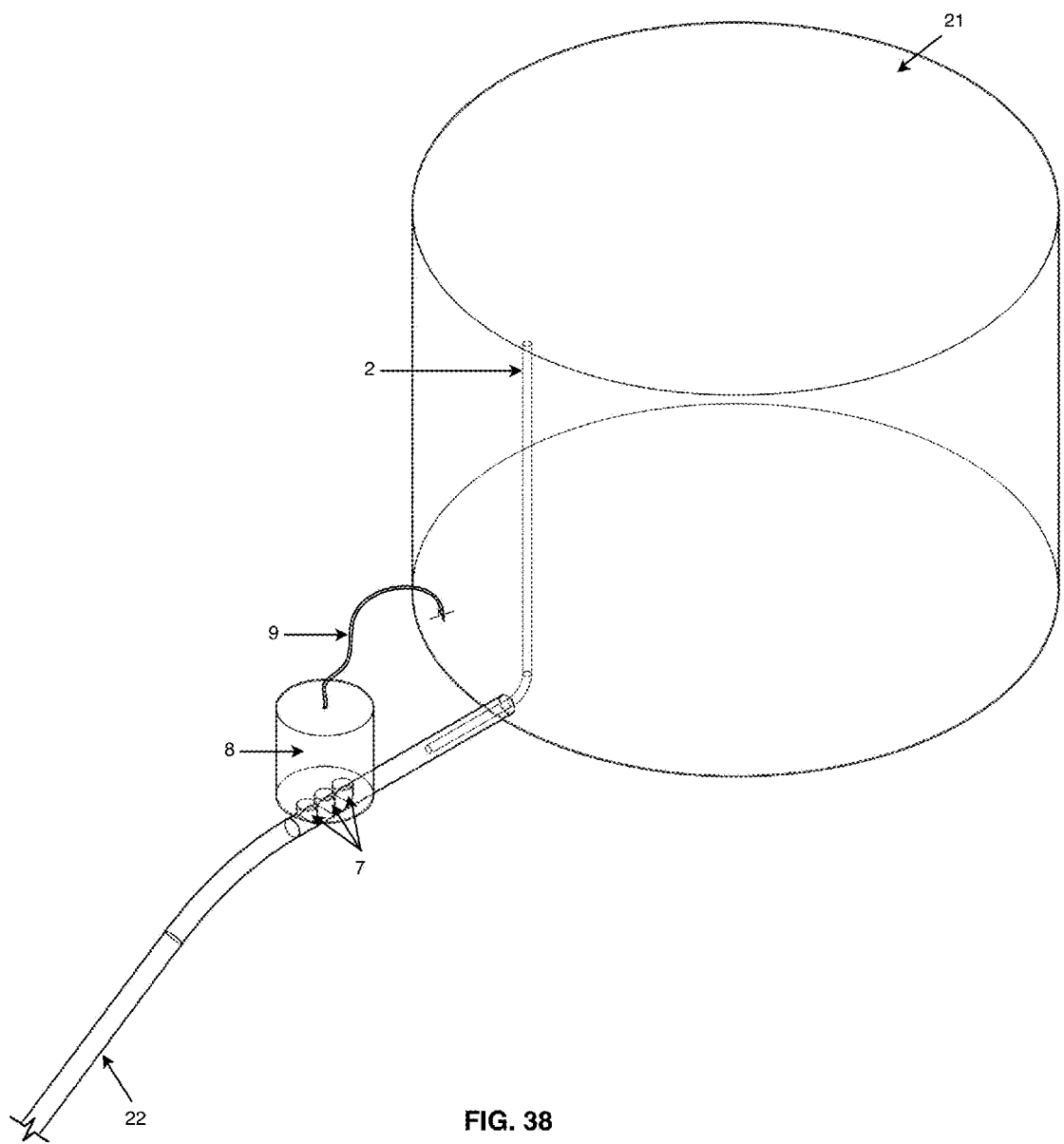
FIG. 38 is a wire frame isometric view of another energy conversion system in accordance with embodiments of the present disclosure.
Figure 39:
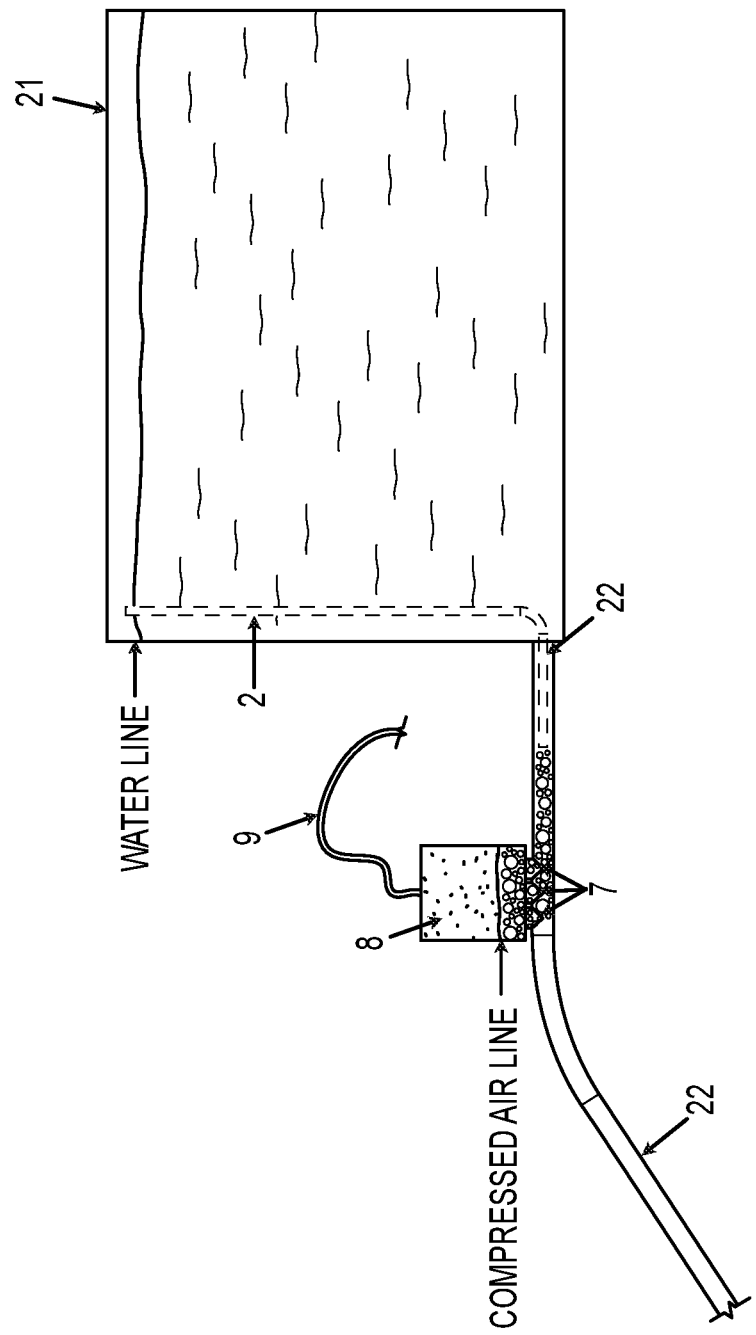
FIG. 39 is a section cut view of the system depicted in FIG. 38.

Another variation of this type of energy conversion system is depicted in FIGS. 38-39. This particular variation places the opening of the air inlet tube(s) 2 into an air cavity sitting above the water in the main tank 21 to provide the air for the vacuum effect that occurs in the main pipe 22. The pressure built up in the top of the main tank 21, if any, will assist in forcing air into the main stream of water flowing through the pipe 22 as the water exits the tank 8

Figure 40:
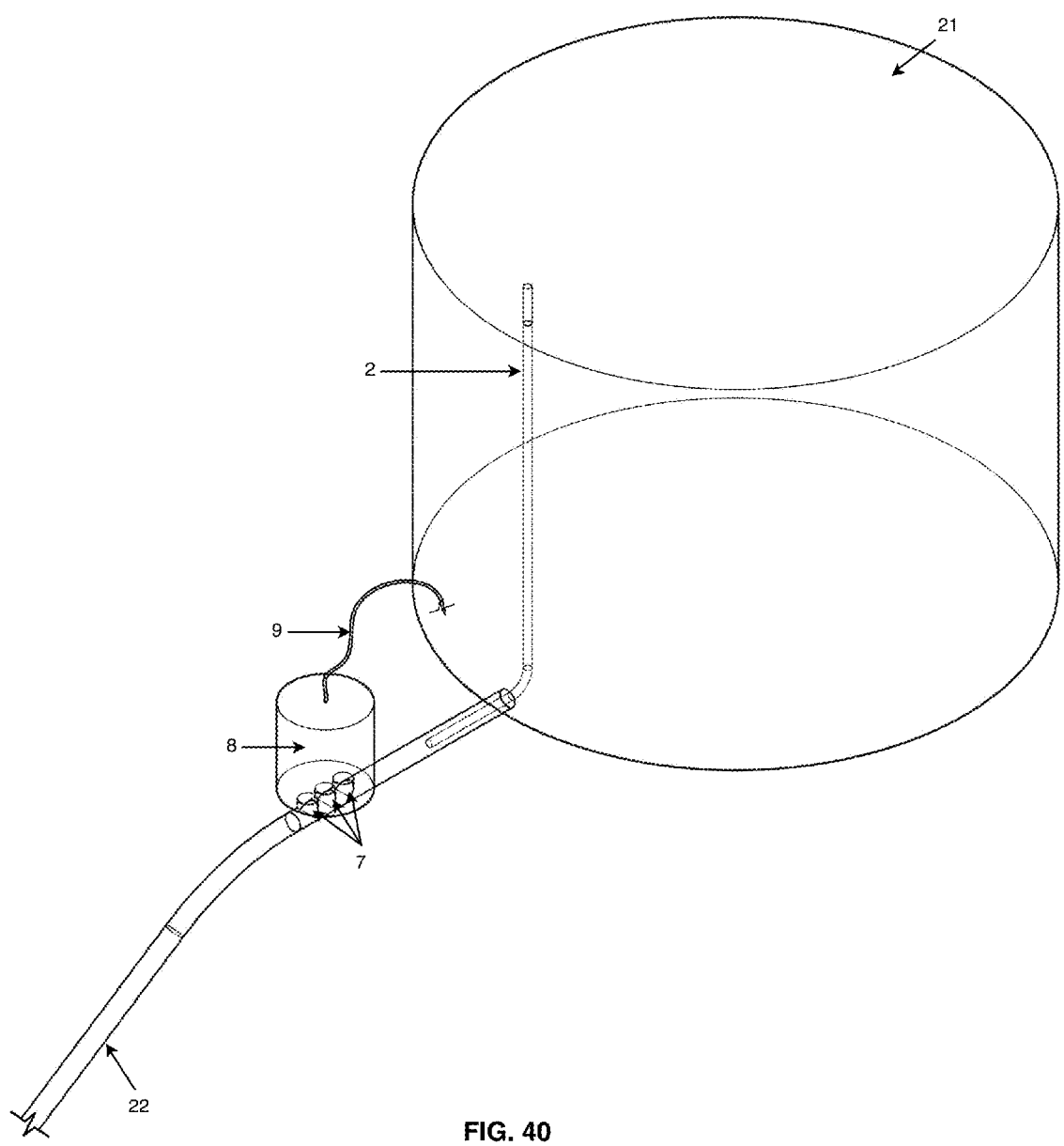
FIG. 40 is a wire frame isometric view of yet another energy conversion system in accordance with embodiments of the present disclosure.
Figure 41:
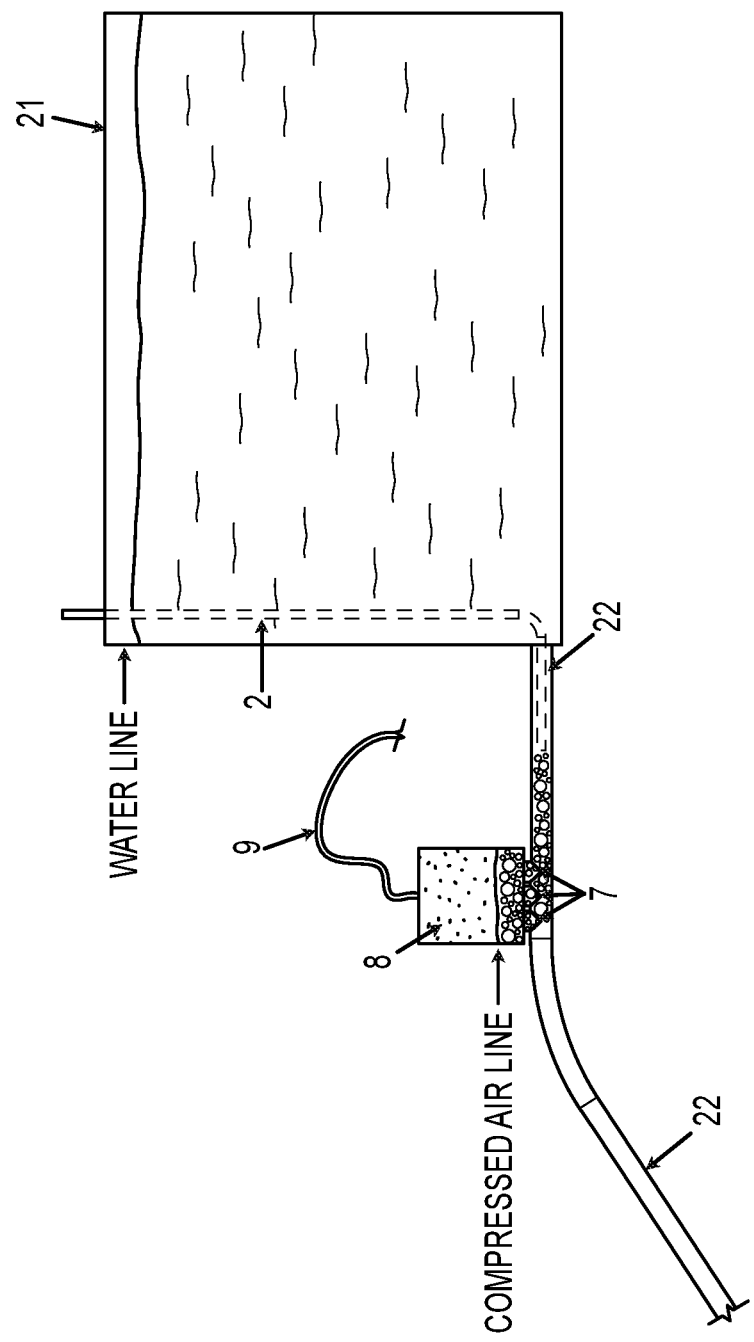
FIG. 41 is a section cut view of the system depicted in FIG. 40.
Figure 42:
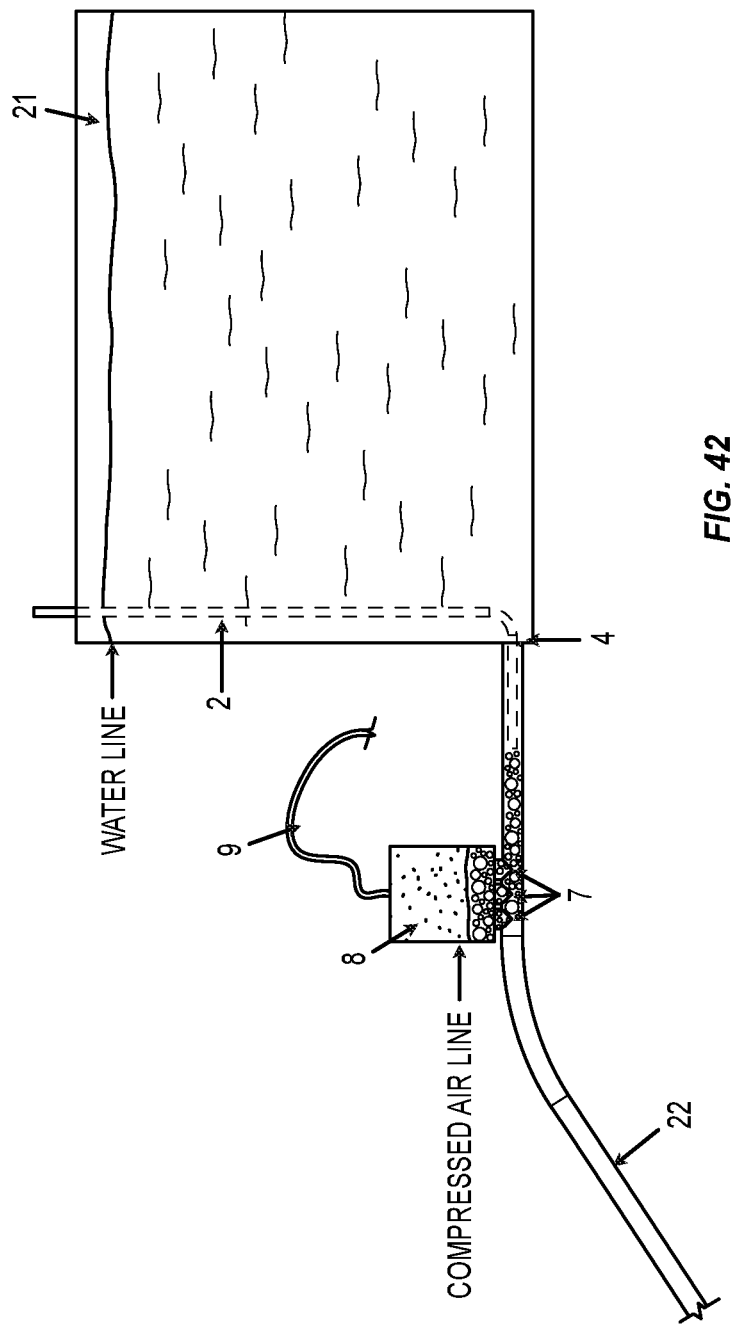
FIG. 42 is a section cut view of another energy conversion system in accordance with embodiments of the present disclosure.
Figure 43:
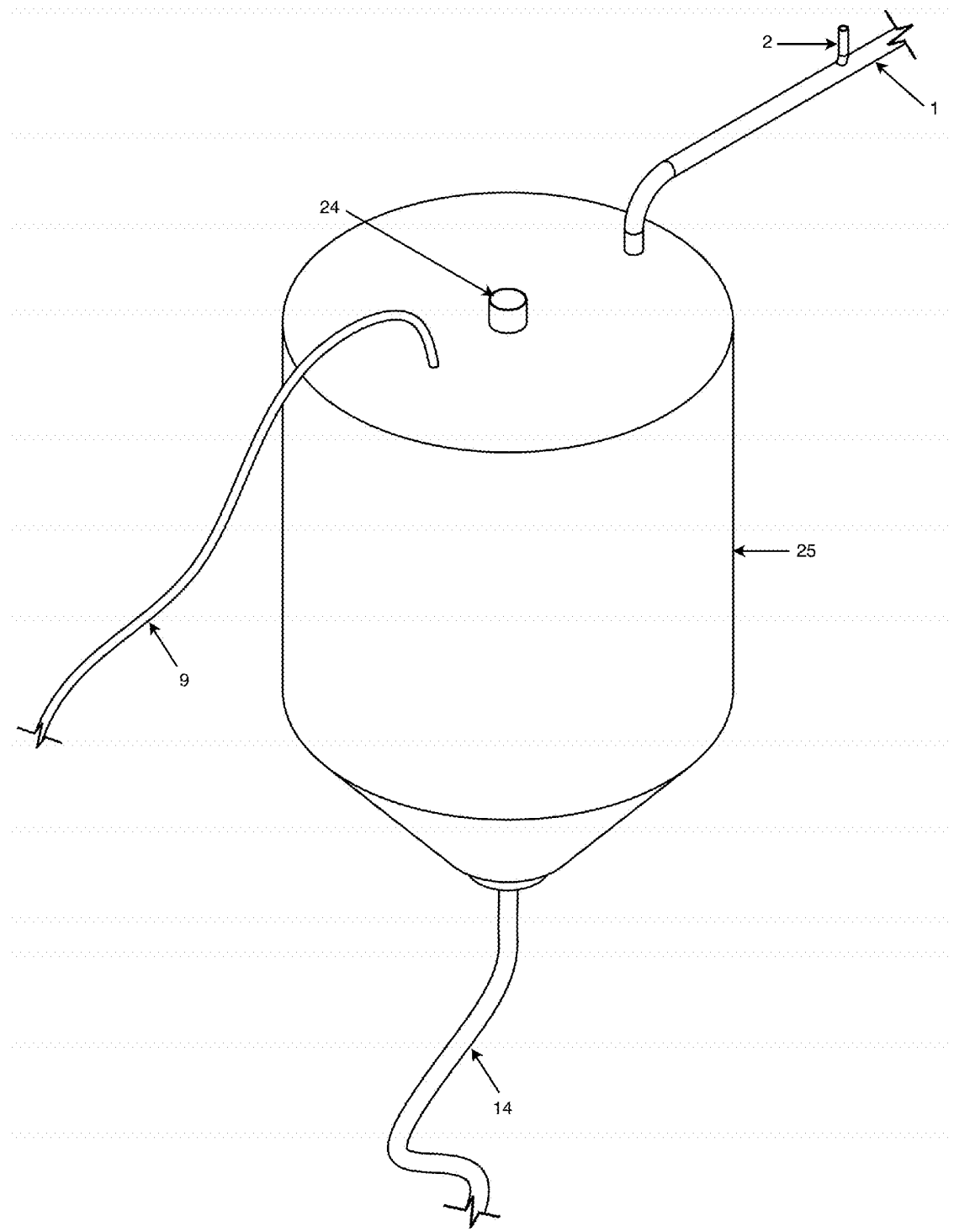
FIG. 43 is an isometric view of still another energy conversion system in accordance with embodiments of the present disclosure.
Figure 44:
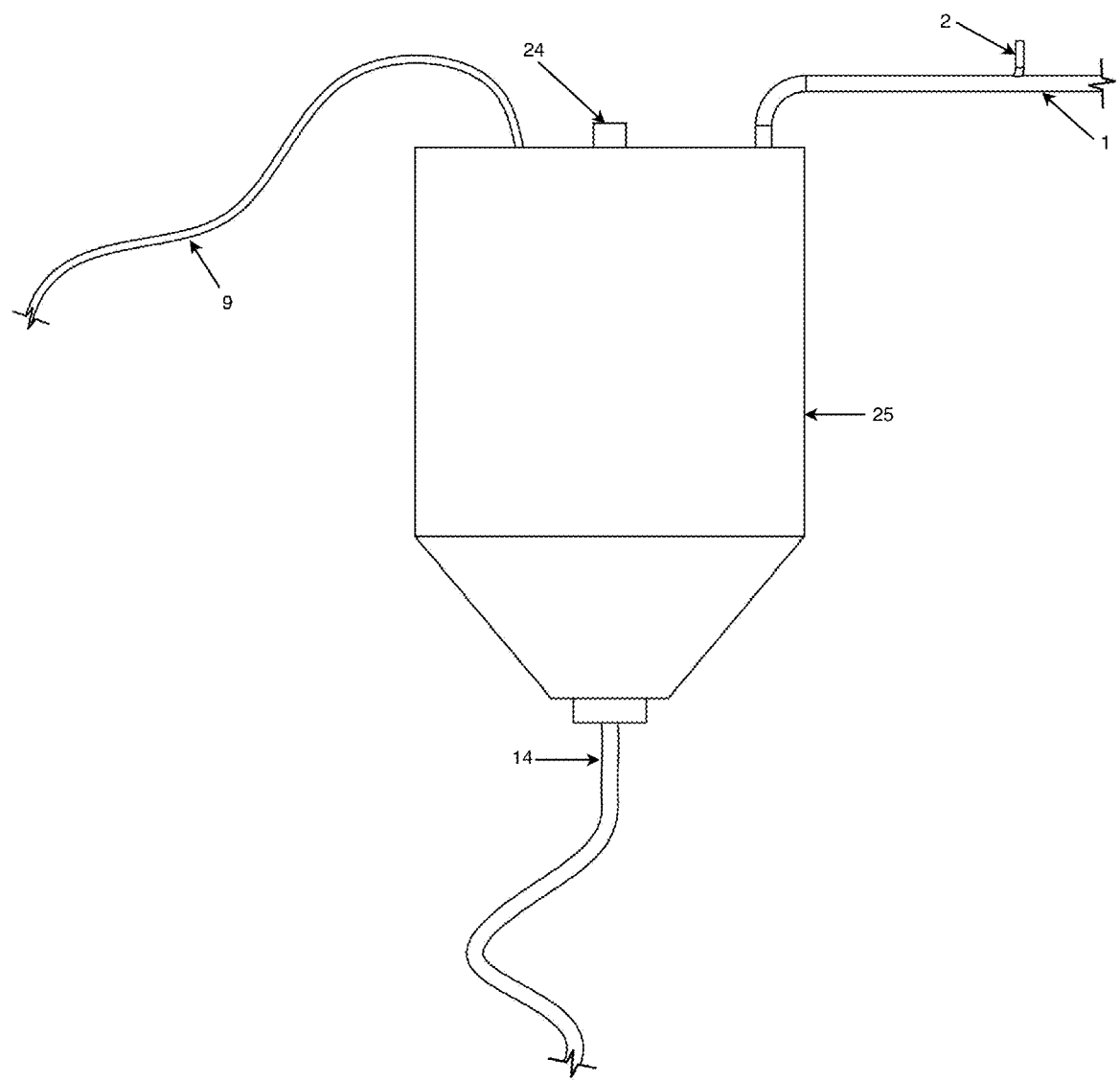
FIG. 44 is a side view of the system depicted in FIG. 43.
Figure 45:
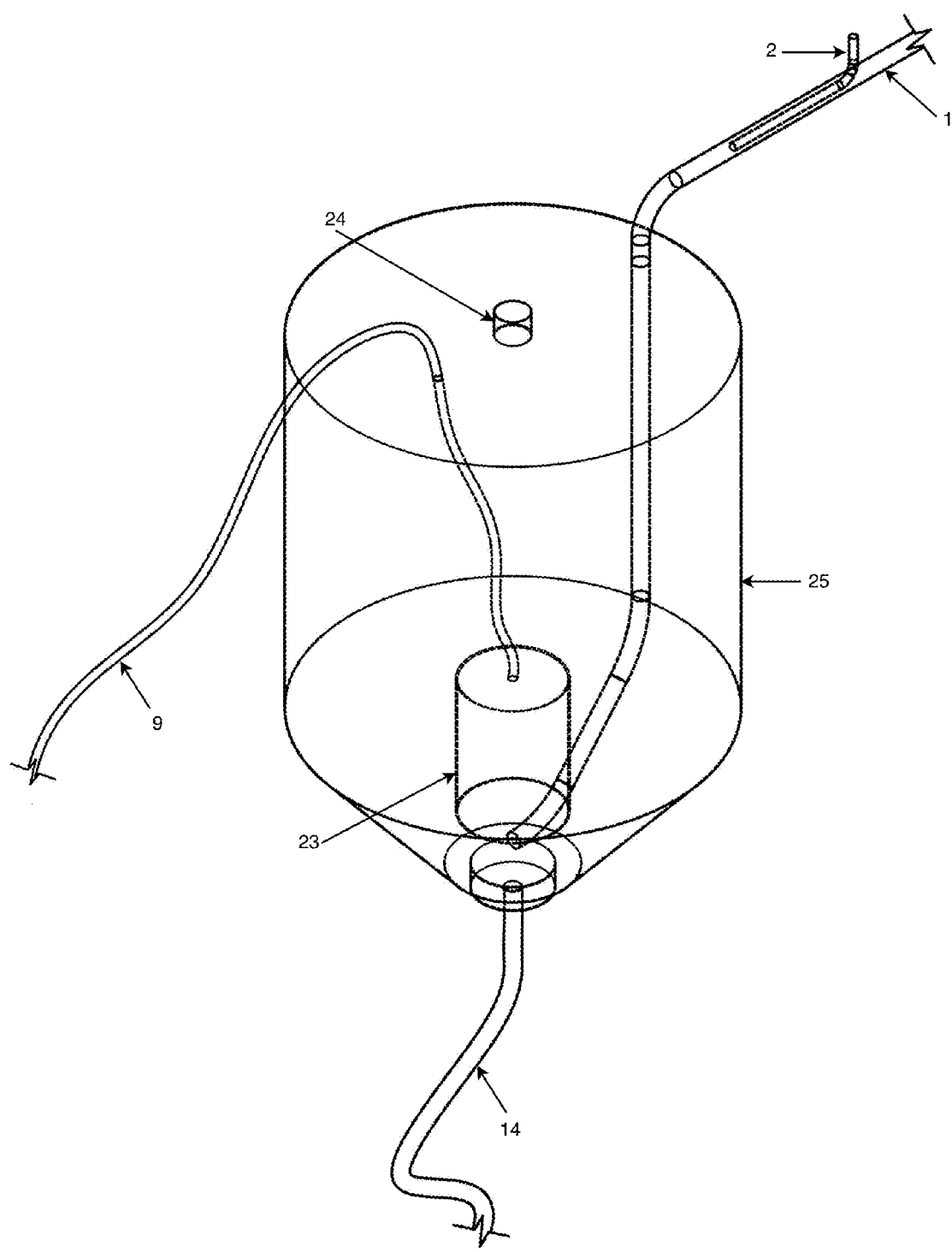
FIG. 45 is a wire frame isometric view of the system depicted in FIG. 43.

Another variation of this type of energy conversion system is depicted in FIGS. 40-42. This particular variation adjusts both the start and end point of the air inlet tube(s) 2, but otherwise functions like the previous two variations. The start point for air inlet tube(s) 2 will be located at a point outside of the water tower. In these figures, the air inlet tube 2 enters the tower from the top, but this is only meant as one of many options. Another location for this air inlet pipe 2 to enter the tank 21 could be only a few feet from the bottom of the tank 21, and enter through the side of the tank 21. The exit for the air inlet pipe 2 is now located just inside the tank 21. As water is forced over the end of the air inlet pipe(s) 2, it once again creates a vacuum effect, drawing air into the stream of water that is being forced into the pipe 22 for the tank 21. As with the other variations, this air then separates itself and rises to the surface of the pipe 22, then continues to surface itself as it passes under the air capture tank 8, trapping the compressed air into a uniform and usable body of compressed air.

FIGS. 43-47 depict yet another example of an energy conversion system in accordance with embodiments of the present disclosure. This particular energy conversion system comprises a water inlet pipe 1 that is pressurized by either a city water tower, a pump, or some form of pressurized and/or falling water. As with previous systems, the water in the inlet pipe 1 will flow across the exit of air inlet pipe 2, initiating the flow of air from the air inlet pipe(s) 2 into the stream of water via the air inlet pipe 2. This air and water mixture will then exit the end of the water inlet pipe 1 at a point located near the bottom of a water tower of any size appropriate for the application. An air capture tank 23 will be fixably located above the exit of the water inlet pipe 1, allowing the compressed air bubbles being forced out the bottom of the pipe 1 to be trapped as they attempt to float to the surface.

Figure 46:
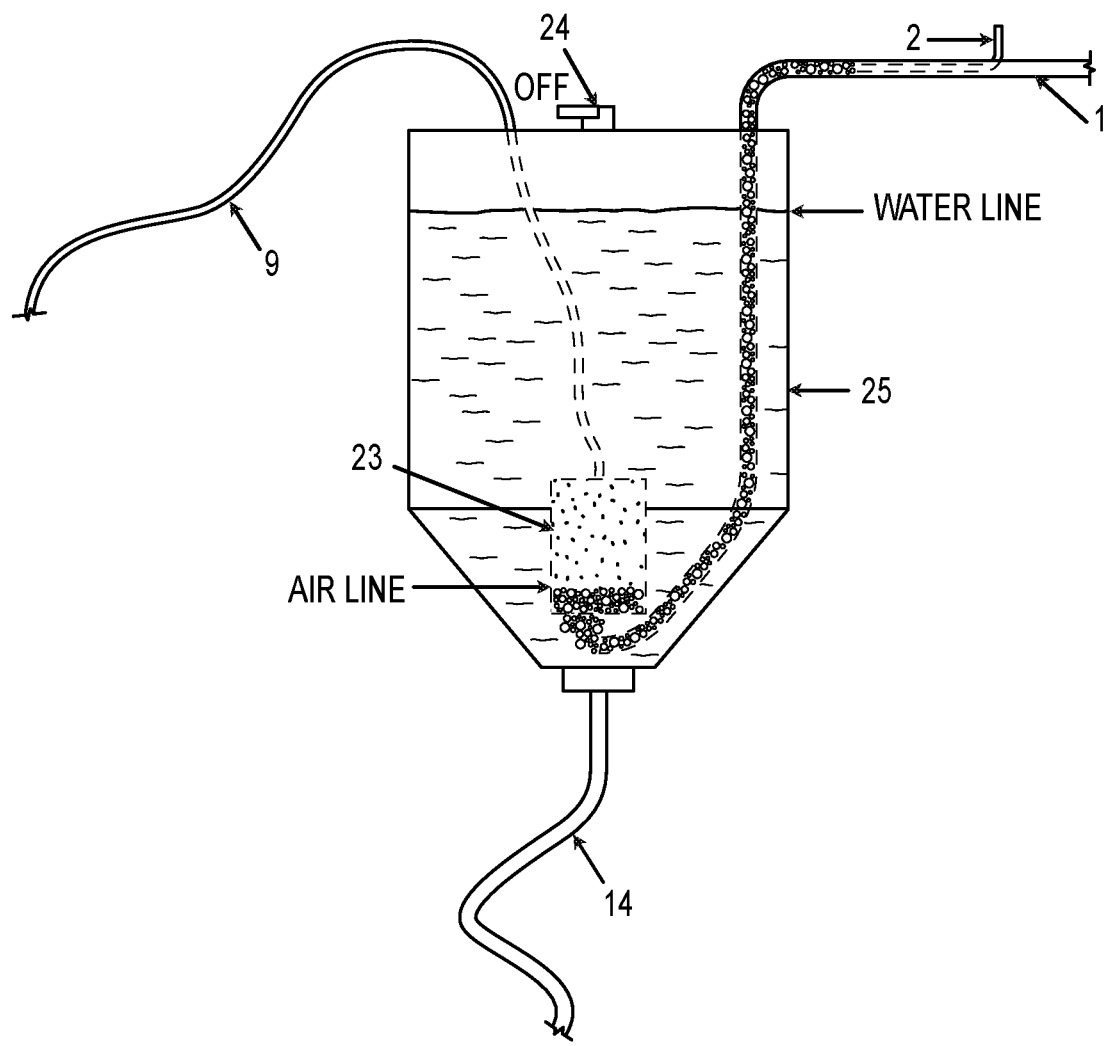
FIG. 46 is a section cut view of the system depicted in FIG. 43 with its valve in the off position.

FIG. 46 shows the system in operation. Once again, pressurized water enters through the water inlet pipe 1, which passes over the end of the air inlet pipe 2, which causes air in the air inlet pipe 2 to combine with the water in pipe 1, creating an air and water mixture that is now forced underwater in a water tower 25. The air and water mixture exit the end of the main inlet pipe 1 directly at the bottom of a water tower that is full of water. Both the air and water are dispelled into the water tower, allowing the user to turn "on" the water outlet 10 from the main tank and use the water as desired (water plants, flush toilets, run sinks, etc.). If both the water outlet 10 and water inlet 1 are matched in terms of water flow, the water tower 25 will remain full for this entire process. The water is now pumping through the water tower, providing water as previously desired. The difference is that the system has now stored a usable volume of compressed air during the process. This compressed air can be stored or used as previously described.

Figure 47:
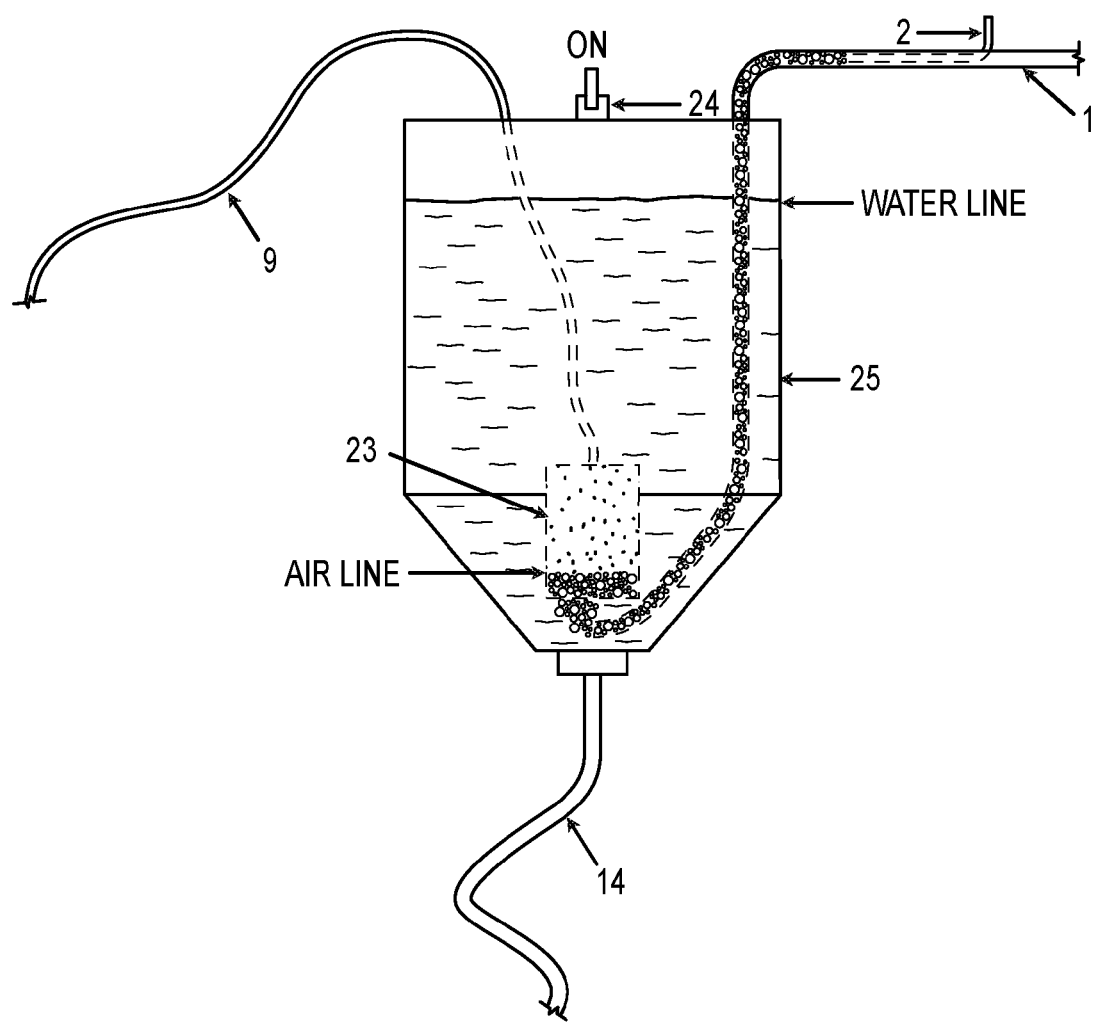
FIG. 47 is a section cut view of the system depicted in FIG. 43 with its valve in the on position.

FIG. 47 depicts an embodiment in which the top of the water tank 25 has a valve 24 that can be closed and/or opened either manually or by automatic control. Closing this valve 24 will additionally pressurize the main tank 25. The pressure being forced in by the incoming water, will provided additional pressure to the main tank 25, which will assist in pushing water out of the main tank for use by the outlet line 10. This additional pressure will also provide more pressure to the air caught in the air capture tank 8, allowing it to push the captured air out at a higher rate/pressure, which allows the system to push the captured air further. This alteration is only an option and may require pressure regulation. As an example, if the pressure in the tank reaches a pressure rating of roughly 80 psi, that could provide too much pressure to the main tank 25, fighting the pressure coming out of the inlet tube(s) 1 and preventing the air/water mixture from entering tank 25.

Any of the energy conversion systems disclosed herein may be used in unique applications where bubbles of air are already being driven underwater. An example of this is water exiting a dam. Usually a great deal of water and hydraulic energy is forced into a river, creating a deep pool of turbulent water. As the water is driven into the pool in the river, the force of the interaction causes air bubbles to be folded into the water and forced underwater. The distance underwater that the bubbles are driven is related to the amount of force and water being dumped into the pool, as well as the depth of the pool and the shape and speed of the water exiting the dam. Regardless of how far and how efficiently the bubbles are being directed underwater, these bubbles can be trapped and harnessed as previously described herein.

With reference now to FIGS. 48-51, still further examples of an energy conversion system will be described in accordance with at least some embodiments of the present disclosure. These particular figures depict an energy conversion system that can be used to create compressed air from any lake, ocean, or body of water with an outlet river, stream, waterfall, or dam. Much like other energy conversion systems described herein, this system captures air, compresses the air, and makes it available for use as an energy source. This system can be assembled off-site and inserted as an entire unit (not limited to this) directly into a lake, for example, without modification to the ground, whether it's the lake bottom or the shoreline. To operate the system, water enters the main water inlet 1 directly from the lake or ocean. This water will pass over the end(s) of the air inlet tube(s) 2 causing the air to be pulled into the falling stream of water in the water inlet pipe(s) 1. This air and water mixture will be pulled down into an air separation pipe 26 where the air will start to naturally separate itself from the stream of water, creating a path of water on the bottom of the pipe 26 and compressed air at the top of the pipe 26. As with previously mentioned systems, the air will attempt to rise to the surface as it passes under the compressed air capture tank 8, causing the air to vertically enter the capture tank 8 and trap the compressed air for use as an energy source. A small pipe or tube 9 can be used to tap into the newly created compressed air.

Figure 48:
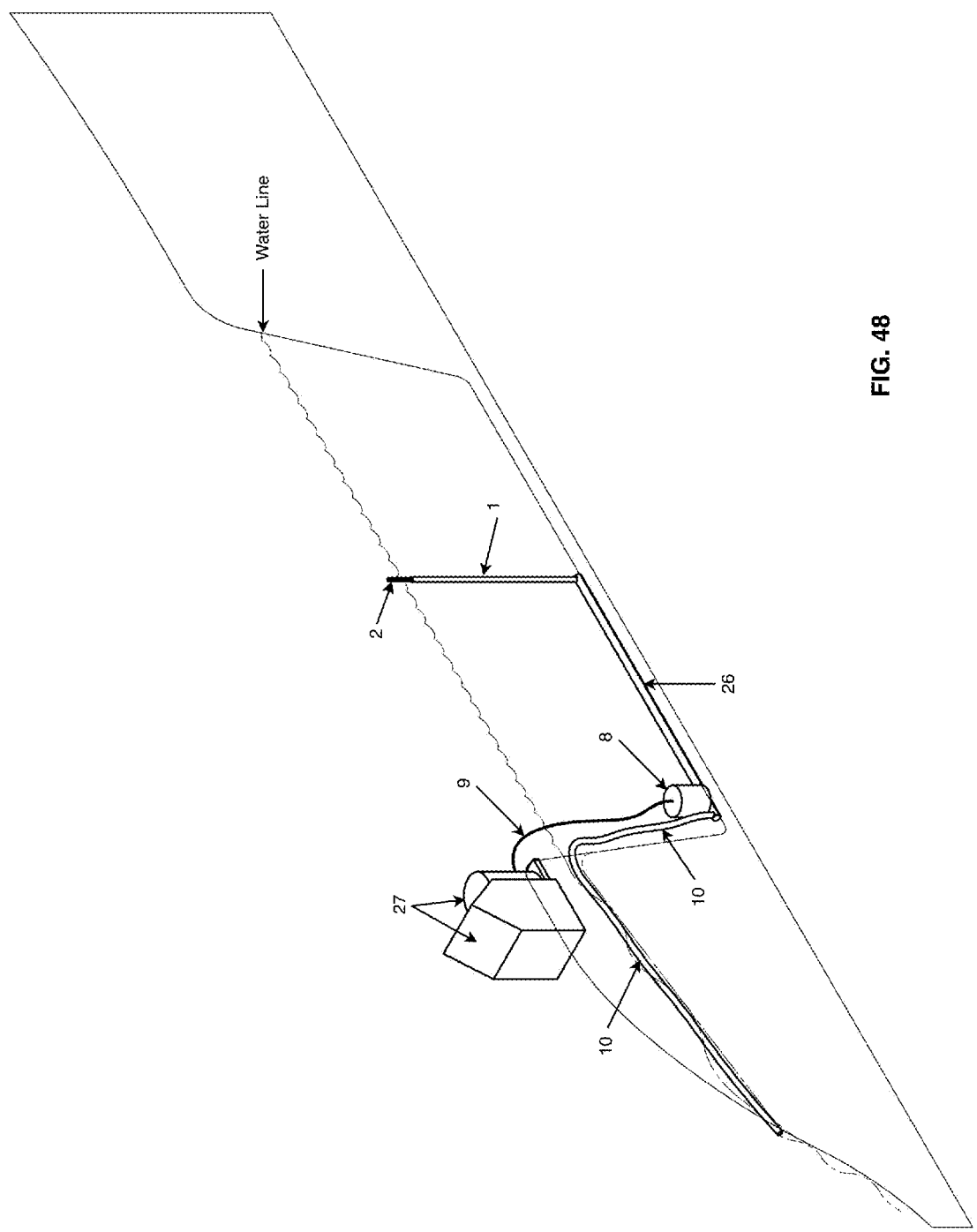
FIG. 48 is a sectional isometric view of yet another energy conversion system in accordance with embodiments of the present disclosure.
Figure 49:
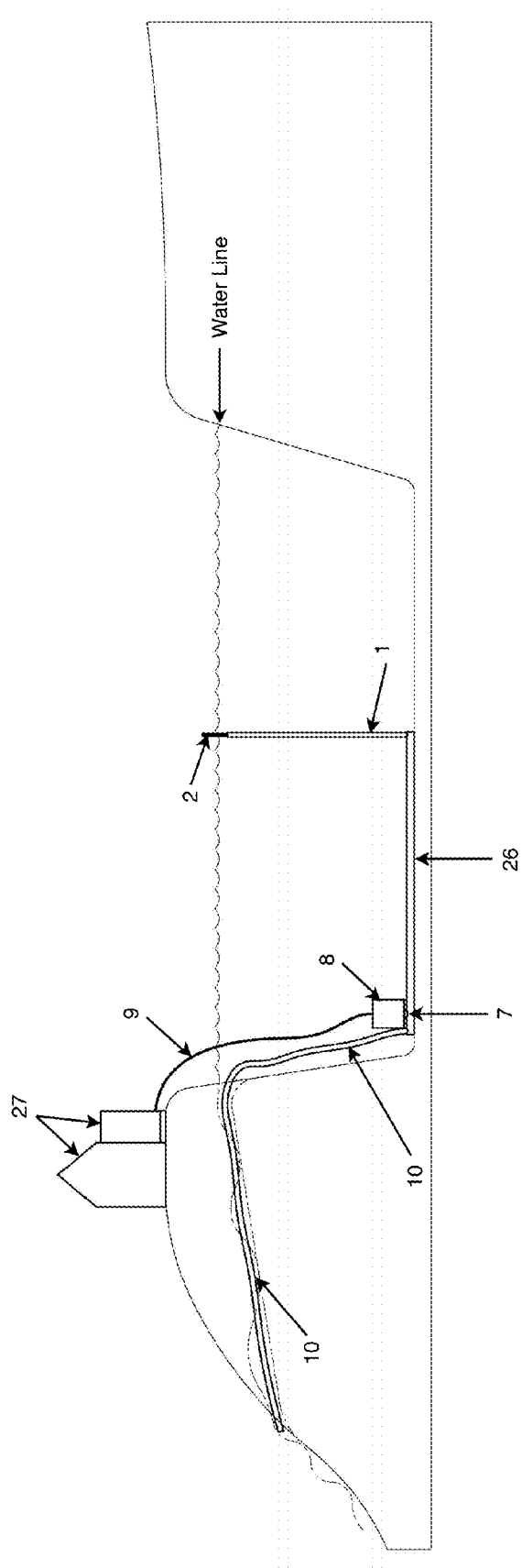
FIG. 49 is a section cut side view of the system depicted in FIG. 48.

FIGS. 48-49 depict the energy being routed into a small storage and electrical energy creation structure 27. This structure 27 is only an option and is not meant to limit the scope of the invention. The compressed air energy can be tapped directly to operate tools or generators, or the energy in the form of compressed air, can be stored for future use.

The water, now separated from the air, will continue on its path through the system. In this embodiment, that path for the water would be the water outlet pipe 10, causing a siphon, dropping water down the inlet pipe 1 and then lifting it again using the siphon in the water outlet pipe 10. In FIGS. 48-49, the energy conversion system directs the siphon up and over the bank of the ocean, lake or body of water. The siphon will function properly if the exit of the water outlet pipe 10 is lower in elevation than the entrance of the water inlet pipe(s) 1.

Figure 50:
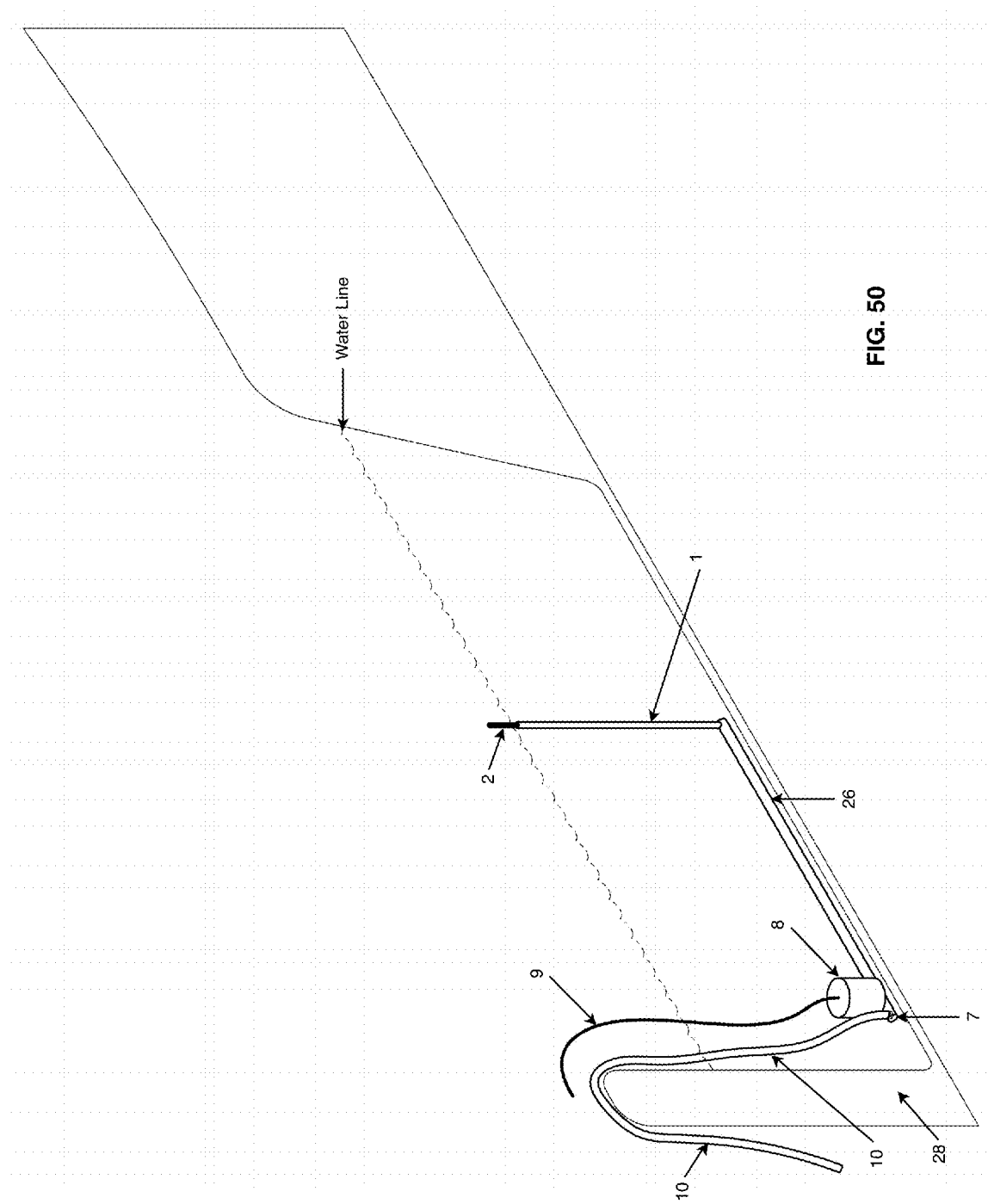
FIG. 50 is a sectional isometric view of the system depicted in FIG. 48, except with a dam.
Figure 51:
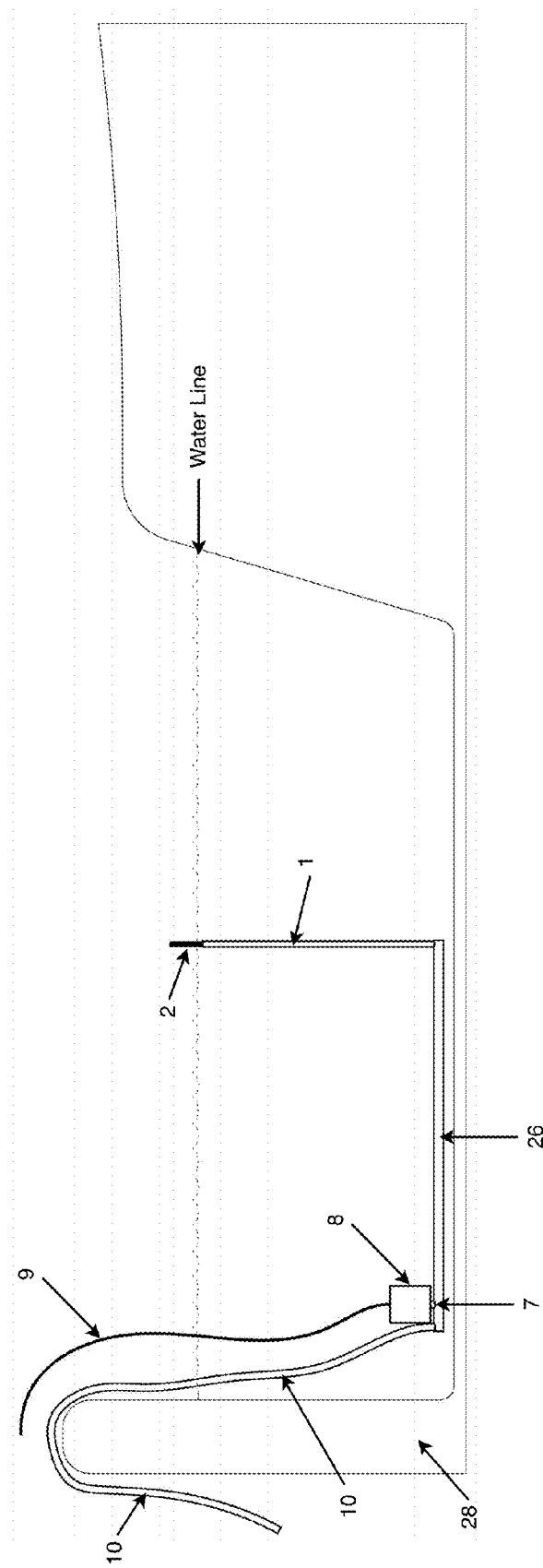
FIG. 51 is a section cut side view of the system depicted in FIG. 50.
Figure 52:
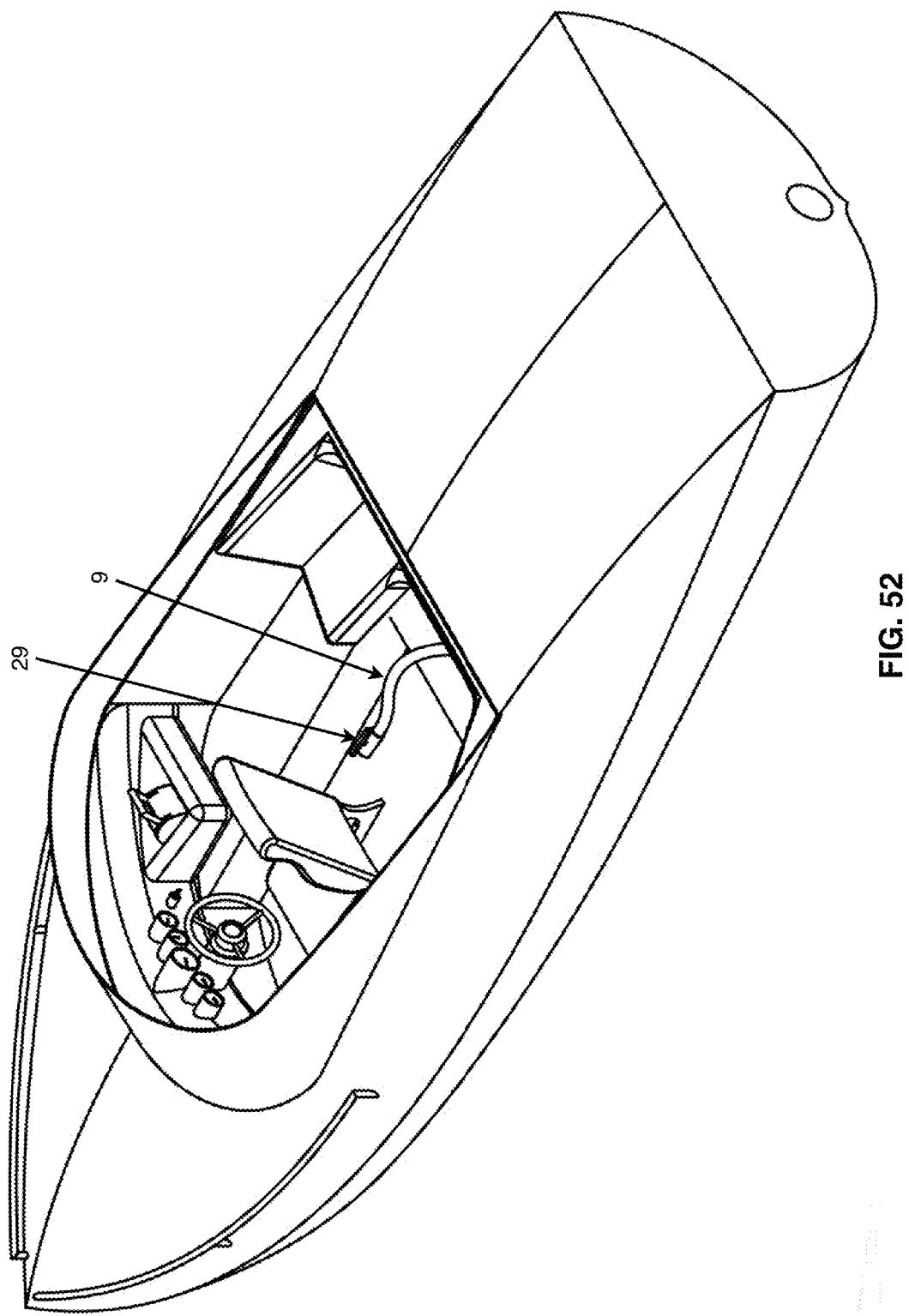
FIG. 52 is a top isometric view of yet another energy conversion system in accordance with embodiments of the present disclosure.
Figure 53:
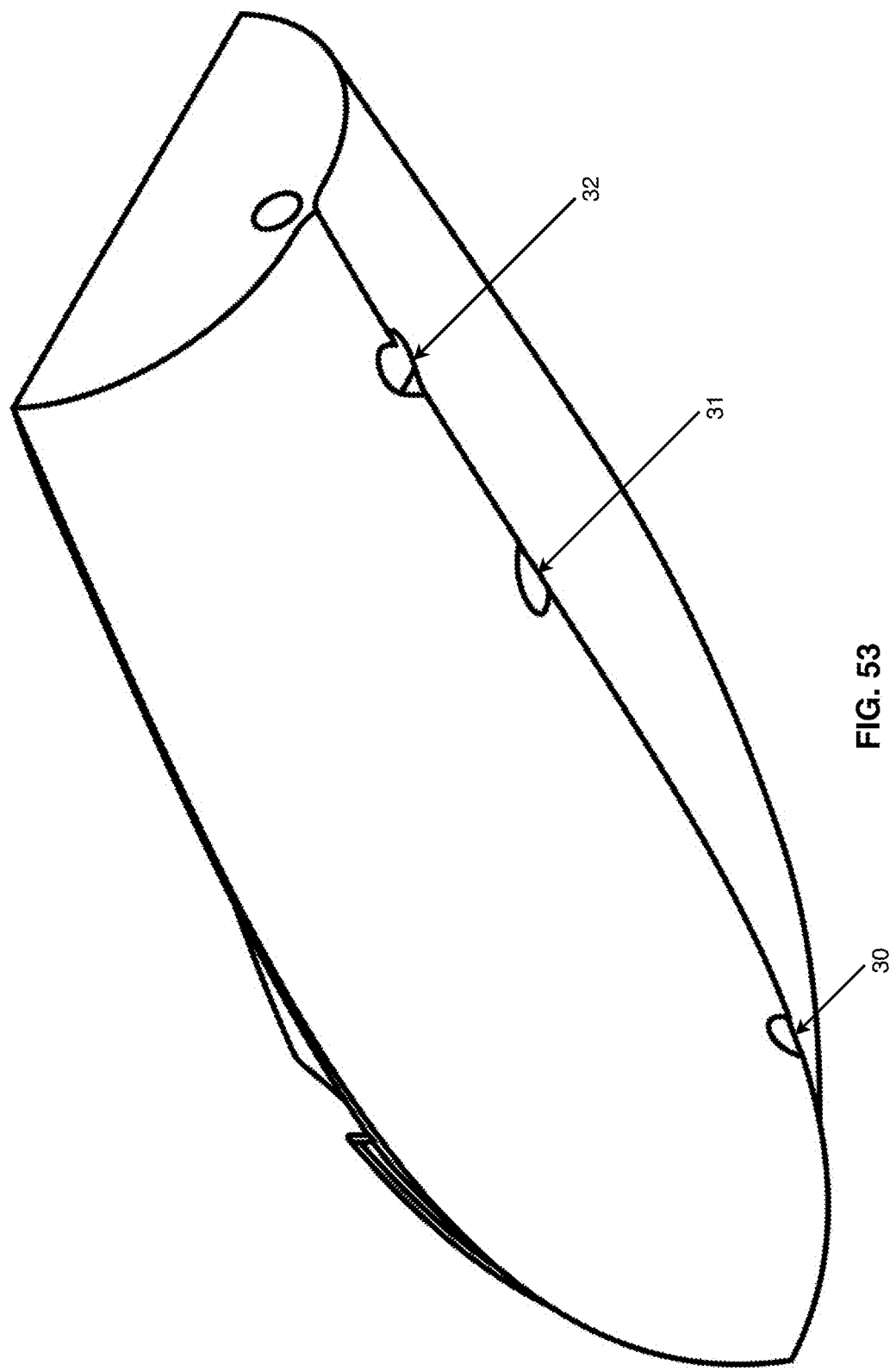
FIG. 53 is a bottom isometric view of the system depicted in FIG. 52.
Figure 54:
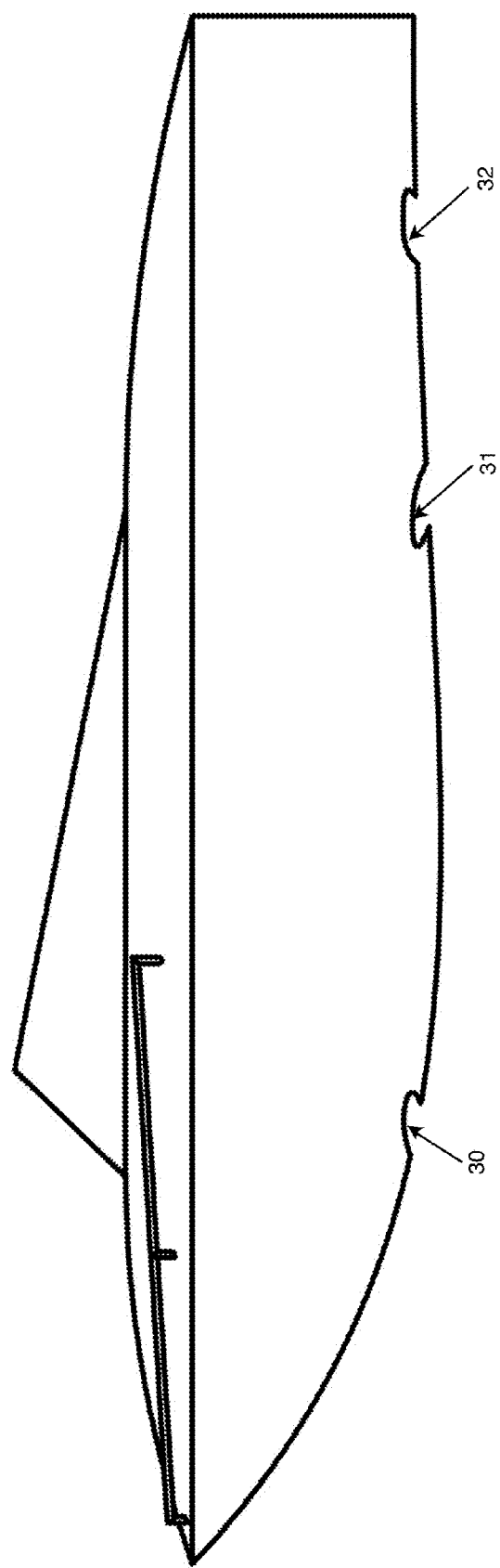
FIG. 54 is a side view of the system depicted in FIG. 52.
Figure 55:
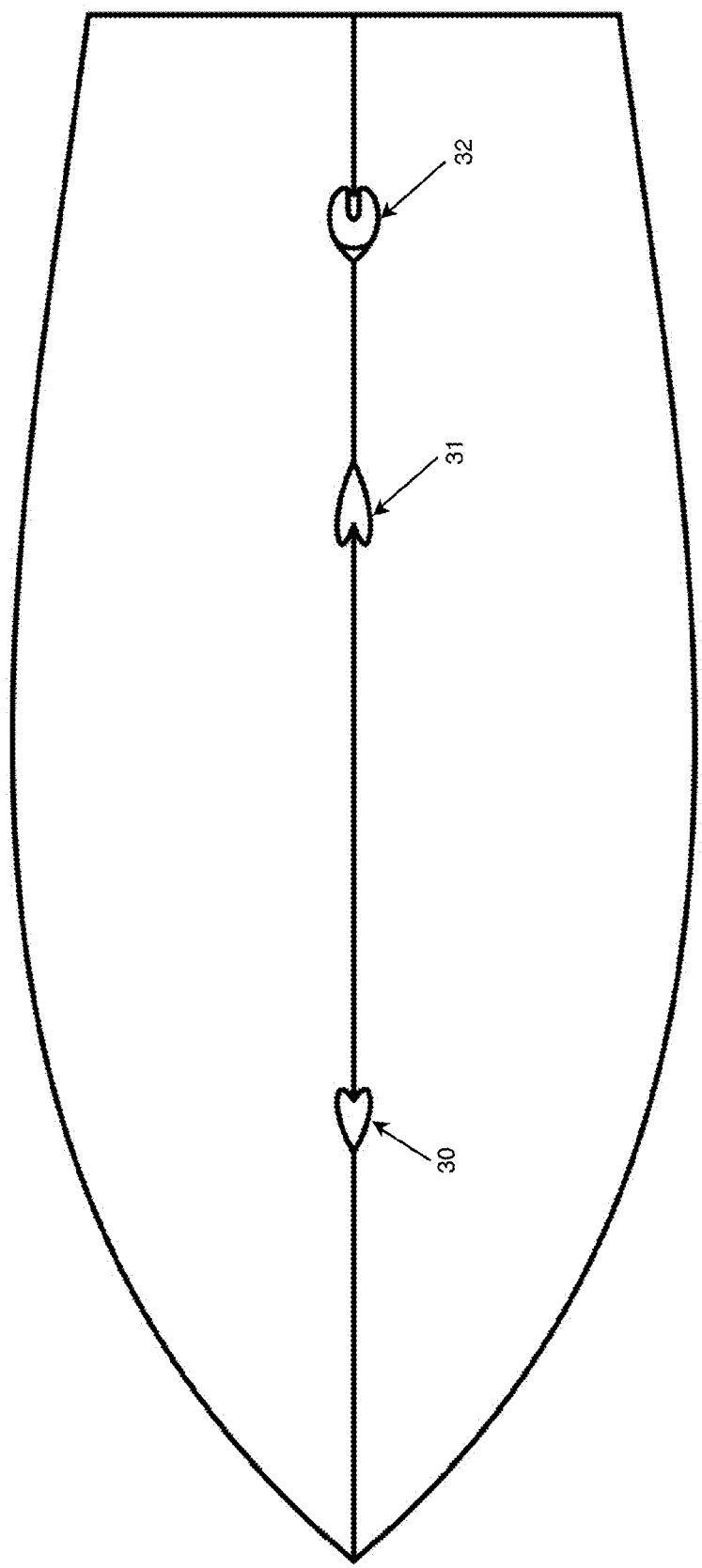
FIG. 55 is a bottom view of the system depicted in FIG. 52.
Figure 56A:
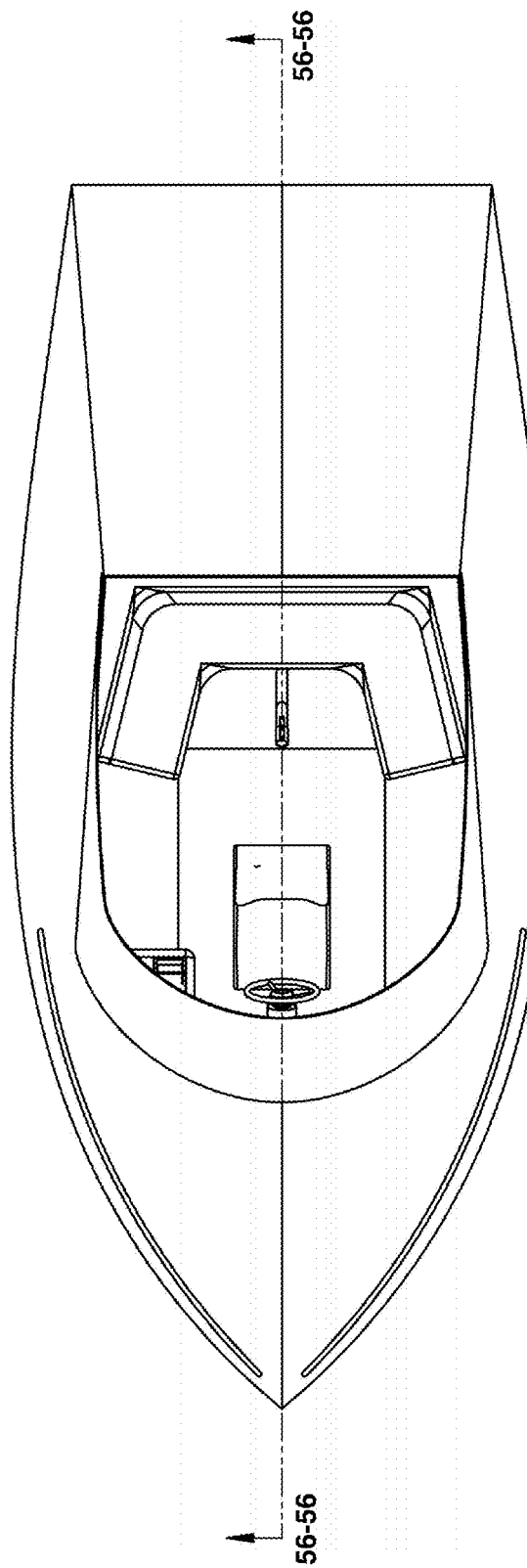
FIG. 56A is a top view of a first variation of the system depicted in FIG. 52.
Figure 56B:
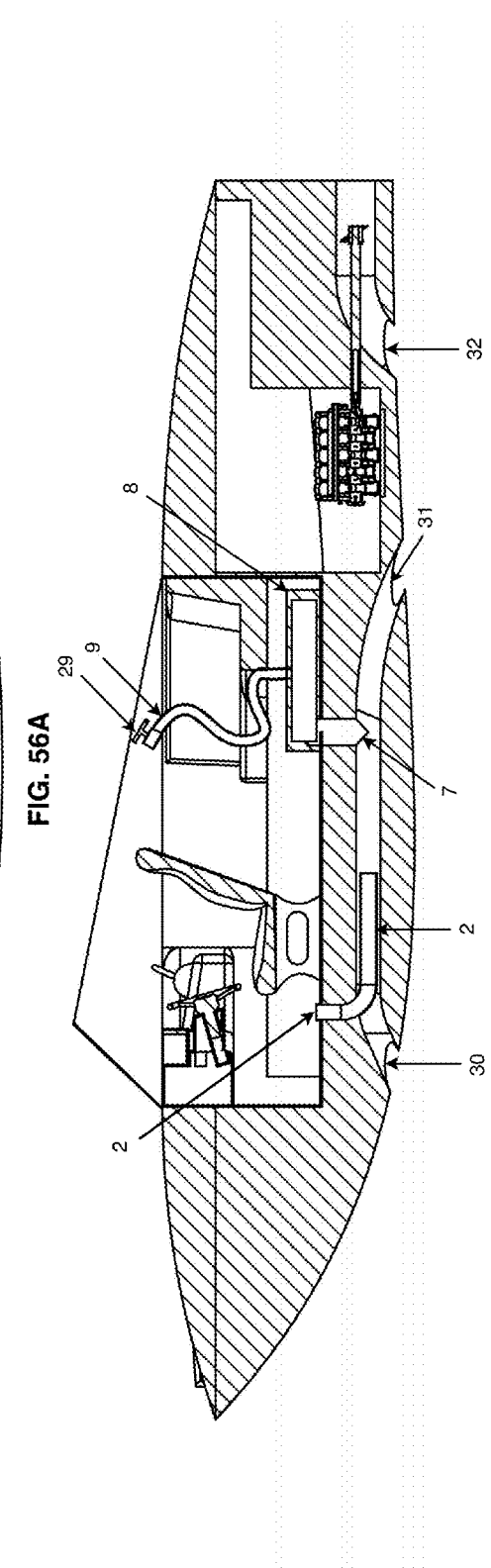
FIG. 56B is a section cut view along line 56-56.

In the example of FIGS. 50-51, the energy conversion system actually routes the water outlet pipe 10 up and over a dam 28 itself. In this variation, the system can be used to operate a dysfunctional dam or create an alternative energy solution to the current dam energy. In some embodiments, a portion of the water outlet pipe 10 is located well above the entrance to the water inlet pipe 1. As with any siphon, this is achievable, as long as the exit of the pipe 10 is located at a lower elevation than the entrance to the water inlet pipe 1. In this variation, the system is capable of climbing over a shoreline, dam or bank, but requires an outlet river, stream or some ability to expel water from the system at a lower elevation than the incoming water.

Embodiments discussed in connection with FIGS. 48-51 allow for the energy conversion system to be created at a different location and simply dropped into place in the bottom of a lake or body of water (not limited to this). Prior art hydraulic air compressors require the use of a large hole to drop the water underground and create the siphon effect. The energy conversion system for lakes, oceans and still-water, provides a system that can not only be inserted into a lake or still-body of water, but it also allows the system to route the water up and over a bank, dam 28 or high point. Additionally, a similar energy conversion system can be used to create compressed air energy off of water that is routed around a dam for high water reasons. A spillway is a typical device for routing excess water around the dam. This spillway can be fitted with any type of energy conversion system disclosed herein.

With reference now to FIGS. 52-59, still another example of an energy conversion system will be described in accordance with at least some embodiments of the present disclosure. The system represents a solution where the movement of water is imparted, not necessarily due to the inherent motion of the water, but instead due to the movement of an object (e.g., a vessel, boat, ship, cruise ship, tanker, submarine, etc.) relative to the water. The depicted example shows a boat fitted with an energy conversion system.

In the depicted embodiments, the boat can be fitted with an air capture tank 8 that is attached to an interior (or exterior) portion of the boat and receives air-enhanced fluid via a tank opening 7. The tank opening 7 is positioned above (e.g., on top of) a pipe that extends from a water inlet port 30 to a water outlet port 31. As water flows into the water inlet port 30 due to the motion of the vessel, the water is pushed through the pipe toward the water outlet port 31. The position, size and location of the pipe can vary dramatically and is not meant to limit the scope of the invention. The motion of the water within the pipe imparts at least one of a vacuum effect, jet effect, vortex effect, Venturi effect, pressured differential effect, and/or siphon effect on an air inlet tube 2.

This imparted effect causes air to be pulled into the water pipe via the air inlet tube 2. Thus, the water contained within the pipe just beneath the opening 7 of the tank is air-enhanced, meaning that at least some of the air received from the air inlet tube 2 is present in the water pipe and capable of being captured in the tank 8 due to the gas (e.g., air) rising through the opening 7. Once the air is contained within the tank 8 it can be used for a myriad of purposes. In particular, a hose or pipe 9 may carry air from the tank 8 to some location where it is used and a valve 29 may control the amount of air used at any time.

Although not shown, another valve may be provided between the tank 8 and opening 7 to limit additional water entering the tank 8 when the vessel is not moving. Depending upon how far the water pipe and capture tank 8 is submerged below the water level, the amount and pressure of air within the tank 8 may vary. Furthermore, the uses of the air within the tank 8 may vary upon how much air is contained within the tank 8 and the pressure of that air. Examples of such uses include, without limitation, powering gas-powered tools, assisting HVAC services, operating a turbine for conversion into electrical energy, lifting objects, etc.

If additional compression is desired at the opening 7, then it may be desirable to provide a reducer 33 between the opening 7 and the water outlet port 31, thereby increasing the pressure of the air-enhanced fluid at the opening 7. Although the water pipe is depicted as being integral to the hull of the boat, it should be appreciated that the pipe may be external to the hull of the boat. Further still, it may even be possible to achieve air capture without the use of a pipe and air inlet tube 2. Instead, it has been observed that water bubbles inherently occur and move across the hull of a boat in motion. This fact may be exploited by simply placing the opening 7 (or multiple openings) at the bottom of the hull and possibly toward the stern of the boat. It should be appreciated that the trapped air could also be used as an energy-saving device where the bubbles traveling across the hull of a boat or ship can simply reduce friction and be the purpose of the air inlet device. In other words, the air inlet could be used to push bubbles onto the hull of the ship to reduce friction and increase efficiency. The bubbles could then, optionally, be re-captured as previously described.

While the boat is depicted as a relatively short in-board motor boat having motor piping 32, it should be appreciated that outboard motor boats, larger vessels (e.g., cruise ships, tankers, submarines, etc.) may also benefit from embodiments of the present disclosure.

Figure 59:
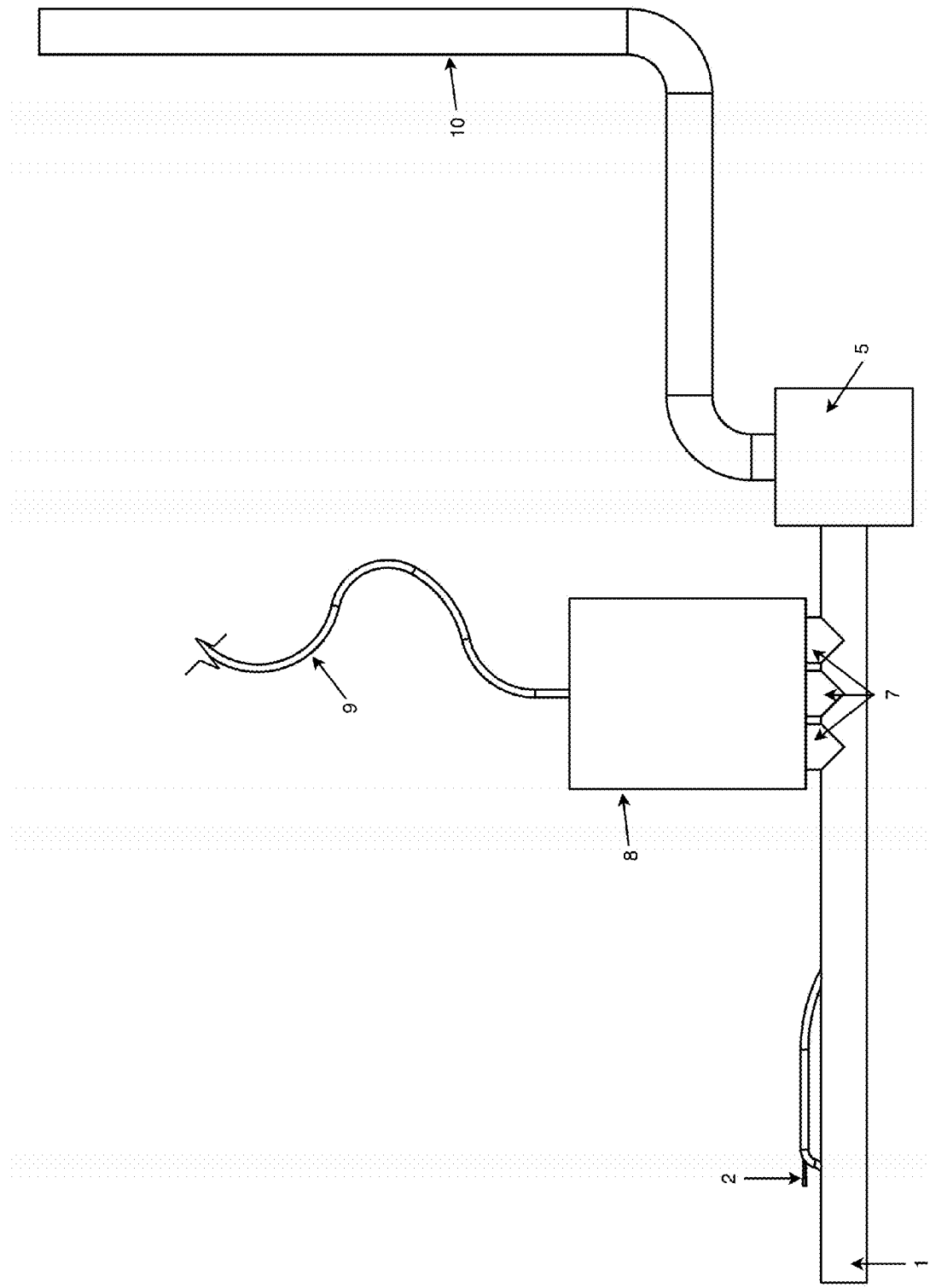
FIG. 59 is a side view of still another energy conversion system in accordance with embodiments of the present disclosure.
Figure 60:
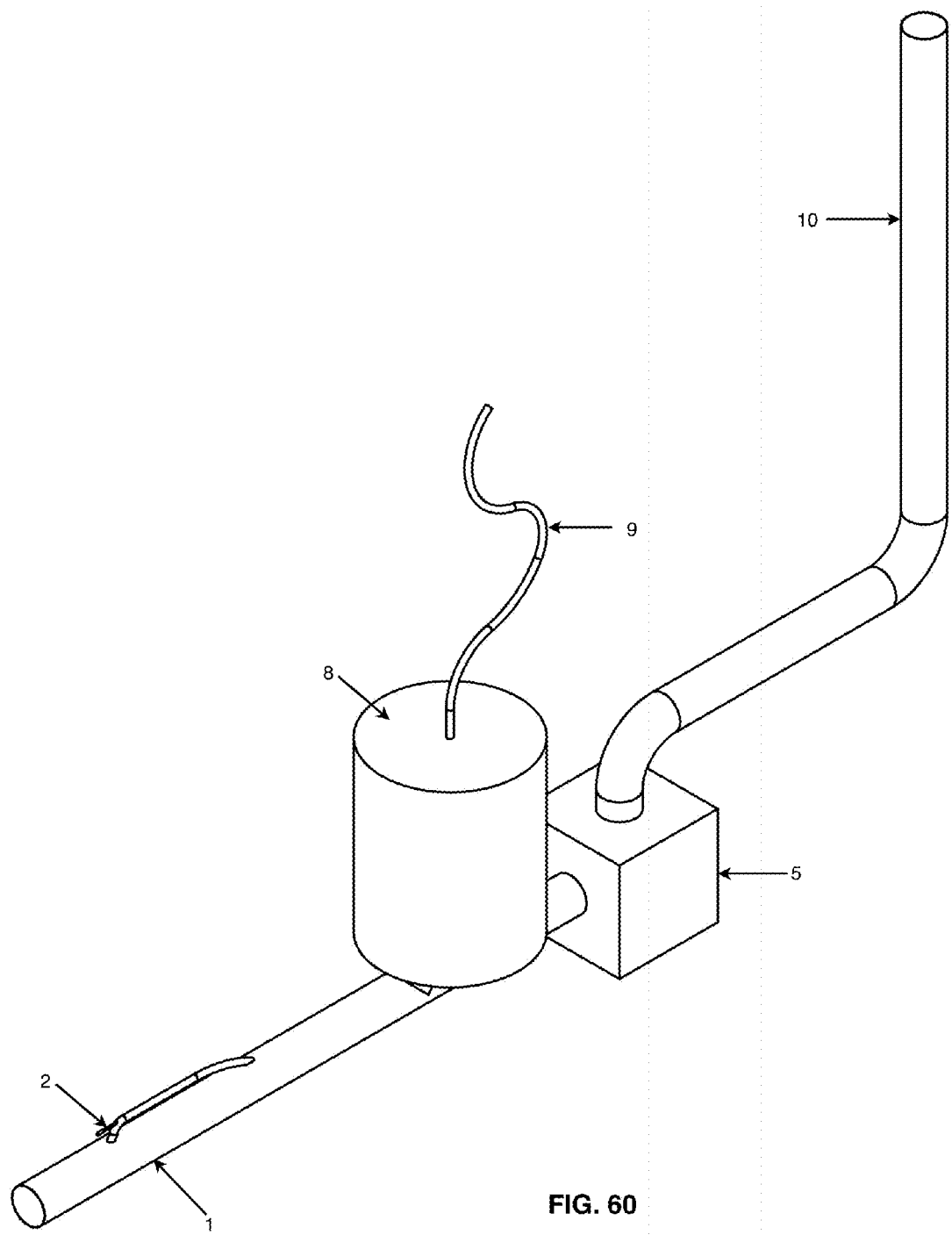
FIG. 60 is an isometric view of the system depicted in FIG. 59.
Figure 61:
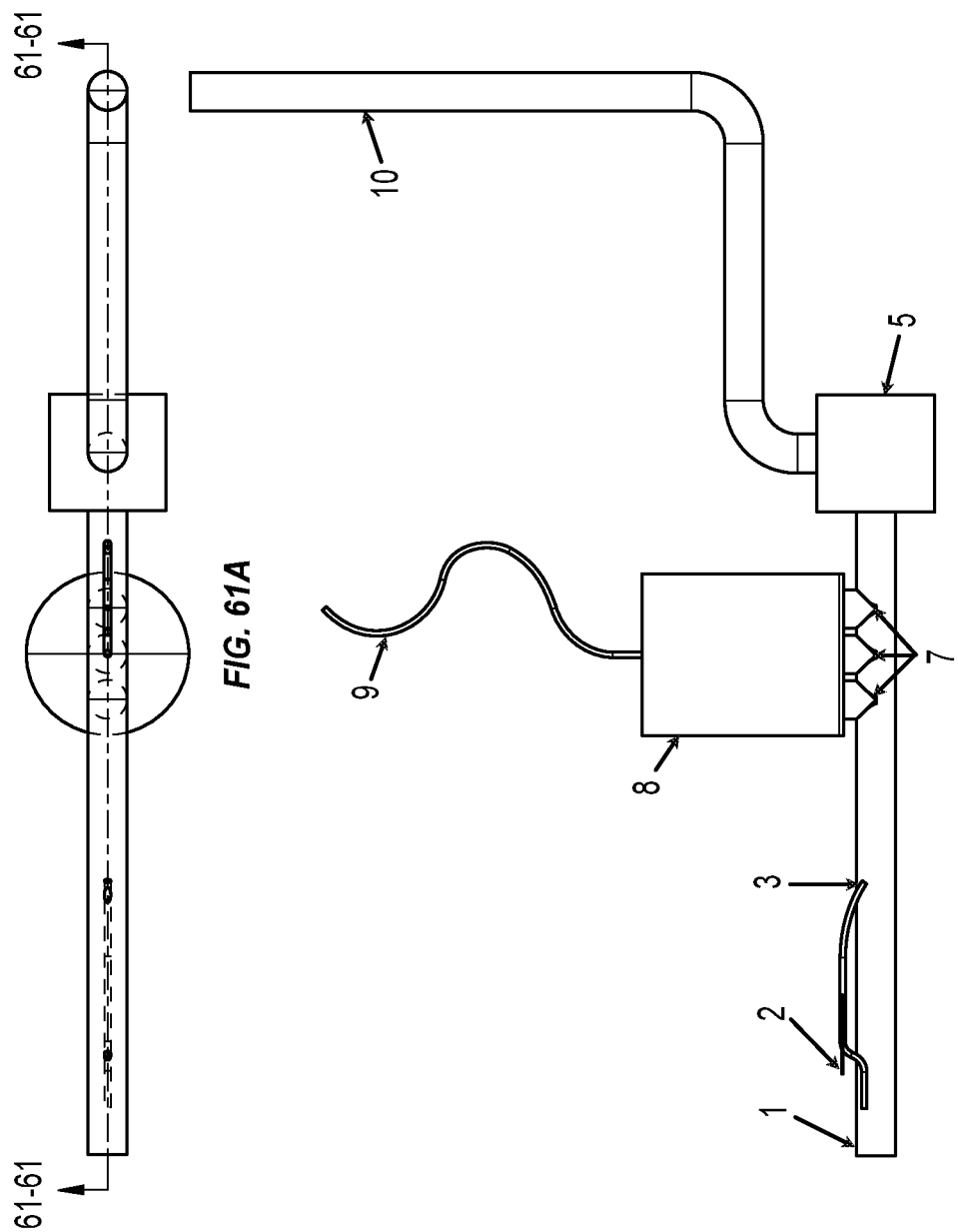
FIG. 61A is a top view of the system depicted in FIG. 59.
FIG. 61B is a section cut view along line 61-61.

FIGS. 59-61 depict still another example of an energy conversion system in accordance with embodiments of the present disclosure. This particular system shows the tank 8 and openings 7 as being on the input side of the pump 5 along with the air inlet tube 2. Accordingly, the position of the tank 8 and/or air inlet tube 2 may be both on the input side of the pump 5, both on the outlet side of the pump 5, or split across the pump 5.

Figure 62:
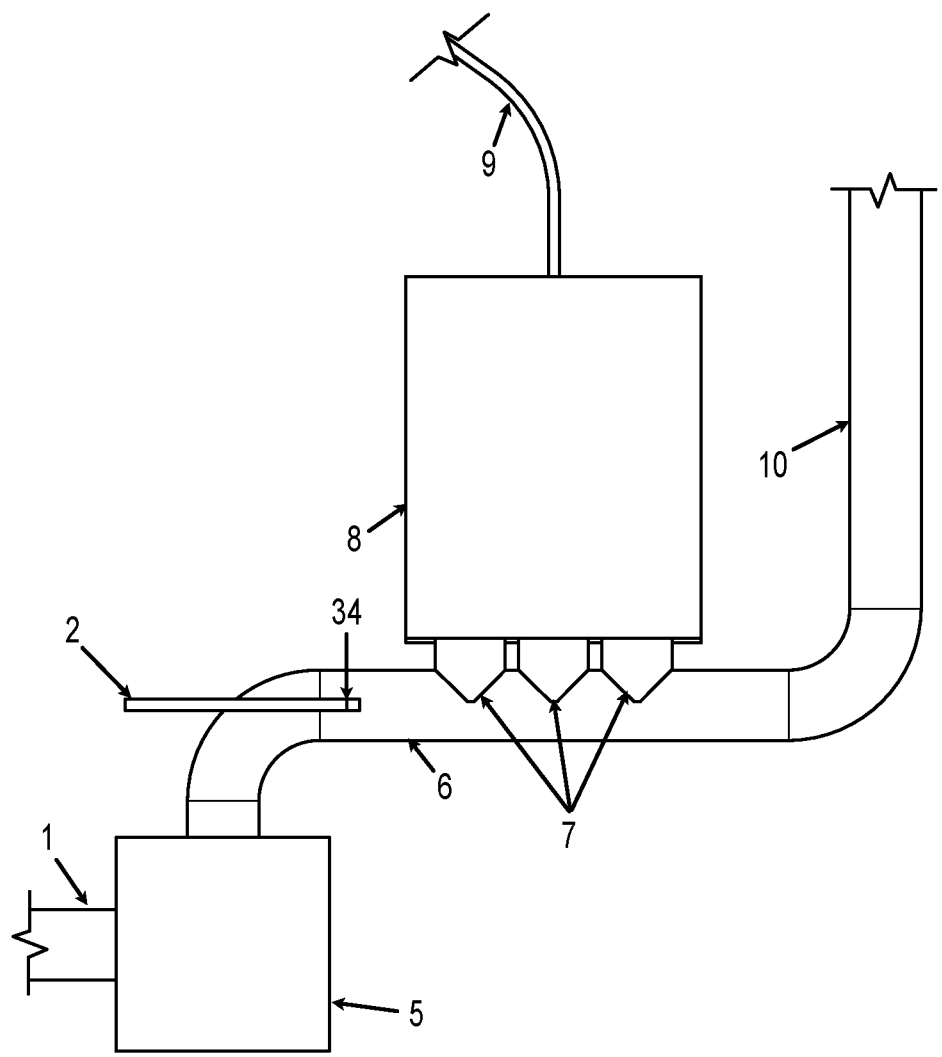
FIG. 62 is a section cut view of one variation of the system depicted in FIG. 59.
Figure 63:
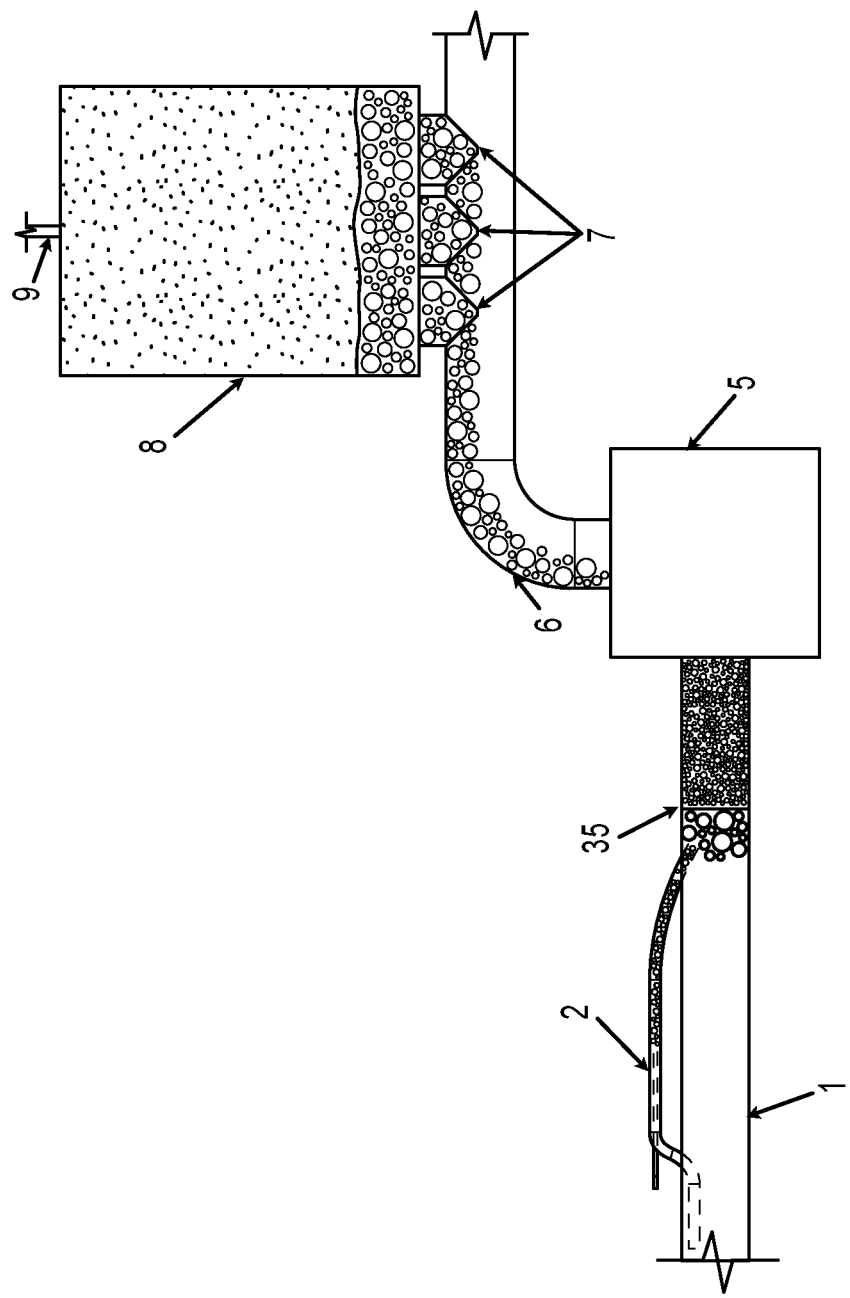
FIG. 63 is a section cut view of a second variation of the system depicted in FIG. 59.

With reference now to FIGS. 62-63, still another example of an energy conversion system will be described in accordance with embodiments of the present disclosure. The device 34 shown in FIG. 62 corresponds to a semi-permeable membrane that can assist in preventing over-pressurized water from exiting the air inlet tube 2. This membrane 34 can be made from any material used to prevent water from penetrating, while simultaneously allowing air or gas to pass through it. This membrane 34, which may also be referred to as a filter, can allow for a much larger air inlet tube 2, even as large as a full panel, creating a large surface area for the air inlet process. The membrane 34 finds particular benefit in high-pressure water situations similar to those following a pump 5 or water tower 21. The high-pressure water can overcome the Venturi or vacuum effect created by high-speed water passing over the end of the air inlet tube 2 and cause the undesired effect of causing the water to be forced out the air inlet tube 2. The membrane 34 can assist in the air inletting process by preventing the water from passing through the membrane 34, while still allowing air or gas to pass.

FIG. 63 depicts a second example of a device 35 that can be used in combination with any of the energy conversion systems disclosed herein. The device 35 may correspond to a screen or the like that is used to break up the bubbles prior to entering the pump 5. By adding a screen-like device 35 to only the top of the pipe 1, it is possible to reduce the resistance and friction that the screen like device 35 places on the water or water entering the pump 5, creating a more efficient energy conversion system.

With reference now to FIGS. 64-68, illustrative uses of high-pressure water typically provided by a water tower 21 or pump 5 will be described in accordance with embodiments of the present disclosure. Specifically, the application shown in FIGS. 64-68 uses built-up pressure to drive gears that run electric generators.

Figure 64:
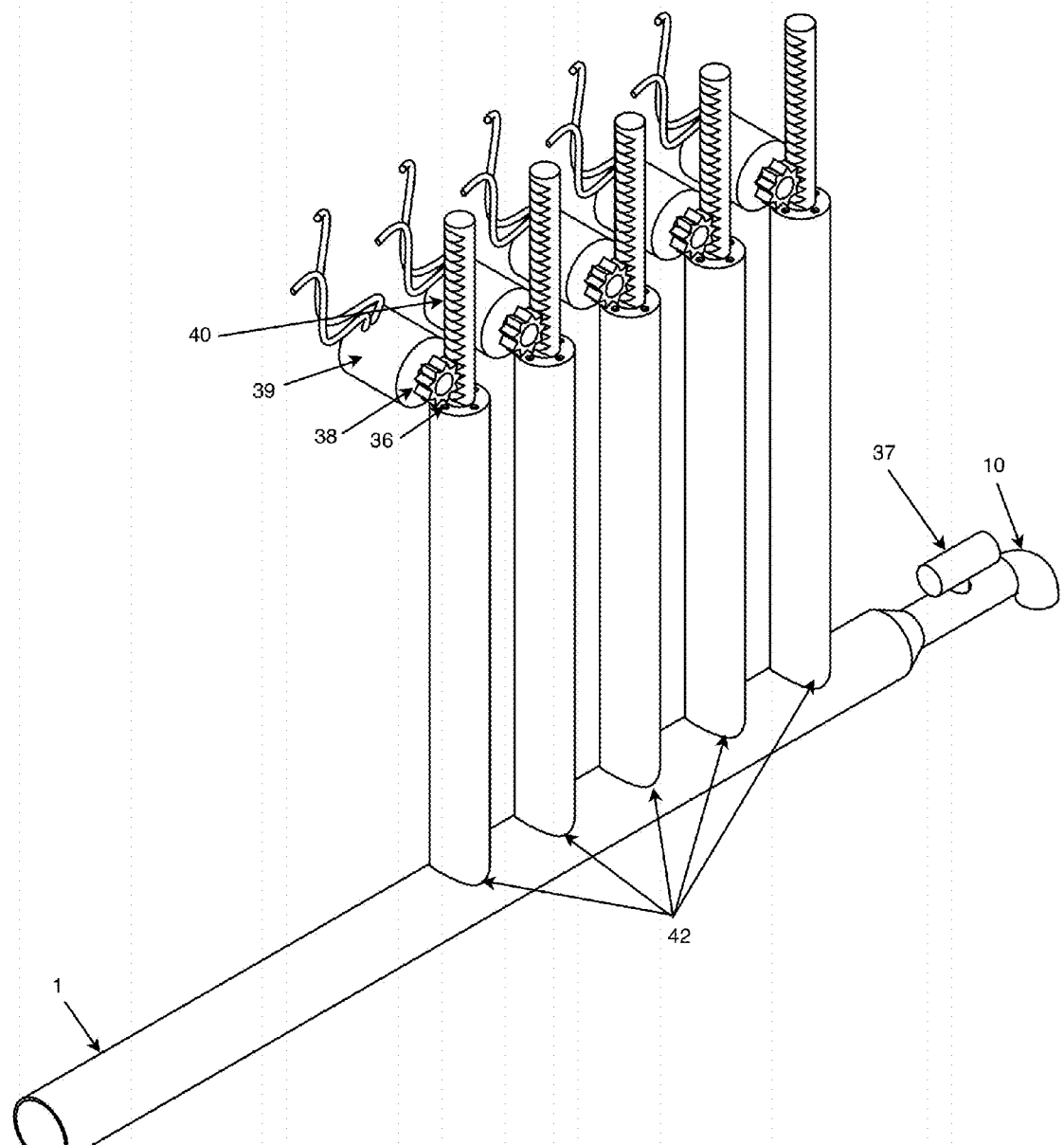
FIG. 64 is an isometric view of yet another energy conversion system in accordance with embodiments of the present disclosure.
Figure 65:
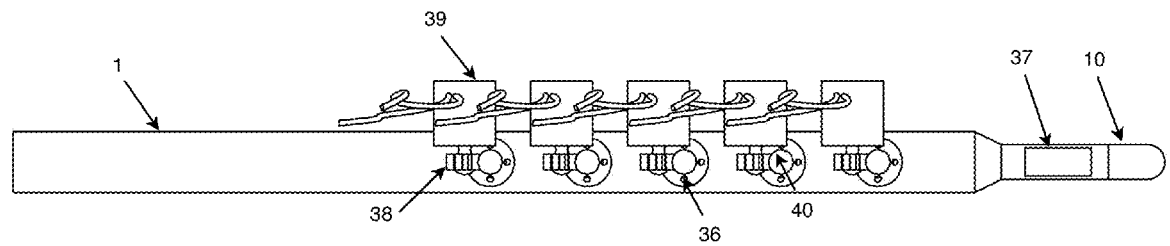
FIG. 65 is a top view of the system depicted in FIG. 64.
Figure 66:
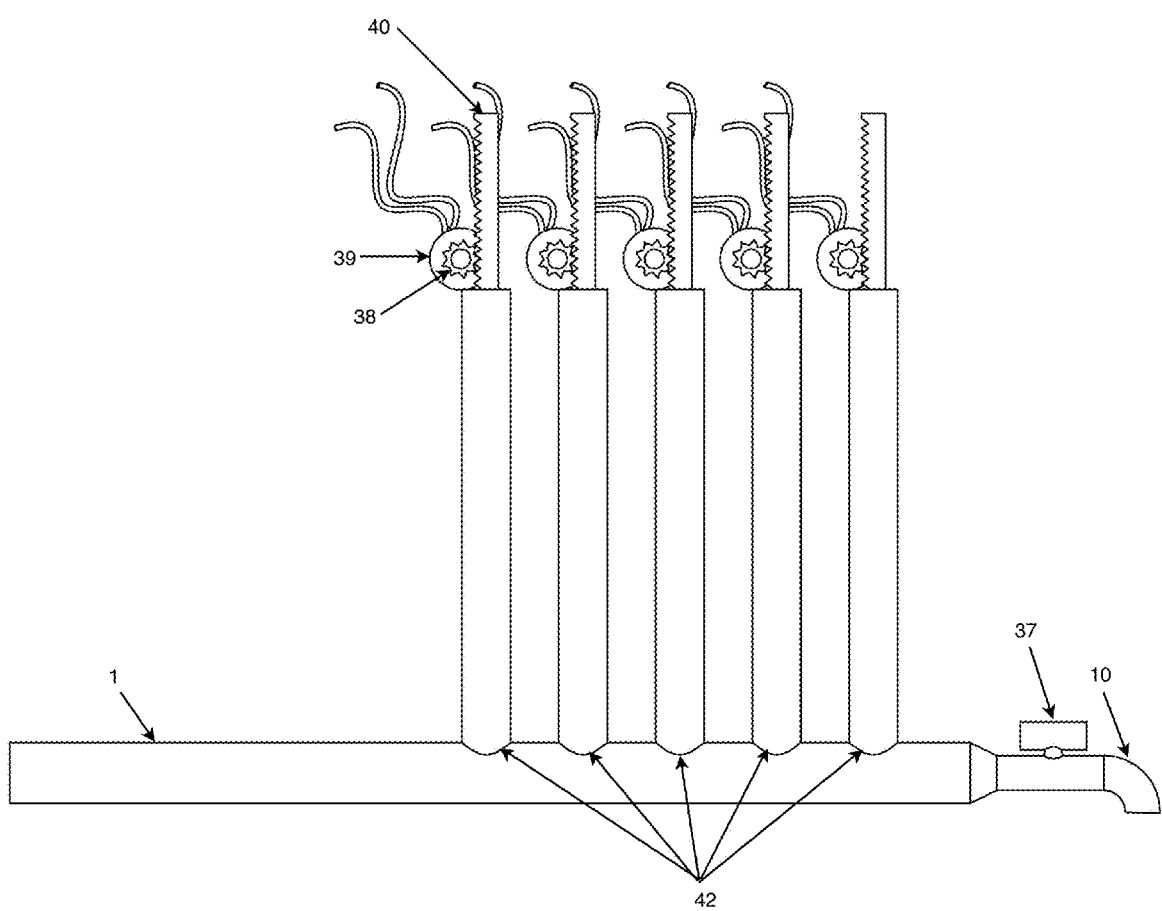
FIG. 66 is a side view of the system depicted in FIG. 64.

The energy conversion system depicted in FIGS. 64-68 employs high-pressure water typically provided by a water tower 21 or pump 5 to move pistons 40 up and down for a variety of applications. The application shown in FIGS. 64-68 is developed to drive gears that run electric generators, though this is only one of the many applications for this piston driven device, and is not meant to limit the scope of the present disclosure. FIG. 64 shows an isometric view of the device with pistons 40 driving small electric generators 39 by a simple rack and pinion setup. In this case, the rack is located on the piston 40 and the pinion gear 38 is driven by the rack, which turns the electric generator 39 to create energy in the form of electricity. Small air holes 36 allow unused air to pass back and forth from within the compression chambers 42 so that the piston can travel freely without the need to additionally compress the air trapped above the seal located at the bottom of the piston 40. These holes 36 can be any shape or size that allow sufficient air to release from above the cylinders. If the springs 41 are externally mounted, the pistons 40 can have the same outer diameter as the inner diameter of the compression chambers 42, removing the need for air release holes 36. This variation with externally mounted springs is not shown in the figures and is only an option, not meant to limit the scope of the invention. FIGS. 67 and 68 best demonstrate the device in action.

FIG. 67 shows a sectional view of the energy conversion system when the water is allowed to flow freely due to the valve 37 being open. The water in this example is being provided at a high pressure. For this example, consider that the water pressure is approximately 72 psi, which is a common water pipe pressure provided typically by the use of a water tower. High-pressure water is forced through a pipe 1 towards an on/off valve 37. The on/off valve 37 can simply be any valve 37 that uses the high-pressure water like a sink, a toilet, a shower, or any device that uses the pressurized water coming from a pump 5 or a water tower 21. When the valve 37 is open, the pressurized water pipe 1 forces water to flow freely through the valve 37, the pipe 1, and in this configuration, the compression chambers 42; lowering the pressure in the pipe 1 from the initial 72 psi and increasing water flow. This allows the springs 41 in the compression chambers 42 to expand and assist in retracting the pistons 40 into the compression chambers 42.

When the valve 37 is closed (the water is shut-off), shown in FIG. 68, the water pressure in the pipe 1 builds back to its initial 72 psi. This pressure increase pushes directly on the pistons 40 in the compression chambers 42, compressing the springs 41 thereby running the rack against the pinion gear 38 with force, which drives the electric generator 39.

When the valve 37 is once again opened FIG. 67, the pressure again drops, recessing the pistons 40, and resetting the device for another high-pressure push. Every time the faucet or toilet is operated (in this example), the pistons 40 retract and then drive out with force, operating an electric generator 39. If, for example, the user were to turn on and off the water multiple times while washing their car, the pistons 40 would expand and retract for every time they open and close the valve 37. The system does not necessarily operate on the amount of water consumed, but rather the number of times the valve 37 is opened and closed. This device operates off of increasing and decreasing pressure in a water pipe 1, which happens in every modern home or office, many times throughout a typical day.

Figure 69:
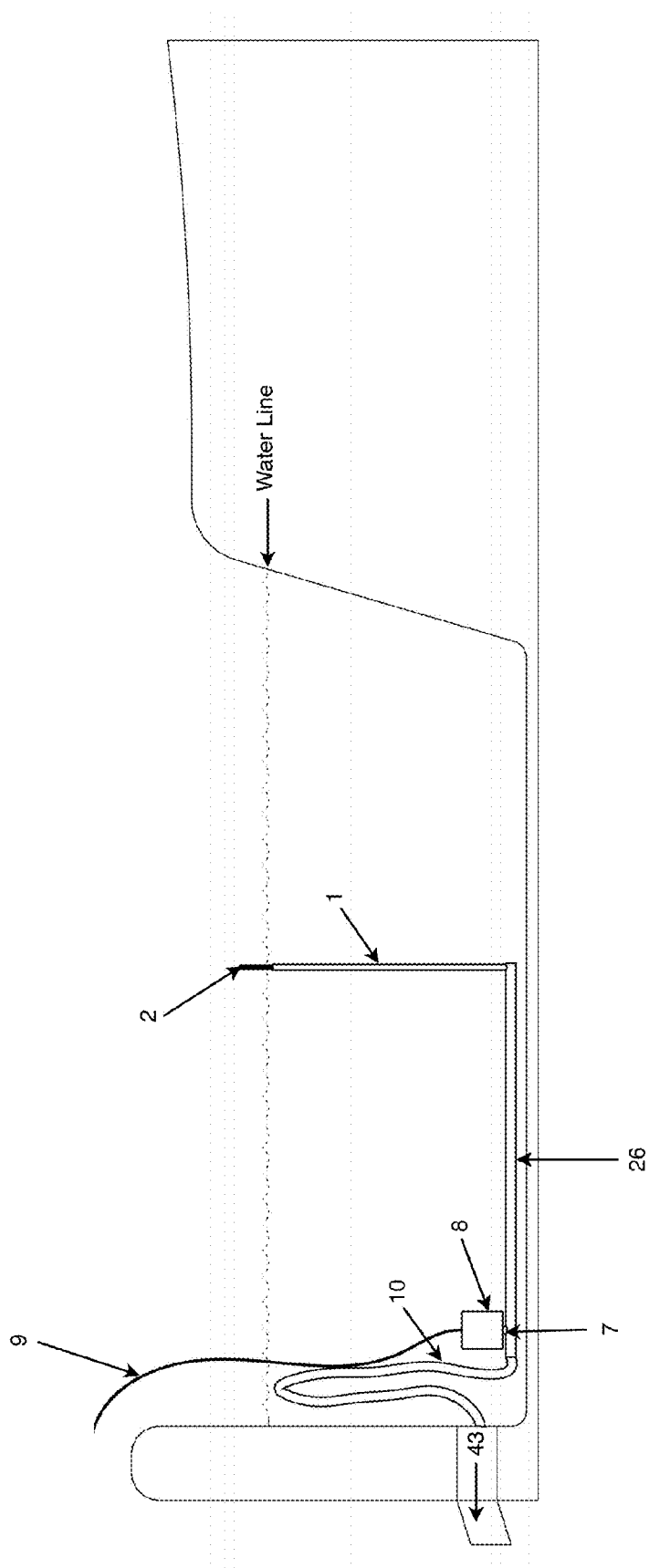
FIG. 69 is a sectional view of yet another energy conversion system in accordance with embodiments of the present disclosure.

With reference now to FIG. 69, still another example of an energy conversion system will be described in accordance with embodiments of the present disclosure. The system depicted in FIG. 69 is similar to the system shown in FIG. 51, except that the main outlet pipe 10 that carries the water from the air capture tank 8 is routed directly into port 43 of the dam itself. This can allow the energy conversion system to be combined with typical systems used to create energy from a dam (turbines as an example). FIG. 69 shows the pipe 10 being routed almost to the surface, and then back down into the exit port of the dam 43, but this is one of many options. This particular variation of an energy conversion system utilizes pressure on both sides of the capture tank 8 to maintain the high pressures in the capture tank 8. To achieve this, the main water outlet pipe 10 can be routed close to the elevation of the main water inlet pipe 1, creating a siphon and providing the required pressure for the device to function.

Another option for this is to use the back pressure provided by the turbines as the water exits the dam 43 to create the back pressure, or the majority of the back pressure, utilized by the system. In this option, the main water outlet pipe 10 would not need to be routed up close to the entrance of the water inlet pipe 1 in terms of elevation and can provide increased water flow for the turbines as the water exits the dam 43. To operate the system, water enters the main water inlet pipe(s) 1 directly from the lake or ocean. This water will pass over the end(s) of the air inlet tube(s) (2), creating a vacuum or Venturi effect, causing the air to be pulled into the falling stream of water in the water inlet pipe(s) 1. This air and water mixture will be pulled down into the air separation pipe 26, where the air will start to naturally separate itself from the stream of water, creating a path of water on the bottom of the pipe 26 and compressed air at the top of the pipe 26. As with previously-mentioned energy conversion systems, the air will attempt to rise to the surface as it passes under the compressed air capture tank 8, causing the air to vertically enter the capture tank 8 and trap the compressed air for use as an energy source. A small pipe or tube 9 can be used to tap into the newly created compressed air. The compressed air energy can be tapped directly to operate tools or generators, or the energy in the form of compressed air can be stored for future use. The water, now separated from the air, will continue on its path through the system.

In this example, that water path would end up entering the dam structure and either pass through the spillway, or pass over turbines to create additional energy from the system. Energy conversion systems employed in lakes, oceans and large bodies of water, can benefit from the use of a flexible and very large capture chamber 8. The water pressure provided by the water above, can push on the flexible capture tank 8 to assist in providing the maintained pressure for future use. This storage method could be applied as an option to any energy conversion system described herein that uses a large body of water like a lake or ocean.

Figure 70:
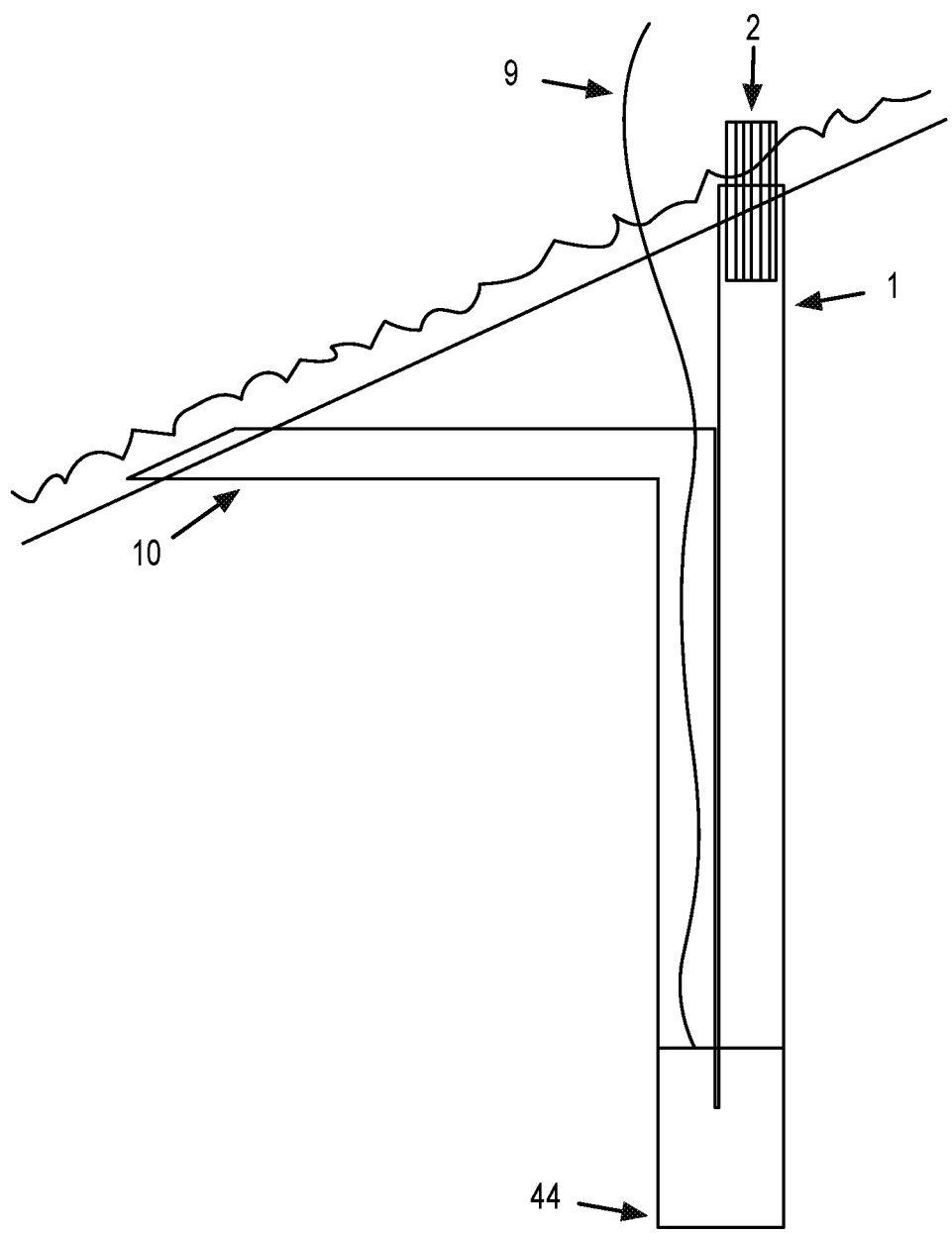
FIG. 70 is a first section cut view of still another energy conversion system in accordance with embodiments of the present disclosure.
Figure 71:
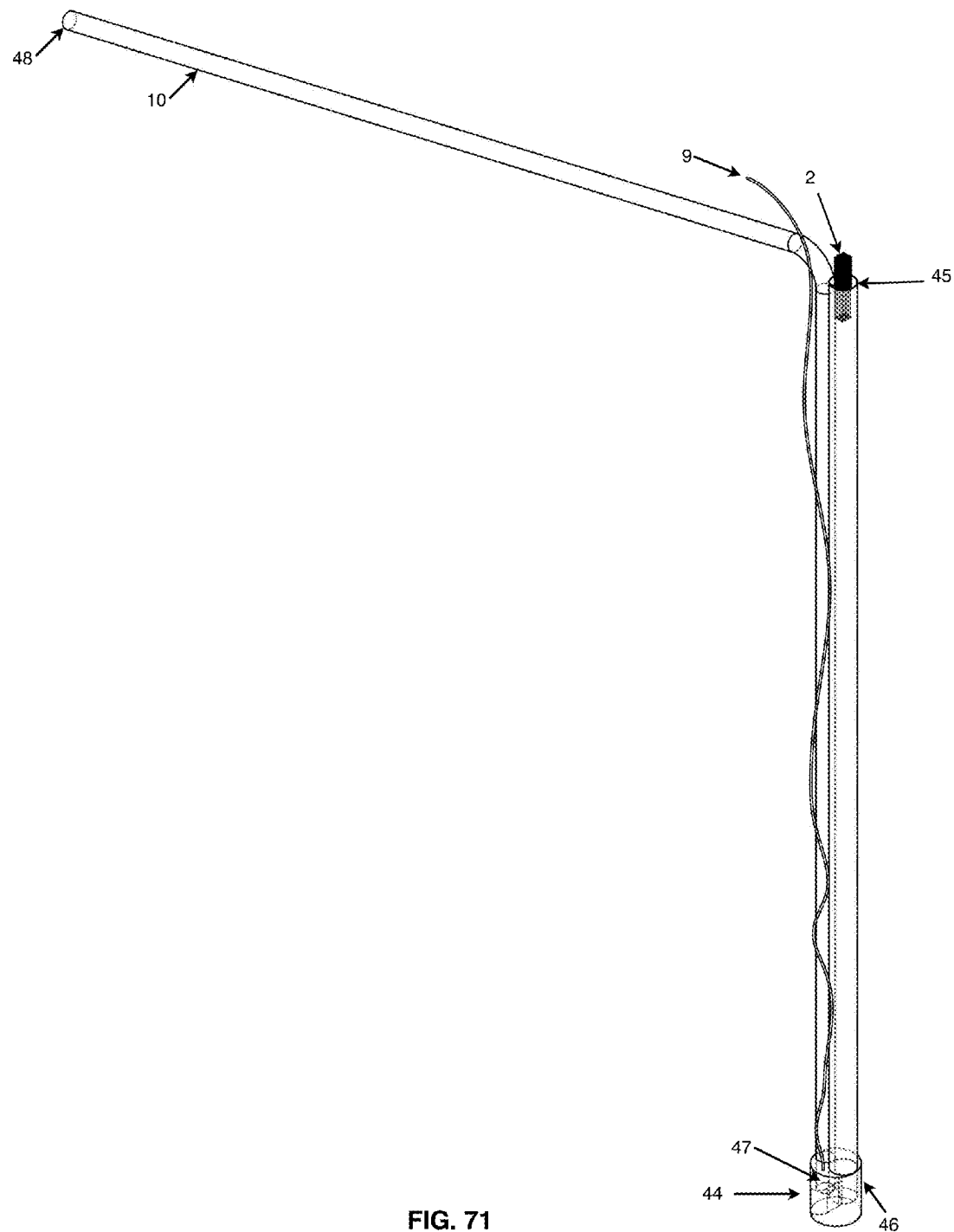
FIG. 71 is a wire frame isometric view of the system depicted in FIG. 70.

With reference now to FIGS. 70-72, still another example of an energy conversion system will be described in accordance with embodiments of the present disclosure. The energy conversion system depicted in these particular figures corresponds to a single-hole embodiment whereby both an input line 1 and output line 10 are placed in a single hole in the ground. As with other energy conversion systems disclosed herein, the energy conversion system may employ one or many air inlet tubes 2 that introduce air into the input line 1 as water or some other fluid flows into and through the input line. Specifically, input line 1 meets the output line 10 at an air capture system 44. As shown in detail at FIG. 72, the air capture system 44 provides the interface between the input line 1 and output line 10 and is positioned at a point below both the input line 1 and the output line 10.

Even more specifically, the input line 1 comprises a distal end 45 and a proximal end 46. The output line 10 also comprises a distal end 48 and a proximal end 47. The proximal ends 46, 47 of each line 1, 10 meet at the air capture system 44. Conversely, the distal ends 45, 48 of each line 1, 10 are exposed outside of a hole. The distal end 45 of the input line 1 is preferably located at an elevation greater than then distal end 48 of the output line 10 (e.g., position of greater potential energy). This allows water flowing down grade of a hill and toward the hole to enter the distal end 45 of the input line 1, travel through the input line to the air capture system 44 and then through the output line 10, eventually exiting via the distal end 48 of the output line 10.

As water travels from the distal end 45 of the input line 1 toward the proximal end 46, the water travels across the ends of the air inlet tubes 2, thereby invoking the flow of air through the air inlet tubes 2 and eventually into the inlet line 1. Accordingly, the input line 1 below the end of the air inlet tube 2 will carry a combination of water and air/gas. This water and air/gas combination is carried down the main line 1 toward the air capture system 44, where the compressed air/gas is at least partially extracted from the fluid flowing through the system. More particularly, the energy conversion system 44 comprises separation member 49 into which the proximal end 47 of the output line 10 is positioned. In some embodiments, the separation member 49 corresponds to a wall or piece of material that extends to the bottom of the air capture system 44 and has a height positioned above the proximal end 47 of the output line 10. Thus, water flowing out of the input line 1 and into the air capture system 44 will be forced to flow over the top of the separation member 49 and back down toward the proximal end 47 of the output line 10. Air/gas, on the other hand, continues rising above the top of the separation member 49 toward the top of the air capture system 44. The pipe 9 extends into the cavity of the air capture system 44 via the top of the air capture system 44 such that air/gas included in the fluid flowing from the input line 1 is captured at the top of the contained of the air capture system 44 and extracted by the pipe 9 such that the compressed air can be used for other purposes and/or stored for future use.

The end of the pipe 9 may be mounted flush with the top of the volume of the air capture system 44 or the end of the pipe 9 may be positioned below the top of the air capture system 44 (e.g., closer to the proximal end 46 than the top of the air capture system 44). This particular configuration of the air capture system 44 and the separation member 49 provided therein allows the air/gas to travel to the top of the air capture system 44 for collection by the pipe 9 whereas fluid is allowed to flow from the proximal end 46 of the input line 1 to the proximal end 47 of the output line 10. In some embodiments, the proximal ends 46, 47 are at the same height within the air capture system 44. In some embodiments, the proximal end 46 of the input line 1 is higher (e.g., closer to the top of the air capture system 44) than the proximal end 47 of the output line 10.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

What is claimed is:

1. A system configured to convert potential energy of a fluid into compressed air when the fluid falls from a body of water, the system comprising:
    a primary fluid line having a first end, a second end, and a middle portion, the first end being submerged in the body of water and being positioned at a first elevation, the second end being positioned outside the body of water at a second elevation that is lower than the first elevation such that fluid from the body of water is allowed to flow from the first end to the second end, the middle portion being continuous from the first end to the second end;
    an air inlet connected to the middle portion of the primary fluid line and configured to introduce air into the primary fluid line as the fluid flows through the primary fluid line; and
    an air capture system attached to a top portion of the primary fluid line between the air inlet and the second end of the primary fluid line such that the air introduced into the primary fluid line by the air inlet can be separated from the fluid and collected in the air capture system.

2. The system of claim 1, wherein the air inlet introduces air into the primary fluid line under a vacuum, vortex, Venturi, and/or siphon force created by the fluid flowing through the primary fluid line.

3. The system of claim 1, wherein the middle portion of the primary fluid line travels past at least one of a dam and levy that hold the fluid in the body of water.

4. The system of claim 1, wherein the body of water comprises at least one of a lake and reservoir.

5. An energy-conversion system configured to be placed within a single hole in the ground, the energy-conversion system comprising:
    an input line comprising a water inlet positioned above and exposed outside the single hole;
    an output line comprising a water outlet also positioned above and exposed outside the single hole, wherein the water outlet is positioned at an elevation lower than the water inlet;
    an air inlet extending through the water inlet and configured to enable air to enter the energy-conversion system in response to water flowing from the water inlet to the water outlet and become entrained in the water; and
    an air capture system positioned at an elevation lower than the water inlet and the water outlet, wherein the air capture system enables the entrained air to separate from the water, collects the separated air, and channels the collected air outside the single hole.

6. The energy-conversion system of claim 5, wherein the input line comprises a proximal end opposite the water inlet of the input line, wherein the proximal end of the input line is positioned within a cavity created by the air capture system.

7. The energy-conversion system of claim 6, wherein the output line comprises a proximal end opposite the water outlet of the output line, wherein the proximal end of the output line is positioned within the cavity created by the air capture system.

8. The energy-conversion system of claim 7, wherein the air capture system further comprises a separation member that is located within the cavity created by the air capture system and wherein the separation member at least partially separates the input line from the output line.

9. The energy-conversion system of claim 8, wherein the separation member corresponds to a wall within the air capture system that has a base that is flush to a bottom of the cavity of the air capture system and has a top that is positioned below a top surface of the air capture system.

10. The energy-conversion system of claim 9, wherein the top of the separation member is positioned at a height higher than the proximal end of the output line.

11. The energy-conversion system of claim 10, wherein the top of the separation member is also positioned at a height higher than the proximal end of the input line.

12. The energy-conversion system of claim 11, wherein the proximal end of the input line is positioned at a height higher than the proximal end of the output line.

13. The energy-conversion system of claim 9, wherein an air extraction pipe extends into the cavity of the air capture system.

14. The energy-conversion system of claim 13, wherein the air extraction pipe is positioned above the proximal ends of both the input line and the output line.

15. The energy-conversion system of claim 14, wherein the air extraction pipe comprises an end that is mounted flush with a top of the air capture system.

16. The energy-conversion system of claim 14, wherein the air extraction pipe comprises an end that is mounted below a top of the air capture system.

* * * * *